US010625629B2

(12) United States Patent  (10) Patent No.: US 10,625,629 B2
Thibault et al.  (45) Date of Patent: Apr. 21, 2020

(54) SNOW GROOMER OR OTHER TRACKED VEHICLE AND SYSTEMS THEREFOR

(71) Applicant: Prinoth Ltd., St. John (CA)

(72) Inventors: Jonathan Thibault, Granby (CA); Martin Kirchmair, Granby (CA); Michel Pelletier, Canton de Shefford (CA); Patrick Hebert, Granby (CA); Francis Gendron, Sherbrooke (CA); Ariane Authier, Bromont (CA); Stephane Bergeron, Granby (CA); Francois Paquet, Granby (CA)

(73) Assignee: Prinoth Ltd., St. John (CA)

( * ) Notice: Subject to any disclaimer, the term of this patent is extended or adjusted under 35 U.S.C. 154(b) by 0 days.

(21) Appl. No.: 16/011,991

(22) Filed: Jun. 19, 2018

(65) Prior Publication Data

US 2018/0354390 A1  Dec. 13, 2018

Related U.S. Application Data

(62) Division of application No. 15/104,136, filed as application No. PCT/IB2014/066138 on Nov. 18, 2014, now abandoned.

(Continued)

(51) Int. Cl.
*E01H 4/02* (2006.01)
*B60N 2/02* (2006.01)
(Continued)

(52) U.S. Cl.
CPC ............ *B60N 2/0228* (2013.01); *B60N 2/06* (2013.01); *B60N 2/14* (2013.01); *B62D 33/0617* (2013.01);
(Continued)

(58) Field of Classification Search
CPC . E01C 19/004; E01H 4/02; E01H 5/00; E02F 3/20; E02F 3/301; E02F 3/3622;
(Continued)

(56) References Cited

U.S. PATENT DOCUMENTS 1,889,685 A  11/1932  McIntyre
2,670,987 A  3/1954  Walsh
(Continued)

FOREIGN PATENT DOCUMENTS

CN  101254758 A  9/2008
CN  101600597 A  12/2009
(Continued)

OTHER PUBLICATIONS

Apr. 20, 2018—(EP) Communication Pursuant to Article 94(3) EPC—App 14821845.6.
(Continued)

*Primary Examiner* — Robert E Pezzuto
(74) *Attorney, Agent, or Firm* — Banner & Witcoff, Ltd.

(57) ABSTRACT

A user interface for a snow groomer or other tracked vehicle, such as tracked carrier to carry and enable use of work equipment on various terrains, is provided. The user interface may have an input device, an output device and a controller. The controller is configured to receive from the input device an indication of a desired snow grooming distance, and the controller is further configured to measure a distance traveled by the snow groomer, and to cause the output device to convey a remaining distance to be traveled by the snow groomer, the remaining distance being the difference between the desired snow grooming distance and the distance traveled by the snow groomer.

21 Claims, 36 Drawing Sheets

Related U.S. Application Data

(60) Provisional application No. 61/914,837, filed on Dec. 11, 2013.

(51) Int. Cl.
    *B60N 2/06*      (2006.01)
    *B60N 2/14*      (2006.01)
    *B62D 33/06*      (2006.01)
    *B62D 55/08*      (2006.01)
    *B60K 26/02*      (2006.01)

(52) U.S. Cl.
    CPC ............... *B62D 55/08* (2013.01); *E01H 4/02* (2013.01); *B60K 2026/026* (2013.01); *E01H 2004/026* (2013.01)

(58) Field of Classification Search
    CPC ........ E02F 3/3636; E02F 3/3663; G01C 7/04; G01C 21/3407; G01C 21/3461; G01C 21/3655; G01C 21/3644; G01C 21/3679; B60N 2/0228; B60N 2/06; B60N 2/14; B62D 33/0617; B62D 55/08
    USPC .......................................... 37/219, 222, 223
    See application file for complete search history.

(56) References Cited

U.S. PATENT DOCUMENTS

| | | | |
|---|---|---|---|
| 3,692,119 A | 9/1972 | Tucker | |
| 3,718,365 A | 2/1973 | Gibson | |
| 4,541,497 A | 9/1985 | Riediger et al. | |
| 5,177,685 A * | 1/1993 | Davis | B60R 16/0373 340/988 |
| 5,190,398 A | 3/1993 | Swisher, Jr. | |
| 5,632,521 A | 5/1997 | Archambault et al. | |
| 5,760,713 A * | 6/1998 | Yokoyama | G01C 21/3407 340/905 |
| 5,761,095 A * | 6/1998 | Warren | E01C 19/004 702/166 |
| 6,266,614 B1 * | 7/2001 | Alumbaugh | G01C 21/3644 701/468 |
| 7,712,571 B2 | 5/2010 | Proud et al. | |
| 7,780,225 B2 | 8/2010 | Klein et al. | |
| 8,209,116 B2 * | 6/2012 | Sugawara | G01C 21/3694 340/988 |
| 8,489,330 B2 * | 7/2013 | Ellanti | G01C 21/26 701/451 |
| 8,751,156 B2 * | 6/2014 | Musabji | G01C 21/3638 701/428 |
| 8,983,762 B2 * | 3/2015 | Davidson | G06Q 10/08 701/123 |
| 9,372,096 B2 * | 6/2016 | Maezawa | G01C 22/00 |
| 9,625,267 B2 * | 4/2017 | Jung | G01C 21/362 |
| 2003/0051376 A1 | 3/2003 | Lassonde et al. | |
| 2004/0144000 A1 * | 7/2004 | Kanzler | E01H 4/02 37/196 |
| 2006/0225935 A1 | 10/2006 | Avikainen et al. | |
| 2008/0203753 A1 | 8/2008 | Klein et al. | |
| 2008/0224522 A1 | 9/2008 | Taguchi et al. | |
| 2010/0026070 A1 | 2/2010 | Rohee et al. | |
| 2010/0253123 A1 | 10/2010 | DeCraene et al. | |
| 2013/0113258 A1 | 5/2013 | Slungare et al. | |

FOREIGN PATENT DOCUMENTS

| | | |
|---|---|---|
| DE | 19813474 A1 | 10/1999 |
| EP | 1814012 A2 | 8/2007 |
| RU | 2229 U1 | 11/2004 |
| SU | 1759714 A1 | 9/1992 |
| WO | 2013029165 A1 | 3/2013 |

OTHER PUBLICATIONS

Jul. 10, 2018—(CN) Notification of the Second Office Action—App 201480075305.7.
Jan. 9, 2019—(RU) Decision to Grant—App 2016127548.
Mar. 6, 2019—(CN) Rejection Decision—App 201480075305.7.
International Search Report for PCT/IB2014/066138 (dated May 6, 2015).
Jun. 26, 2017 (CN) Notification of First Office Action—App 201480075305.7.
Written Opinion of the International Searching Authority—App PCT/IB2014/066138.
Sep. 25, 2017—(EP) Office Action—App 14821845.6.
Aug. 19, 2019—(EP) Extended European Search Report—App 19173834.3.

* cited by examiner

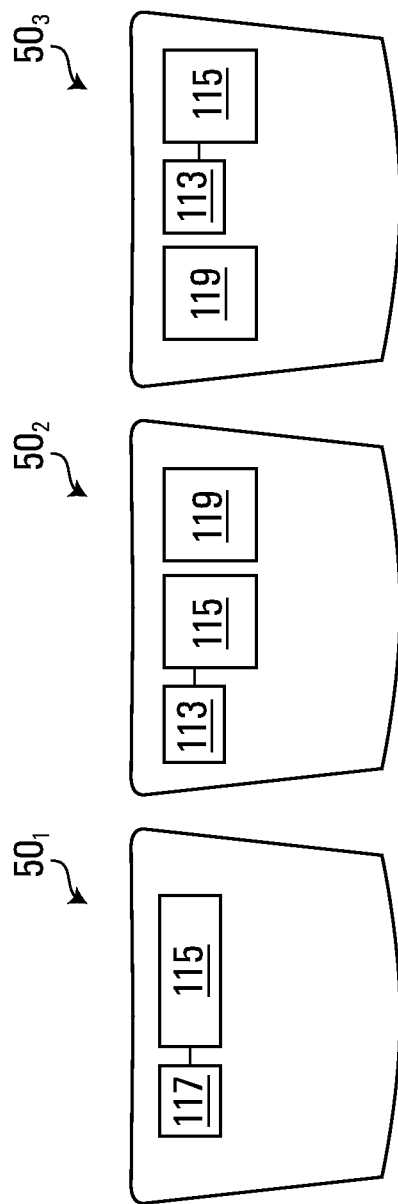

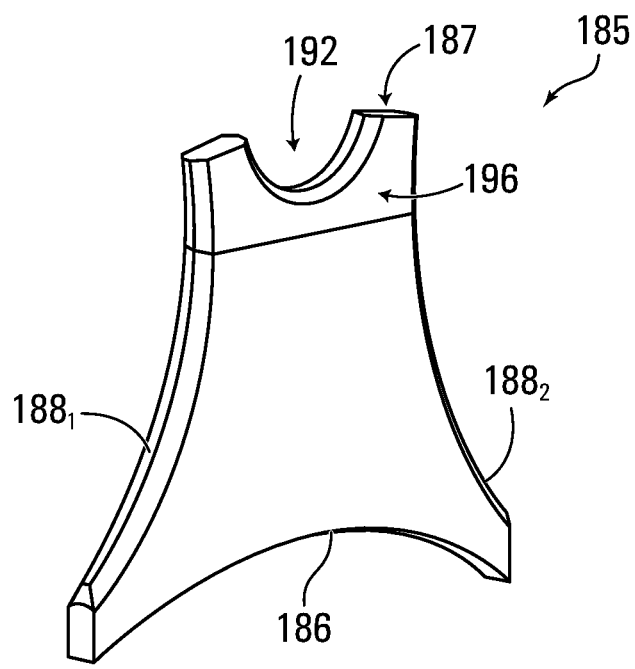
FIG. 26
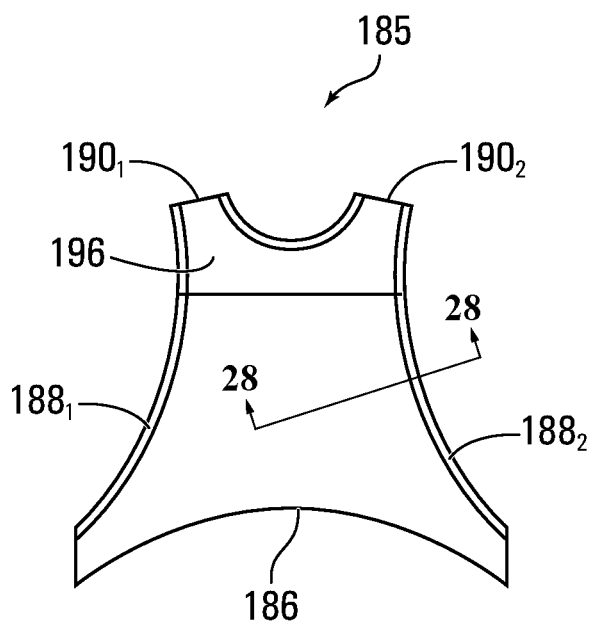 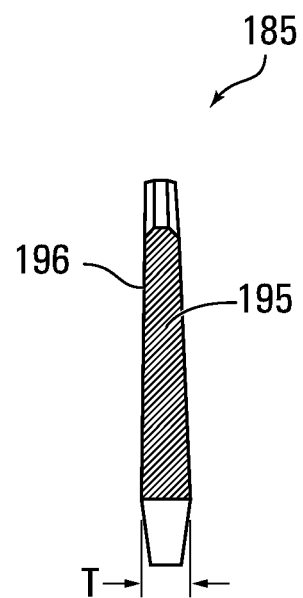
FIG. 27      FIG. 28

SNOW GROOMER OR OTHER TRACKED VEHICLE AND SYSTEMS THEREFOR

CROSS SECTION TO RELATED APPLICATION

This application is a divisional of U.S. application Ser. No. 15/104,136, filed Jun. 13, 2016, which is a U.S. National Phase Application under 35 U.S.C. § 371 of International Application No. PCT/IB2014/066138, filed Nov. 18, 2014, which claims the benefit of U.S. Provisional Application Ser. No. 61/914,837, filed Dec. 11, 2013, the disclosures of which are hereby incorporated in their entirety.

FIELD

The invention relates to tracked vehicles such as snow groomers and other off-road vehicles.

BACKGROUND

One type of tracked vehicle is a snow groomer, sometimes referred to as a "piste basher", which carries snow-grooming equipment, such as a blade and a tiller, to groom snow (e.g., move, flatten, till, compact, and/or otherwise manipulate snow) in order to maintain ski hills, cross country ski trails, snowmobile trails, and/or other snowed areas.

An operator of a snow groomer must be able to adequately gauge an environment he/she is working in such that, for example, a quality of work done by the snow groomer can be observed and safety of the operator and any other individuals (e.g., skiers) around the snow groomer is maintained. This often poses a challenge for the operator as a clear view of his/her surroundings is not always possible or constant and is often dependent on outside factors not controlled by the operator. For example, when grooming a half-pipe, the operator may have difficulty viewing the quality of work done at a top of the half-pipe. In order to get a good look, the operator may have to shift considerably in his/her seat and even perhaps get out of the snow groomer's cabin. Consequently, this may slow down the grooming operation, make the operator strain trying to get a better line of sight, and even risk the safety of the operator and/or others by leaving the cabin of the snow groomer.

Furthermore, the tiller of the snow groomer may pose its own challenges. For instance, as the operator drives the snow groomer with the tiller engaged to the ground, uneven terrain can cause deviations of the tiller and thus unequal performance at different portions of the tiller. Additionally, it is not uncommon to see cutting depth fluctuations across a lateral extent of the tiller and poor following of the tiller when engaging curves. Another challenge that may be found is that of friction applied to a mat of the tiller. The mat is dragged over the snow and thus is subject to a great deal of friction on its underside. This may result in rapid wear of the mat and thus maintenance costs to replace the mat and/or less than optimal grooming. Also, a rotor of the tiller may have a propensity to wear as its teeth dig into snow and sometimes ice in order to provide a tilling function of the snow groomer.

Challenges similar to those discussed above in respect of a snow groomer may be encountered in other types of industrial tracked vehicles.

Accordingly, there may be room for improvements in snow groomers and other tracked vehicles.

SUMMARY OF THE INVENTION

According to a first broad aspect, there is provided a seat system for a snow groomer, comprising a base, and a seat carriage mounted to the base and movable in a direction transverse to a direction of forward movement of the snow groomer. The seat carriage comprising a pivot arrangement for permitting a swiveling motion of a seat mounted to the seat carriage via the pivot arrangement.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis behind the operator cabin, the power plant being in a driving relationship with the track assemblies, and a tiller assembly in a rear portion of the snow groomer, wherein the cabin comprises a seat system that includes a base and a seat carriage mounted to the base and movable in a direction transverse to a direction of forward movement of the snow groomer, the seat carriage comprising a pivot arrangement for permitting a swiveling motion of a seat mounted to the seat carriage via the pivot arrangement.

According to another broad aspect, there is provided a seat movement control system for a snow groomer, comprising a base, a seat carriage mounted to the base and movable in a direction transverse to a direction of forward movement of the snow groomer, and a controller for selectively restricting movement of the seat carriage in the direction transverse to a direction of forward movement of the snow groomer depending on a state of movement of the snow groomer.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis behind the operator cabin, the power plant being in a driving relationship with the track assemblies; and a tiller assembly in a rear portion of the snow groomer, wherein the cabin comprises a seat system that includes a base, a seat carriage mounted to the base and movable in a direction transverse to a direction of forward movement of the snow groomer, and a controller for selectively restricting movement of the seat carriage in the direction transverse to a direction of forward movement of the snow groomer depending on a state of movement of the snow groomer.

According to another broad aspect, there is provided a method of configuring a snow groomer operator cabin, comprising receiving a request for an operator cabin with a desired cabin seat configuration, the desired cabin seat configuration being either a first cabin seat configuration in which an operator seat is in a center position within the operator cabin or a second cabin seat configuration in which the operator seat is in a lateral position of the operator cabin, providing an operator cabin with a predetermined cabin seat configuration, the predetermined cabin seat configuration being set independently of the received request, in case the predetermined cabin seat configuration is different from the desired cabin seat configuration, changing the position of the operator seat within the operator cabin; and providing a snow groomer including the operator cabin in which the position of the operator seat is in accordance with the desired cabin seat configuration.

According to another broad aspect, there is provided an adjustable mirror system for a snow groomer, comprising a mirror affixed to an operator cabin of the snow groomer and adjustable to a plurality of possible positions, an actuator for adjusting a position of the mirror, a sensor for outputting a signal indicative of a seat position occupied by an operator seat in the operator cabin of the snow groomer, a controller for controlling the actuator based on the signal from the sensor, thereby to cause the mirror to acquire a position associated with the seat position occupied by the operator seat.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis behind the operator cabin, the power plant being in a driving relationship with the track assemblies, a tiller assembly in a rear portion of the snow groomer; and an adjustable mirror system. The adjustable mirror system comprises, a mirror affixed to an operator cabin of the snow groomer and adjustable to a plurality of possible positions, an actuator for adjusting a position of the mirror, a sensor for outputting a signal indicative of a seat position occupied by an operator seat in the operator cabin of the snow groomer, and a controller for controlling the actuator based on the signal from the sensor, thereby to cause the mirror to acquire a position associated with the seat position occupied by the operator seat.

According to another broad aspect, there is provided an operator seat system for a snow groomer, comprising a base, a seat carriage for receiving a body of an operator, the seat carriage mounted to the base and movable in a direction transverse to a direction of forward movement of the snow groomer, and a support structure lateral to the seat carriage and movable together therewith, the support structure including a user interface with at least one control for controlling at least one function of the snow groomer, the at least one control including at least one of an HVAC control and a radio control.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis behind the operator cabin, the power plant being in a driving relationship with the track assemblies, a tiller assembly in a rear portion of the snow groomer, and an operator seat system. The operator seat system comprises a base, a seat carriage for receiving a body of an operator, the seat carriage mounted to the base and movable in a direction transverse to a direction of forward movement of the snow groomer, and a support structure lateral to the seat carriage and movable together therewith, the support structure including a user interface with at least one control for controlling at least one function of the snow groomer, the at least one control including at least one of an HVAC control and a radio control.

According to another broad aspect, there is provided a cooling module for cooling fluids, comprising a plurality of fluid cooling units, a cooling fan, an enclosure defining a space between the cooling fan and the fluid cooling units, in which air is caused to circulate when the cooling fan operates, wherein the cooling fan defines a footprint in the surface of the enclosure, and wherein the cooling fan is oriented relative to the fluid cooling units such that a projection of the footprint through an interior of the enclosure intersects each of at least two of the fluid cooling units without obstruction from any of the fluid cooling units.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis behind the operator cabin, the power plant being in a driving relationship with the track assemblies, a tiller assembly in a rear portion of the snow groomer, and a cooling module for cooling fluids used in the power plant. The cooling module for cooling fluids used in the power plant comprises a plurality of fluid cooling units, a cooling fan, and an enclosure defining a space between the cooling fan and the fluid cooling units, in which air is caused to circulate when the cooling fan operates, wherein the cooling fan defines a footprint in the surface of the enclosure, and wherein the cooling fan is oriented relative to the fluid cooling units such that a projection of the footprint through an interior of the enclosure intersects each of at least two of the fluid cooling units without obstruction from any of the fluid cooling units.

According to another broad aspect, there is provided a cooling module for a snow groomer, comprising a plurality of fluid cooling units, each fluid cooling unit having a planar top surface, wherein planes defined by the top surfaces of at least two of the fluid cooling units intersect.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis behind the operator cabin, the power plant being in a driving relationship with the track assemblies, a tiller assembly in a rear portion of the snow groomer, and a cooling module for cooling fluids used in the power plant, which comprises a plurality of fluid cooling units, each fluid cooling unit having a planar top surface, wherein planes defined by the top surfaces of at least two of the fluid cooling units intersect.

According to another broad aspect, there is provided a cooling module for a snow groomer, comprising a plurality of fluid cooling units, each fluid cooling unit having a top surface, at least one cooling fan, each cooling fan including at least one component that rotates about a respective axis of rotation, wherein the axis of rotation respective to at least one said cooling fan obliquely meets the top surface of at least one of the fluid cooling units.

According to another broad aspect, there is provided a snow groomer, comprising: a chassis, an operator cabin mounted to the chassis from which travel and operation of the snow groomer are controlled, a plurality of track assemblies for causing the snow groomer to advance in snow, a power plant mounted on the chassis behind the operator cabin, the power plant being in a driving relationship with the track assemblies, a tiller assembly in a rear portion of the snow groomer, and a cooling module for cooling fluids used in the power plant. The cooling module for cooling fluids used in the power plant comprises a plurality of fluid cooling units, each fluid cooling unit having a top surface, a plurality of cooling fans, each cooling fan including at least one component that rotates about a respective axis of rotation, wherein the axis of rotation respective to at least one of the cooling fans obliquely meets the top surface of at least one of the fluid cooling units.

According to another broad aspect, there is provided a snow groomer comprising a chassis, an operator cabin mounted to the chassis and including at least a front window and a rear window, a plurality of track assemblies for causing the snow groomer to advance in snow, a power plant mounted on the chassis behind the operator cabin, the power plant being in a driving relationship with the track assemblies, the power plant being compliant with emission standards at least as stringent as Tier 4 and providing at least 400 hp of motive power, a tiller assembly in a rear portion of the snow groomer, and a cooling module for cooling said power plant, at least part of the cooling module being disposed behind the cabin; the cooling module having an exterior profile that is sufficiently low to the ground to allow establishment of an operator line of sight between the rear window of the operator cabin and an area where snow enters the tiller assembly for processing.

According to another broad aspect, there is provided a snow groomer comprising a chassis, an operator cabin mounted to the chassis, a plurality of track assemblies for causing the snow groomer to advance relative to the ground, a power plant mounted on the chassis behind the operator cabin, the power plant being in a driving relationship with the track assemblies, a tiller assembly in a rear portion of the snow groomer; and a cooling module for cooling said power plant, at least part of the cooling module being disposed behind the cabin, the cooling module having a contour when the snow groomer is viewed in side elevation, wherein the contour diminishes in height from front to back.

According to another broad aspect, there is provided a mat for smoothing snow processed by a tiller of a snow groomer, the mat comprising a front end for attachment to the tiller, a rear end opposite the front end, two lateral sides between the front end and the rear end, an underside for contacting snow over which the mat passes, and at least one mass to weigh down the mat, wherein at least part of the mat is composed of an elastomeric material molded over the at least one mass.

According to another broad aspect, there is provided a snow groomer, comprising a chassis, an operator cabin mounted to the chassis from which travel and operation of the snow groomer are controlled, a plurality of track assemblies for causing the snow groomer to advance in the snow, a power plant mounted on the chassis, the power plant being in a driving relationship with the track assemblies, a tiller assembly in a rear portion of the snow groomer, and a mat for smoothing snow processed by the tiller. The mat comprises a front end for attachment to the tiller, a rear end opposite the front end, two lateral sides between the front end and the rear end, an underside for contacting snow over which the mat passes, and at least one mass to weigh down the mat, wherein at least part of the mat is composed of an elastomeric material molded over the at least one mass.

According to another broad aspect, there is provided a mat assembly for a snow groomer, comprising a mat that includes a plurality of side-by-side mat sections, each mat section being removably connectable to the tiller and comprising a snow-engaging side and a non-snow-engaging side, the snow-engaging side of each mat section including an uneven surface that leaves a pattern in the snow behind the tiller when the mat section is dragged across the snow.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis, the power plant being in a driving relationship with the track assemblies, a tiller assembly in a rear portion of the snow groomer; and a mat assembly. The mat assembly comprises a mat that includes a plurality of side-by-side mat sections, each mat section being removably connectable to the tiller and comprising a snow-engaging side and a non-snow-engaging side, the snow-engaging side of each mat section including an uneven surface that leaves a pattern in the snow behind the tiller when the mat section is dragged across the snow.

According to another broad aspect, there is provided a user interface for a snow groomer, comprising an input device, an output device; and a controller. The controller is configured to receive from the input device an indication of a desired snow grooming distance, and the controller is further configured to measure a distance traveled by the snow groomer, and to cause the output device to convey a remaining distance to be traveled by the snow groomer, the remaining distance being the difference between the desired snow grooming distance and the distance traveled by the snow groomer.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis, the power plant being in a driving relationship with the track assemblies, a tiller assembly in a rear portion of the snow groomer, and a user interface. The user interface comprises an input device, an output device, and a controller. The controller is configured to receive from the input device an indication of a desired snow grooming distance, and the controller is further configured to receive measurements from a sensor, to convert the measurements into a distance traveled by the snow groomer, and to cause the output device to convey a remaining distance to be traveled by the snow groomer, the remaining distance being the difference between the desired snow grooming distance and the distance traveled by the snow groomer.

According to another broad aspect, there is provided a wiper system for a snow groomer, comprising a window providing visibility from an operator cabin of the snow groomer, the window having a top edge, two lateral edges and a bottom edge, a first wiper connected via a first linkage to a motive source, the first wiper being movable by the motive source to complete a sequence of first wiping cycles, wherein during each of the first wiping cycles the first wiper slides across a surface of the window from a first parked position to a half-cycle position and back to the first parked position, and a second wiper connected via a second linkage to the motive source, the second wiper being movable by the motive source to complete a sequence of second wiping cycles, wherein during each of the second wiping cycles the second wiper slides across the surface of the window from a second parked position to a half-cycle position and back to the second parked position, wherein in the first and second parked positions, the first and second wipers are parallel to and proximate respective ones of the lateral edges of the window.

According to another broad aspect, there is provided a snow groomer, comprising a chassis, an operator cabin mounted to the chassis from which travel and operation of the snow groomer are controlled, the operator cabin having a window, the window having a top edge, two lateral edges and a bottom edge, a plurality of track assemblies for causing the snow groomer to advance in snow; a power plant mounted on the chassis, the power plant being in a driving relationship with the track assemblies, a tiller assembly in a rear portion of the snow groomer; and a wiper system for a snow groomer. The wiper system comprises a first wiper connected via a first linkage to a motive source, the first wiper being movable by the motive source to complete a sequence of first wiping cycles, wherein during each of the first wiping cycles the first wiper slides across a surface of the window from a first parked position to a half-cycle position and back to the first parked position, and a second wiper connected via a second linkage to the motive source, the second wiper being movable by the motive source to complete a sequence of second wiping cycles, wherein during each of the second wiping cycles the second wiper slides across the surface of the window from a second parked position to a half-cycle position and back to the second parked position, wherein in the first and second parked positions, the first and second wipers are parallel to and proximate respective ones of the lateral edges of the window.

According to another broad aspect, there is provided a system in an operator cabin of a snow groomer that comprises a tiller, comprising an input for receiving a signal indicative of a speed of rotation of a component of the tiller and an output that conveys to an occupant of the operator cabin said speed of rotation.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis, the power plant being in a driving relationship with the track assemblies; and a tiller assembly in a rear portion of the snow groomer, the operator cabin comprising a system that includes an input for receiving a signal indicative of a speed of rotation of a component of the tiller and an output that conveys to an occupant of the operator cabin said speed of rotation.

According to another broad aspect, there is provided an operator cabin of a snow groomer, comprising a floor, a front window, a rear portion, a first lateral side including a first window, a second lateral side including a door that includes a second window, and a spoiler mounted on the second lateral side below the door.

According to another broad aspect, there is provided a snow groomer, comprising, a chassis, an operator cabin mounted to the chassis from which travel and operation of the snow groomer are controlled, a plurality of track assemblies for causing the snow groomer to advance in snow, a power plant mounted on the chassis, the power plant being in a driving relationship with the track assemblies; and a tiller assembly in a rear portion of the snow groomer. The operator cabin includes a floor, a front window, a rear portion, a first lateral side including a first window, a second lateral side including a door that includes a second window, and a spoiler mounted on the second lateral side below the door.

According to another broad aspect, there is provided a pedal system for a snow groomer, comprising a plurality of pedals at separate potential operator locations in a direction transverse to a direction of forward movement of the snow groomer, each of said pedals having the same function for controlling an aspect of the snow groomer, and a controller configured for enabling transmission of a signal from a pedal that is an active pedal and disabling transmission of a signal from each pedal that is not an active pedal.

According to another broad aspect, there is provided a snow groomer, comprising a chassis, an operator cabin mounted to the chassis from which travel and operation of the snow groomer are controlled, a plurality of track assemblies for causing the snow groomer to advance in snow, a power plant mounted on the chassis, the power plant being in a driving relationship with the track assemblies; a tiller assembly in a rear portion of the snow groomer, and a pedal system. The pedal system comprises a plurality of pedals at separate potential operator locations in a direction transverse to a direction of forward movement of the snow groomer, each pedal having the same function for controlling an aspect of the snow groomer, and a controller for determining one of the pedals as active and for enabling transmission of a signal from the active pedal and disabling transmission of a signal from each pedal that is not the active pedal.

According to another broad aspect, there is provided a non-transitory computer-readable medium comprising computer-readable program code which, when interpreted by a controller of a seat system for a snow groomer, causes the controller to execute a method, the seat system further comprising a base, a seat carriage, and a controllable locking device for controllably restricting movement of the seat carriage. The computer-readable program code comprises first computer-readable program code for causing the controller to detect when a condition is met, and second computer-readable program code for causing the controller to control the locking device to prevent movement of the seat carriage when the controller detects that the condition is met.

According to another broad aspect, there is provided a non-transitory computer-readable medium comprising computer-readable program code which, when interpreted by a controller of an adjustable mirror system for a snow groomer, causes the controller to execute a method, the adjustable mirror system further comprising a mirror, an actuator for adjusting a position of the mirror, a sensor for outputting a signal indicative of a seat position occupied by an operator seat in the operator cabin of the snow groomer. The computer-readable program code comprises first computer-readable program code for causing the controller to receive the signal from the sensor, and second computer-readable program code for causing the controller to control the actuator based on the signal from the sensor, thereby causing the mirror to acquire a position associated with the seat position occupied by the operator seat.

According to another broad aspect, there is provided a non-transitory computer-readable medium comprising computer-readable program code which, when interpreted by a controller of an operator seat system for a snow groomer, causes the controller to execute a method, the operator seat system further comprising a base, a seat carriage, a support structure lateral to the seat carriage, and a controllable locking device. The computer-readable program code comprises first computer-readable program code for causing the controller to detect when a condition is met, and second computer-readable program code for causing the controller to control the locking device to prevent movement of the seat carriage when the controller detects that the condition is met.

According to another broad aspect, there is provided a non-transitory computer-readable medium comprising computer-readable program code which, when interpreted by a controller of a snow groomer, causes the controller to execute a method, the snow groomer further comprising an input device and an output device. The computer-readable program code comprises first computer-readable program code for causing the controller to receive from the input device an indication of a desired snow grooming distance, second computer-readable program code for causing the controller to measure a distance traveled by the snow groomer, and third computer-readable program code for causing the controller to cause the output device to convey a remaining distance to be traveled by the snow groomer, the remaining distance being the difference between the desired snow grooming distance and the distance traveled by the snow groomer.

According to another broad aspect, there is provided a non-transitory computer-readable medium comprising computer-readable program code which, when interpreted by a controller of a pedal system for a snow groomer, causes the controller to execute a method, the pedal system further comprising a plurality of pedals at separate potential operator locations. The computer-readable program code comprises first computer-readable program code for causing the controller to enable transmission of a signal from a pedal that is an active pedal, and second computer-readable program code for causing the controller to disable transmission of a signal from each pedal that is not an active pedal.

These and other aspects of the invention will become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings.

FIGS. 13A-C illustrate functional representations of example configurations of an operator cabin of a snow groomer according to an embodiment of an aspect of the invention.

FIGS. 26 through 28 illustrate various views of a tooth attachment according to an embodiment of an aspect of the invention.

Figure 1:
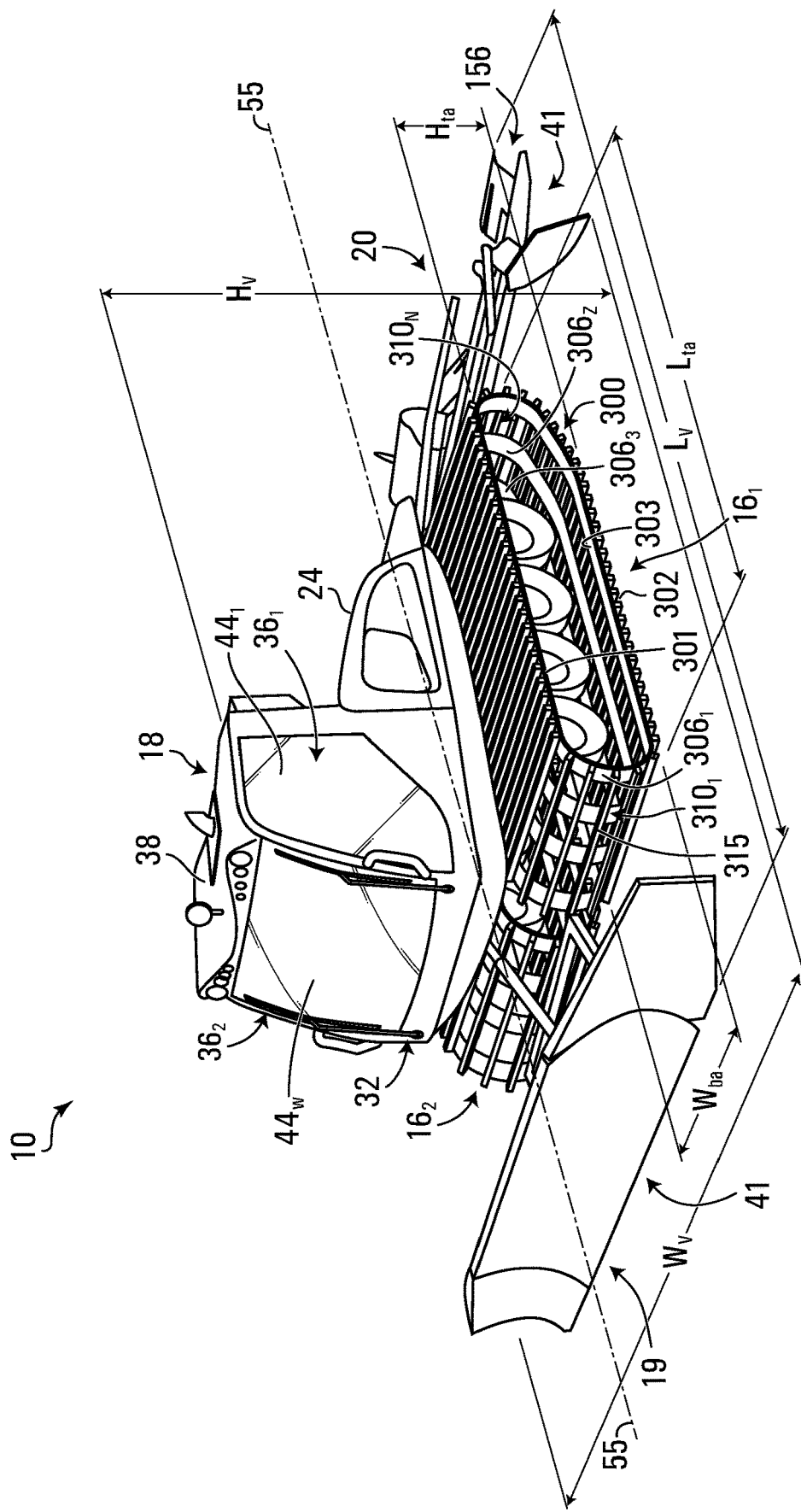
FIG. 1 illustrate a perspective view of a snow groomer according to an embodiment of an aspect of the invention.

In the drawings, embodiments of the invention are illustrated by way of example. It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 2:
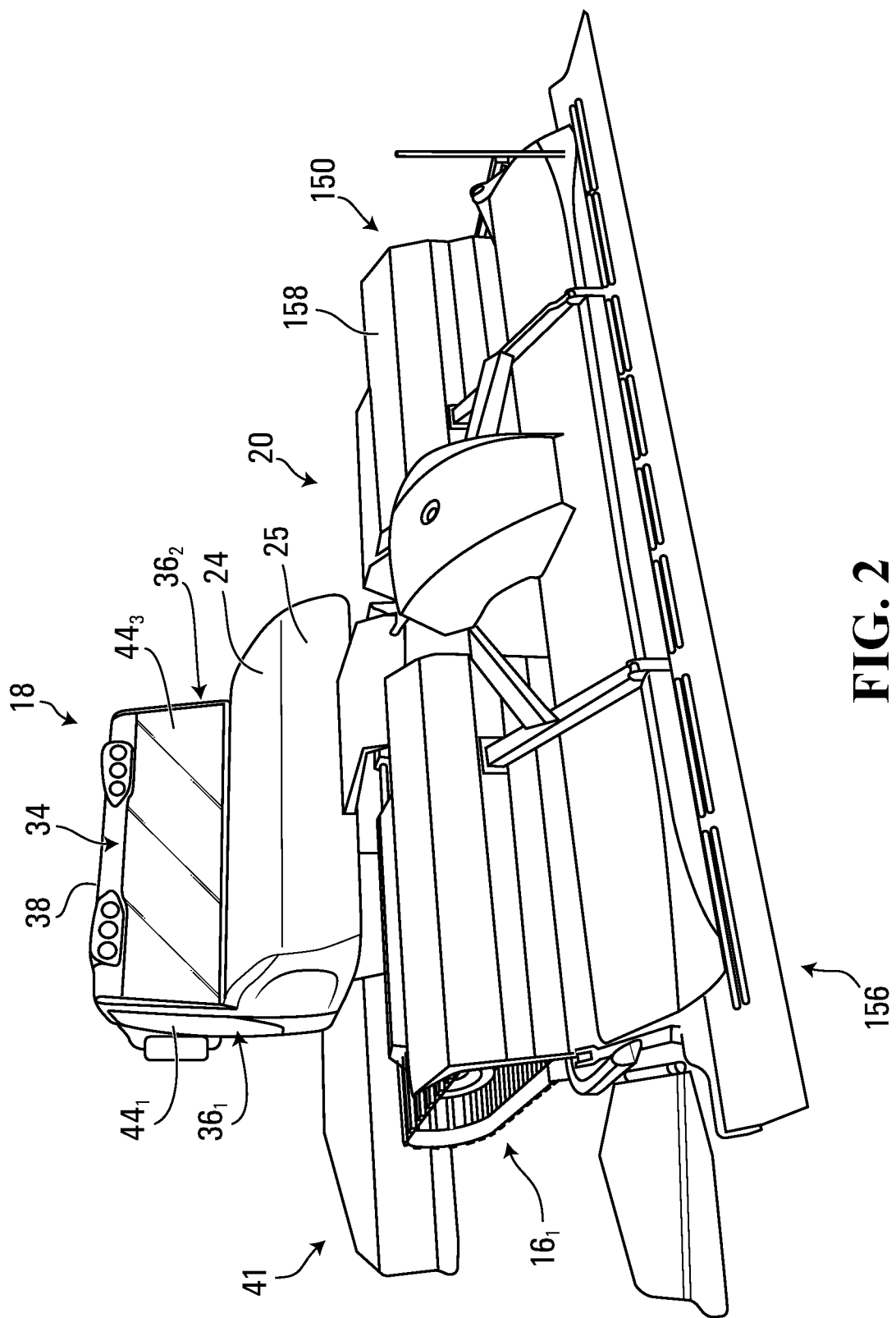
FIG. 2 illustrate a perspective view of the rear of a snow groomer according to an embodiment of an aspect of the invention.

FIGS. 1 and 2 show an example tracked vehicle 10 in accordance with an embodiment of the invention. In this embodiment, the tracked vehicle 10 is a snow groomer for grooming snow (e.g., moving, flattening, tilling, compacting, and/or otherwise manipulating snow) to maintain ski hills, cross country ski trails, snowmobile trails, and/or other snowed areas. The snow groomer 10 is designed to carry and enable use of work equipment 41, in this case snow grooming equipment which includes one or more work implements such as, in this example, a blade assembly 19 and a tiller assembly 20, on various snowy terrains.

The snow groomer 10 has a length L, a width W, and a height H. For example, in some embodiments, the length L, may be at least 5 m, such as between 5 m and 10 m, in some cases between 6 m and 9 m, and in some cases between 7 m and 8 m; the width W, may be at least 2 m, such as between 2 m and 10 m, in some cases between 3 m and 9 m, and in some cases between 4 m and 8 m; and the height H, may be no more than 4 m, in some cases no more than 3.5 m, and in some cases no more than 3 m. The length width Wv, and height $H_v$ may have any other values in other embodiments.

Figure 3:
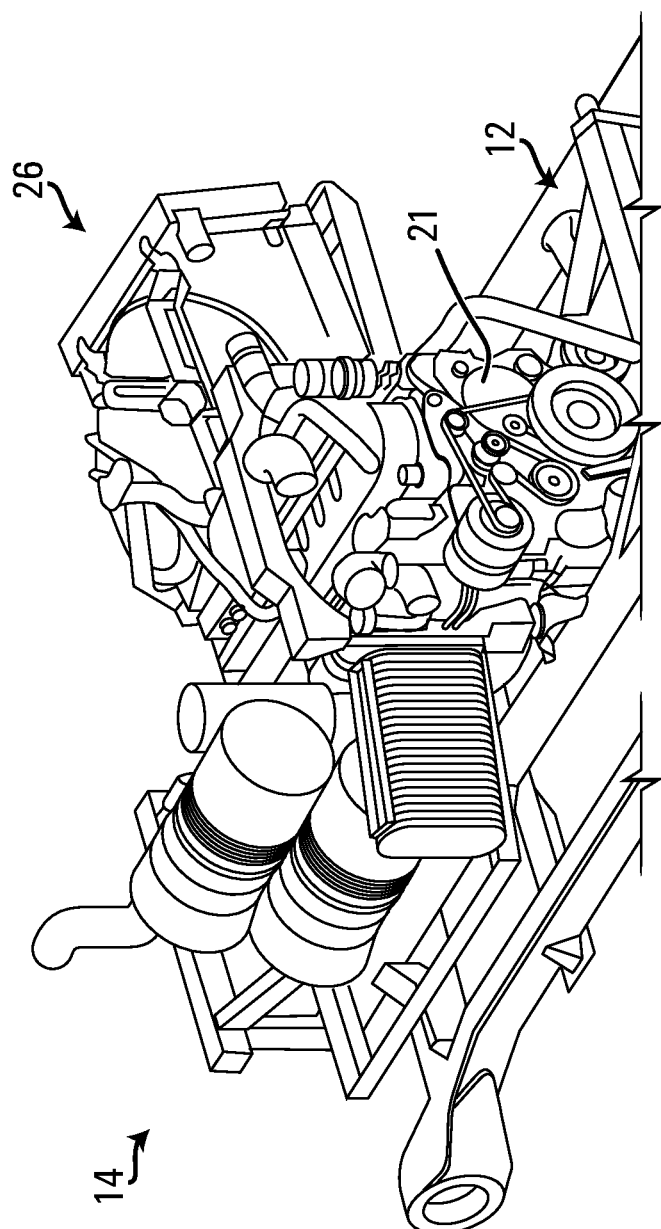
FIG. 3 illustrate a perspective view of a power plant and a cooling module according to an embodiment of an aspect of the invention.
Figure 4:
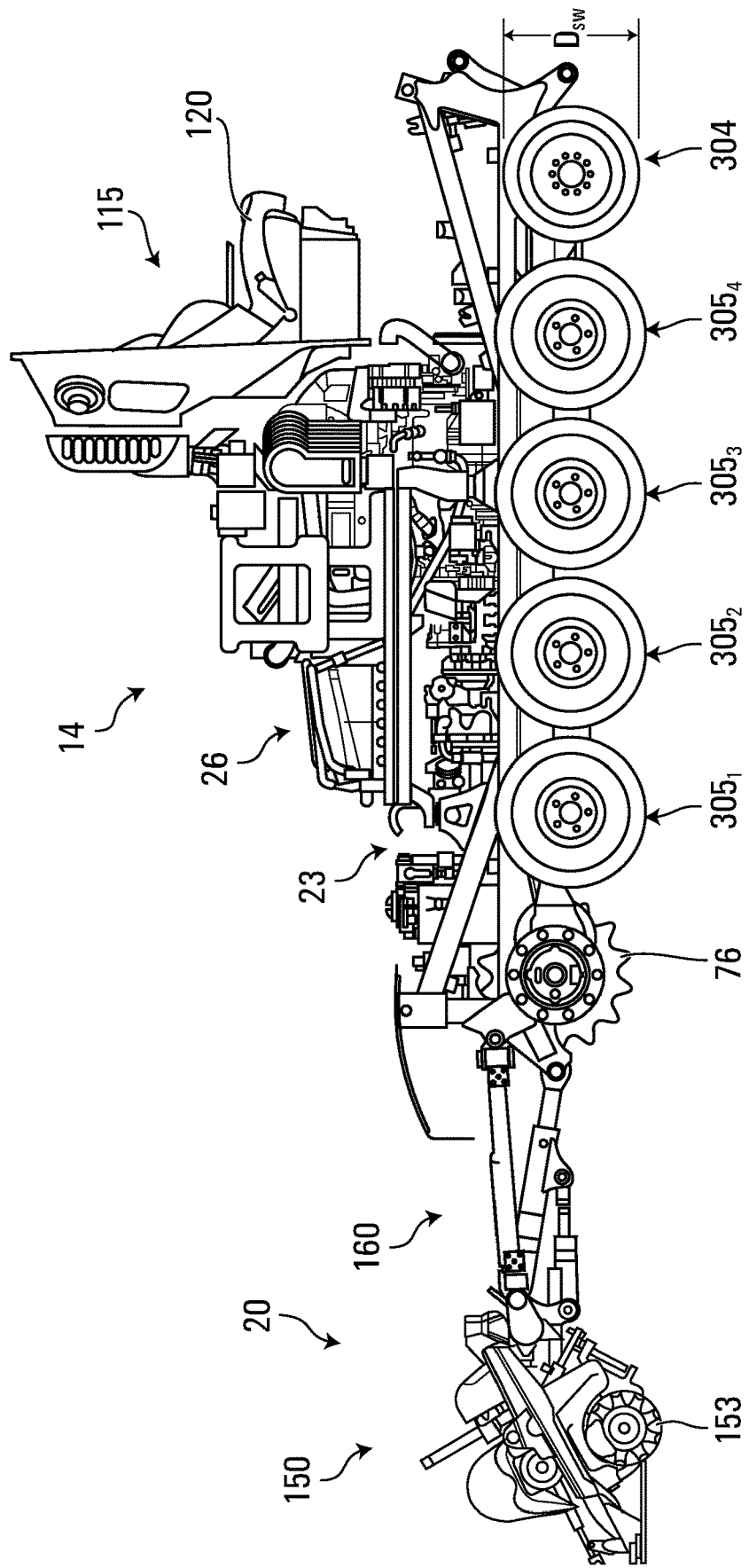
FIG. 4 illustrate a side view of a chassis and attached tiller assembly according to an embodiment of an aspect of the invention.
Figure 5:
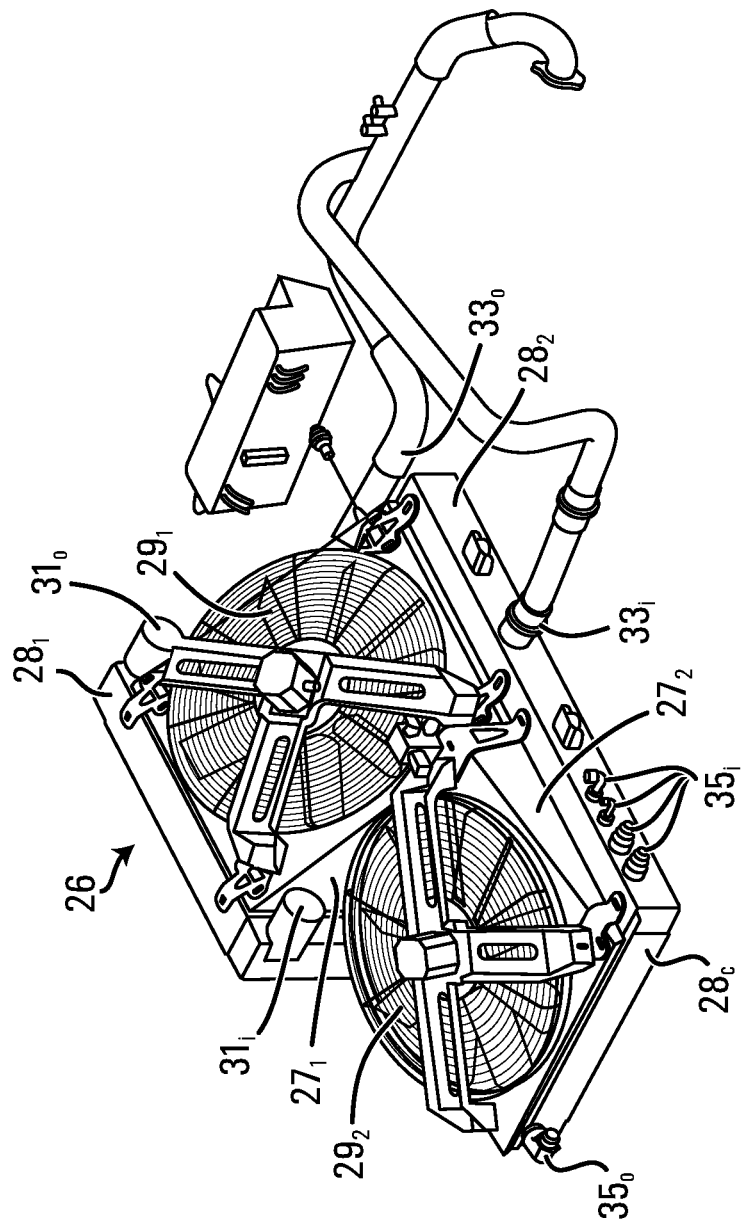
FIG. 5 illustrate a perspective view of a cooling module according to an embodiment of an aspect of the invention.
Figure 6:
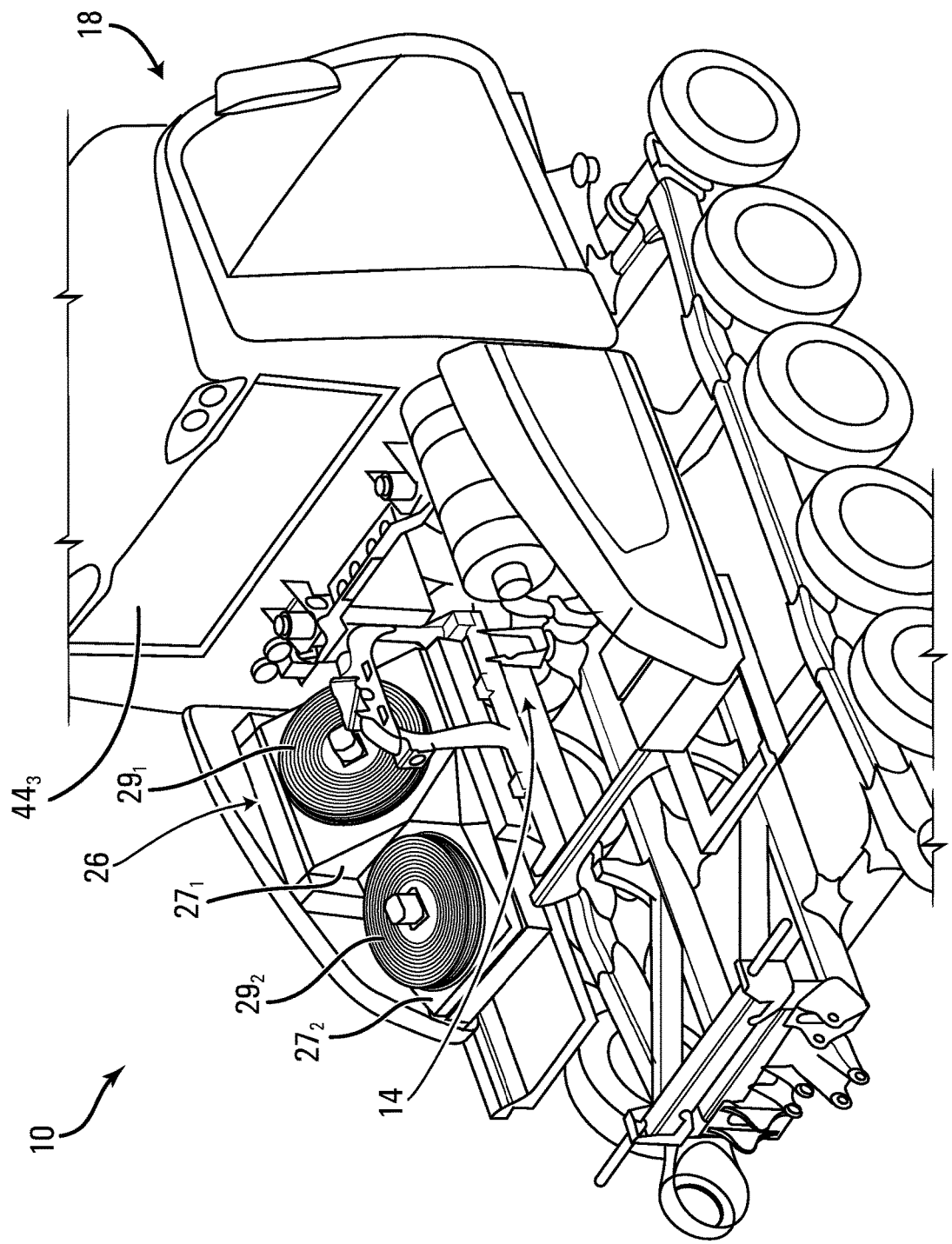
FIG. 6 illustrate a perspective view of a snow groomer with a cooling module according to an embodiment of an aspect of the invention.
Figure 7:
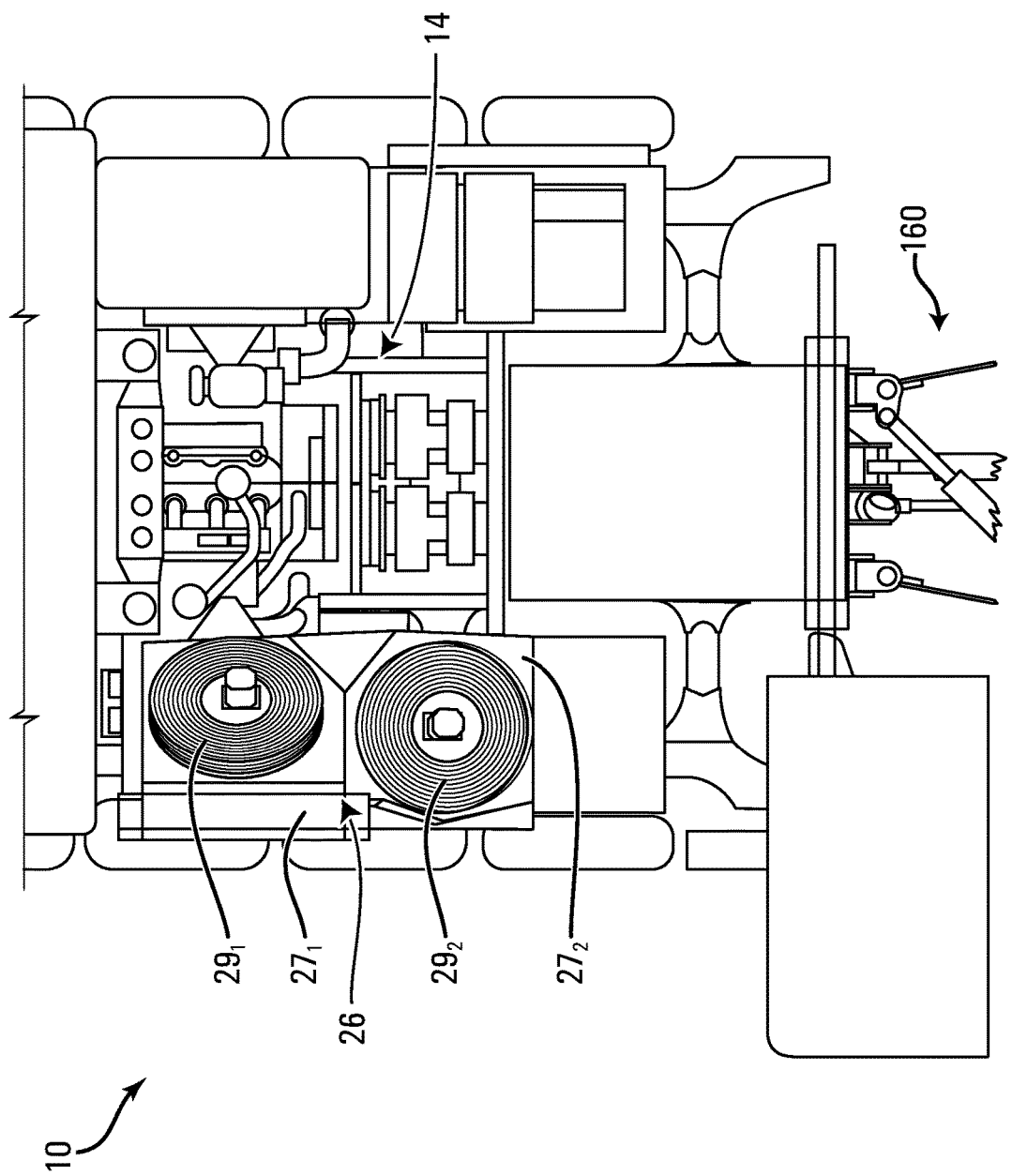
FIG. 7 illustrate a top-down view of a snow groomer with a cooling module according to an embodiment of an aspect of the invention.

With additional reference to FIGS. 3 to 5, in certain embodiments, the snow groomer 10 comprises a chassis 12, a power plant 14, a plurality of (e.g., two) track assemblies $16_1$, $16_2$, a housing 24, and an operator cabin 18 for an operator. The snow groomer 10 has a longitudinal axis 55 defining a longitudinal direction of the snow groomer 10 (i.e., a direction generally parallel to its longitudinal axis 55) and transversal directions (i.e., directions transverse to its longitudinal axis 55), including a widthwise direction (i.e., a lateral direction generally perpendicular to its longitudinal axis 55) and a height direction which is normal to both its longitudinal direction and its widthwise direction.

a) Power Plant

With reference to FIG. 3, the power plant 14 generates power to move the snow groomer 10. To that end, some embodiments of the power plant 14 comprise a prime mover 21 which is a source of motive power that comprises one or more motors (e.g., an internal combustion engine, an electric motor, etc.) for generating motive power to move the snow groomer 10. For example, in some such embodiments, the prime mover 21 comprises an internal combustion engine. In other embodiments, the prime mover 21 may comprise another type of motor (e.g., an electric motor, a nuclear fusion motor, etc.) or a combination of different types of motors (e.g., an internal combustion engine and an electric motor).

In one embodiment, not to be considered limiting, the prime mover 21 includes an internal combustion engine compliant with emissions standards at least as strict as Tier 4, which refers to 40 C.F.R. (United States Code of Federal Regulations) Part 1039. Aspects of the Tier 4 and other emissions standards are also summarized and published by the Environmental Protection Agency at http://www.epa.gov/otag/standards/nonroad/nonro adci.htm, hereby incorporated by reference herein. The prime mover 21 may of course also be compliant with other emissions standards, including possibly more stringent requirements that may arise in the future.

In one embodiment, in addition to being compliant with Tier 4 (T4) emissions standards, the prime mover 21 may include an internal combustion engine capable of producing at least 300 horsepower, possibly up to 350 hp, and possibly even up to 400 horsepower (hp) or more. A suitable but non-limiting example of an internal combustion engine that meets Tier 4 emissions standards and that generates sufficient motive force may be a Cat® C9.3 ACERT™ industrial engine, made by Caterpillar Inc. of Peoria, Ill., USA.

Now with reference to FIG. 4, the power plant 14 is in a driving relationship with each of the track assemblies $16_1$, $16_2$. That is, power derived from the power plant 14 is transmitted to each of the track assemblies $16_1$, $16_2$ via a powertrain in order to drive the track assemblies $16_1$, $16_2$. In this embodiment, power from the power plant 14 is transmitted to the track assemblies $16_1$, $16_2$ via a hydraulic drive system 23. For instance, in an example embodiment, the hydraulic drive system 23 may comprise, for each of the track assemblies $16_1$, $16_2$, a hydraulic pump driven by the prime mover 21 and connected to a hydraulic motor which drives that track assembly. Power from the power plant 14 may be transmitted to the track assemblies $16_1$, $16_2$ in various other ways in other embodiments.

In addition to generating motive power to propel the snow groomer 10, in some embodiments, the power plant 14 may power the work equipment 41 carried by the snow groomer 10. For instance, in some such embodiments, the prime mover 21 may be used to supply power to the work equipment 41, including the blade assembly 19 and the tiller assembly 20. In other embodiments, the power plant 14 may comprise one or more other prime movers (e.g., in addition to the prime mover 21) to supply power to the work equipment 41.

i. Cooling Module

With continued reference to FIG. 3, in some embodiments, the power plant 14 comprises a cooling module 26 for cooling the prime mover 21 and other components of the power plant 14, including, in some such embodiments, the hydraulic drive system 23. Persons skilled in the art will appreciate that one demand on the cooling module 26 is that it provide sufficient heat removal to ensure that the prime mover 21 stays within an operating range of temperatures. This may require greater cooling requirements for engines that comply with increasingly more stringent environmental specifications, because such specifications require that fuel burn at a higher temperature. As such, cooling an engine that produces the same motive power may require greater heat removal capability for a Tier 4 compliant engine than an engine that is not Tier 4 compliant (e.g., one that complies with Tiers 1, 2 and 3 of 40 C.F.R. Part 1039 but not Tier 4).

Accordingly, and more particularly with reference to FIGS. 4 and 5, the cooling module 26 may comprise a plurality of cooling units $28_1$, $28_2$, $28c$ that treat (i.e. cool) different fluids. In some embodiments of the cooling module 26, the cooling units $28_1$, $28_2$, $28_c$ are oriented differently, that is, a given one of the cooling units $28_1$, $28_2$, $28c$ is positioned at an orientation different that the orientation at which another given one of the cooling units $28_1$, 282, $28c$ is positioned. In such embodiments, a first cooling unit $28_1$, for example, may define a nonzero angle (namely a right angle or an oblique angle) relative to another one of the cooling units $282-28c$. This arrangement of the cooling units $28i$, $28_2$, $28_c$ allows the cooling module 26 to be more compact (e.g., occupy a smaller volume) than if all cooling units were aligned side-by-side, for example.

More particularly, in the embodiment depicted in FIGS. 5 through 8A-C, the plurality of cooling unit $28_1$, $28_2$, $28_c$ comprises an air-cooling unit $28_1$, a water-cooling unit $28_2$, and an oil-cooling unit $28c$ that respectively cool air, water and oil used in the power plant 14 and that are oriented differently. For instance, in this example implementation, the air-cooling unit $28_1$ is oriented substantially at a right angle relative to the water- and oil-cooling units $28_2$, $28_c$. In other examples of implementation, the angle defined between differently-oriented ones of the cooling units $28_2$, $28c$ may instead be an oblique angle.

The cooling units $28_1$, $28_2$, $28_c$ comprise inlets and outlets through which their respective fluids enter and exit them via conduits. For example, in this embodiment, the air-cooling unit $28_1$ comprises an inlet 31; and an outlet $31_0$; the water-cooling unit $28_2$ comprises an inlet 33; and an outlet 33; and the oil-cooling unit $28c$ comprises a plurality of inlets 35; and an outlet $35_0$. Different arrangements of inlets and outlets are possible in other embodiments.

In some embodiments, one or more of the cooling units may be configured as a radiator providing a serpentine path for fluid travel, with space between the path through or around which air may pass.

In some embodiments, the fluid traveling through an individual one of the cooling units may define a path along a plane of travel between the respective inlet and outlet of that cooling unit. Thus, when referring to two cooling units being oriented in a certain way with respect to one another, one embodiment envisages that the planes of travel defined by the fluid traveling through the two cooling units be so oriented.

The cooling module 26 may also comprise a plurality of fans $29_1$, $29_2$ to improve a cooling efficiency of the cooling module 26 via forced convection. The fans $29_1$, 292 may each include a blade assembly (comprising one or more blades) which rotate about a respective axis of rotation. A protective grill may be integrated with or may cover the blade assembly. In some embodiments, at least one of the fans is oriented so as to provide forced air circulation over a plurality of cooling units; that is to say, the action of the fans $29_1$ and $29_2$ is generally such that air is drawn up through the cooling units $28_1$, $28_2$, $28c$ and through the fans $29_1$ and $29_2$ (though other embodiments are also considered and discussed later on). More particularly, in this example of implementation, the fan $29_1$ provides forced air circulation over the air-cooling unit $28_1$ and the water-cooling unit $28_2$. In other words, the fan $29_1$ is positioned such that a horizontal projection of the fan $29_1$ falls at least in part onto the air-cooling unit $28_1$ and at least in part onto the water-cooling unit $28_2$. Additionally, the fan $29_2$ provides forced air circulation primarily over the oil-cooling unit $28c$, although if sufficiently angled it may also provide forced air circulation over the water-cooling unit $28_2$ as well. That is to say, the fan $29_2$ is positioned such that a horizontal projection of the fan $29_2$ falls at least in part onto the oil-cooling unit $28_c$ and, depending on the angle, also potentially at least in part onto the water-cooling unit $28_2$. Given the different orientations of the cooling units $28_1$, $28_2$, $28c$, embodiments of the cooling module 26 may have fans $29_1$ and $29_2$ also oriented differently from one another (i.e. fan $29_1$ may define a nonzero angle relative to fan $29_2$).

Fans $29_1$ and $29_2$ may operate at a fixed speed, or at a variable speed; in some embodiments, fans $29_1$ and $29_2$ may vary their speed as a function of the speed of the snow groomer 10, or as a function of temperature readings at one or more areas of the power plant 14 (which may be detected by one or more sensors (not pictured)).

Embodiments of the cooling module 26 also comprise a duct to facilitate the cooling action of cooling units $28_1$, $28_2$, $28c$ by directing or channeling the flow of air over cooling units $28_1$, $28_2$, $28c$ and through fans $29_1$ and $29_2$. In some embodiments, as discussed previously, fans $29_1$ and $29_2$ may pull air through the duct from cooling units $28_1$, $28_2$, $28c$; in other embodiments, fans $29_1$ and $29_2$ may push air through the duct towards cooling units $28_1$, $28_2$, $28c$.

In some embodiments, the duct can be described as being composed of multiple communicating shroud elements $27_1$ and $27_2$ (which may together be referred to as an "enclosure"). In some embodiments, shroud elements $27_1$ and $27_2$ generally comprise a plurality of wall portions arranged in substantively coplanar fashion with the height direction of the snow groomer 10, and are placed substantially between cooling units $28_1$, $28_2$, $28c$ and fans $29_1$ and $29_2$. Some embodiments of shroud elements $27_1$ and $27_2$ may also comprise further wall-like elements that are not necessarily co-planar with the wall portions but are placed at an angle thereto. As such, shroud elements $27_1$ and $27_2$ are positioned so as to substantially surround or encapsulate the cooling units $28_1$, $28_2$, $28c$, and such that fans $29_1$ and $29_2$ rest or are otherwise in close proximity with upper edges of the shroud elements $27_1$ and $27_2$, respectively.

In some further embodiments, the fans $29_1$ and $29_2$ may be configured to alter the directionality of their air flow based on a variety of factors, or may be able to operate in opposite directions from one another.

In some embodiments of the cooling module 26, such as those depicted in FIGS. 4 through 8, the particular positioning of the cooling module 26 (in particular the positioning of fans $29_1$ and $29_2$) may grant an operator of the snow groomer 10 an substantially unobstructed view of the tiller 150 and/or of a point where snow enters the tiller 150 for processing (which may be referred to as the "tiller ingress"). Specifically, in such embodiments, an operator sitting in operator cabin 18 may, by turning their head and/or by rotating their torso, for example, look out a rear window $44_3$ of the operator cabin 18 and have a substantially unobstructed view of the tiller 150 and/or of a point where snow enters the tiller 150 for processing. It is to be understood that due to the low profile of the cooling module 26, the aforementioned view (line of sight from operator cabin to area where snow enters the tiller for processing) may remain unobstructed even when the housing 24 (which may include perforations or a grill) is placed over the cooling module 26 and/or the power plant 14.

Figure 8A:
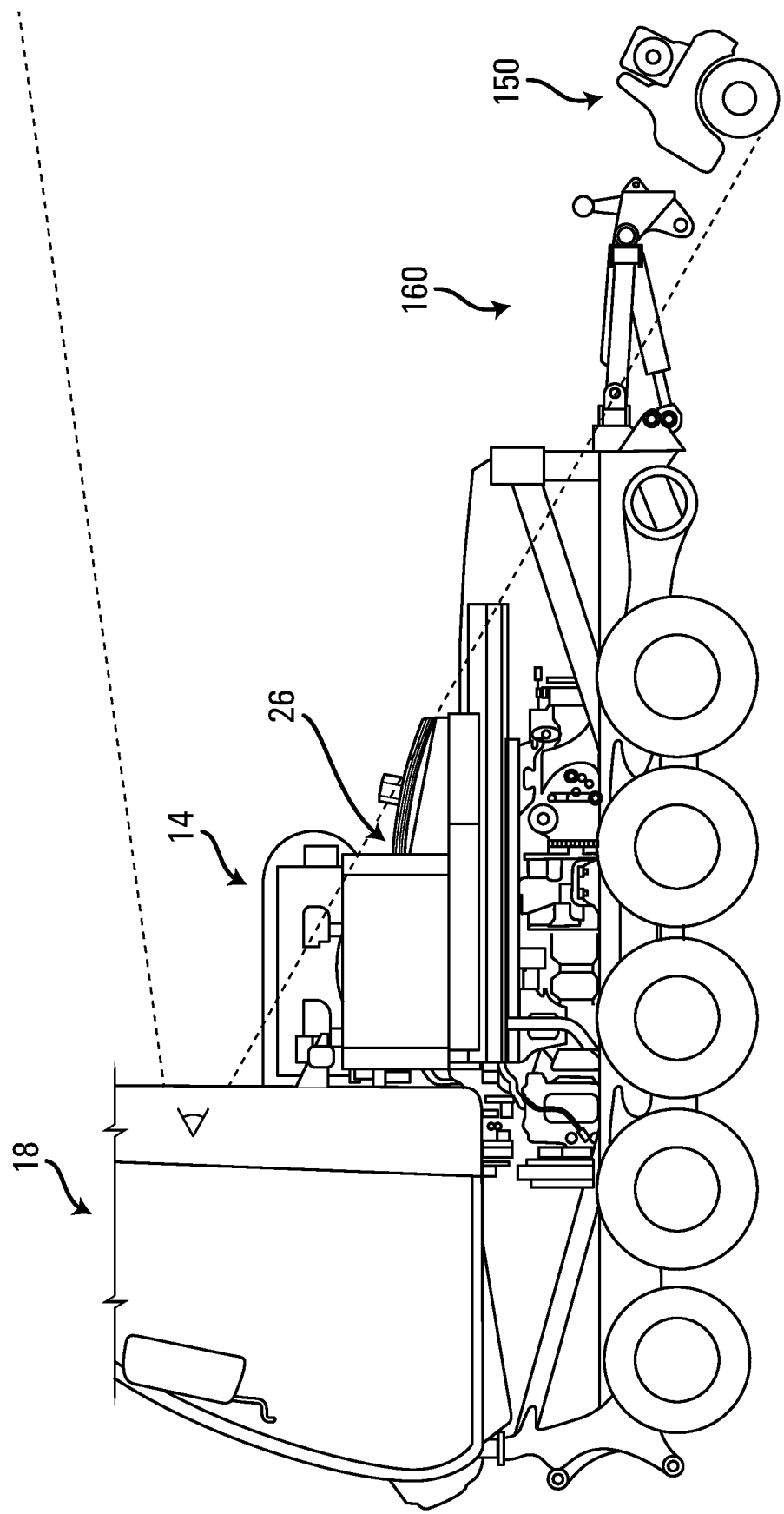
FIG. 8A-C illustrate a side view of a snow groomer with a cooling module according to an embodiment of an aspect of the invention.
Figure 8B:
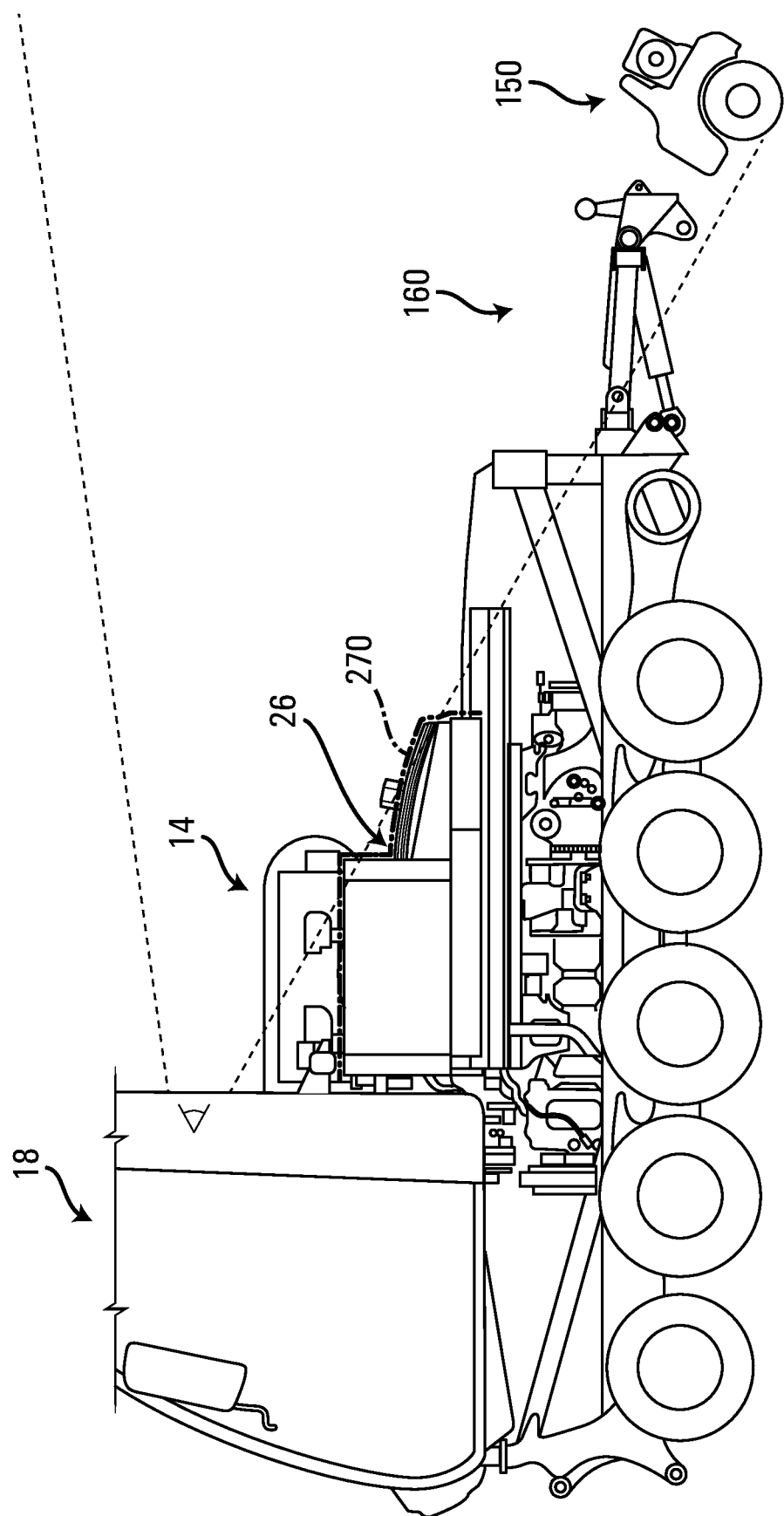

In particular, and with reference to FIG. 8B, it will be appreciated that, viewed from a side of the snow groomer 10, the cooling module 26 has a contour 270 with a height that is tapered towards the rear of the snow groomer 10 so as leave the aforementioned line of sight substantially unobstructed. This may include one or more points along the longitudinal direction of the snow groomer 10 where the height of the contour diminishes substantially.

Figure 8C:
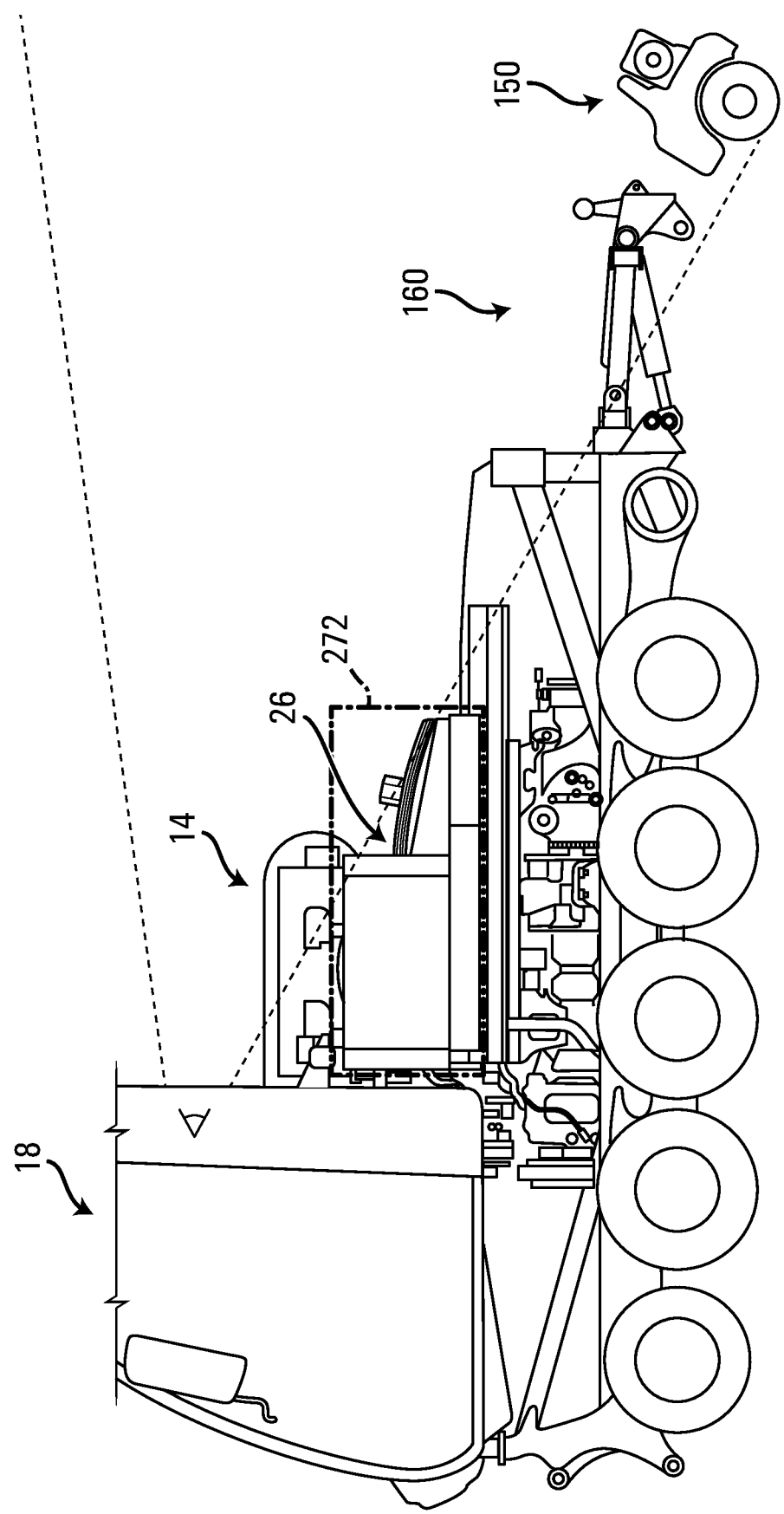

With reference to FIG. 8C, another characterization of the dimensionality of the cooling module 26 involves aspect ratio of an imaginary rectangle 272 associated with the cooling module 26, viewed from a side of the snow groomer 10. The imaginary rectangle 272 can be defined as the rectangle having the smallest height and length dimensions that substantially encapsulates the cooling unit 26 including the cooling units $28_1$, $28_2$, $28c$ and the fans $29_1$ and $29_2$. The aspect ratio of such imaginary rectangle 272 is defined as the ratio of the smaller dimension to the larger dimension, and therefore has a maximum value of when both dimensions are equal (i.e., the rectangle is a square). In accordance with certain embodiments, the cooling module is constructed so that the imaginary rectangle has an aspect ratio of at least 0.4. In accordance with certain embodiments, the cooling module is constructed so that the imaginary rectangle has an aspect ratio of at least 0.7. In accordance with certain embodiments, the cooling module is constructed so that the imaginary rectangle has an aspect ratio of at least 0.9. Aspect ratios between 0.9 and 1 (and also including an aspect ratio of 1.0) are also possible.

In the specific embodiment illustrated in FIGS. 5 through 8A-C, cooling unit $28_1$ is substantially surrounded by shroud element $27_1$, cooling unit $28_2$ is partially surrounded by shroud element $27_1$ and partially suiT•ounded by shroud element $27_2$, and cooling unit $28c$ is substantially surrounded by shroud element $27_2$. Further considering this specific embodiment, shroud element $27_1$ and shroud element $27_2$ communicate with one another, thereby allowing air to flow freely between them. This allows each of fans $29_1$ and $29_2$ to at least somewhat affect the rate of cooling of cooling units cooling units $28_1$, $28_2$, $28c$.

With further consideration of the specific embodiment depicted in FIG. 5, the wall portions of shroud element $27_2$ upon which fan $29_2$ rest define a higher side and a lower side, the higher side being closer to the centre of cooling module 26 than the lower side. This particular configuration of shroud element $27_2$ increases the area defining the connection between shroud elements $27_1$ and $27_2$, thereby improving cooling efficiency over a configuration where the wall portions of shroud element $27_2$ define a generally horizontal surface.

b) Housing

With reference again to FIGS. 1 and 2, the snow groomer 10 may include a housing 24 (which may also be referred to as a "protective cowling") which houses the prime mover 21 and other components of the power plant 14. More particularly, in this embodiment, the housing 24 houses: hydraulic components including each hydraulic pump of the hydraulic drive system 23 and a hydraulic fluid reservoir; the cooling module 26; batteries; components of an exhaust system;

pipes; and cables. Other components of the power plant 14, or many other components of the snow groomer 10, may be housed in the housing 24 in other embodiments.

The housing 24 and the components of the power plant 14 that it covers are mounted on top of the chassis 12 and behind the operator cabin 18. Because the components of the power plant 14 are not located inside the operator cabin 18, the operator cabin 18 need not be shaped to accommodate the power plant 14 and may therefore have a flat floor. In some embodiments, the housing 24 comprises a back portion 25 which covers the cooling module 26 and closely follows a profile of the cooling module 26. As discussed previously, the particular positioning of the cooling module may grant the operator of the snow groomer 10 a substantially unobstructed view of the tiller 150 and/or of a point where the tiller 150 contacts the surface on which the snow groomer 10 is travelling. This field of view is also effected in part by the housing 24, which may closely follow the profile of the cooling module 26, offering this rearwards view (i.e., line of sight) to the operator in the operator cabin 18. For example, the back portion 25 may extend (e.g., be curved) downwards to offer this visibility to the operator.

c) Track Assemblies

With continued reference to FIGS. 1 and 2, the snow groomer 10 comprises track assemblies $16_1$, $16_2$ which are used to propel the snow groomer 10 on the ground. The track assembly $16_1$ is on a first lateral side of the snow groomer 10, while the track assembly $16_2$ is on a second lateral side of the snow groomer 10.

Now with additional reference to FIG. 4, an embodiment is depicted in which each track assembly $16_i$ comprises a plurality of wheels, which includes a drive wheel 76, an idler wheel 304, and a plurality of support wheels $305_1$-$305_4$, and an endless track 300 disposed around the wheels 76, $305_1$-$305_4$. The track assembly $16_i$ has a length $Lt_a$, a width wta, and a height Hta. A longitudinal direction of the track assembly $16_i$ is generally parallel to the longitudinal direction of the snow groomer 10. The track assembly $16_i$ also has transversal directions, including a widthwise direction which is generally parallel to the widthwise direction of the snow groomer 10, and a height direction which is generally parallel to the height direction of the snow groomer 10.

The endless track 300 engages the ground to provide traction. The endless track 300 is disposed around the wheels 76, 304, $305_1$-$305_4$ and includes a top run 301 and a bottom run 302. The top run 301 and the bottom run 302 of the endless track 300 are generally parallel to one another and extend along the longitudinal direction of the snow groomer 10.

In this embodiment, the endless track 300 comprises belts $306_1$-$306_3$ spaced apart to accommodate the wheels 76, 304, $305_1$-$305_4$ and a series of cross-links $310_1$-$310_N$ distributed longitudinally along the track 300 and extending transversally to interconnect the belts $306_1$-$306_3$.

Each belt $306_i$ is elastomeric in that it comprises rubber and/or other elastomeric material. The belt $306_i$ may comprise one or more reinforcements such as a layer of cables embedded in its rubber and/or other elastomeric material. In this case, the belt $306_i$ is made up of a series of belt sections connected to one another. In other cases, the belt $306_i$ may be a one-piece belt.

The cross-links $310_1$-$310_N$ interconnect the belts $306_1$-$306_3$ and interact with the wheels 76, 304, $305_1$-$305_4$ as the endless track 300 moves around these wheels. For example, in this embodiment, as the drive wheel 76 rotates, individual ones of the cross-links $310_1$-$310_N$ engage the drive wheel 76, thereby causing the track 300 to be driven. Also, the cross-links $310_1$-$31$ ON help to guide motion of the track 300 by contacting the support wheels $305_1$-$305_4$. Each cross-link $310i$ comprises an elongated member 315 extending transversally to the longitudinal direction of the endless track 300 to interconnect the belts $306_1$-$306_3$. The elongated member 315 is made of rigid material, in this case metallic material (e.g., steel). The elongated member 315 is secured to the belts $306_1$-$306_3$ by fasteners which extend through the elongated member 315, the belts $306_1$, $306_2$, and backing plates disposed on an inner side 303 of the track 300.

The drive wheel 76 is in a driven relationship with the power plant 14 to impart movement of the endless track 300 in order to propel the snow groomer 10 on the ground. The drive wheel 76 is rotatable about an axis of rotation which is transverse to the longitudinal direction of the snow groomer 10 by power derived from the power plant 14 to impart movement of the endless track 300. In this embodiment, the drive wheel 76, which is located in a rear region of the chassis 12, comprises a sprocket that engages the endless track 300. The drive wheel 76 may be configured in various other ways in other embodiments.

The idler wheel 304 does not convert power derived from the power plant 14 to motive force for movement of the endless track 300, but rather guides the endless track 300 and maintains it under tension as it is driven by the drive wheel 76. The idler wheel 304 is rotatable about an axis of rotation which is transverse to the longitudinal direction of the snow groomer 10. In this embodiment, the idler wheel 304, which is located in a front region of the chassis 12, may comprise a sprocket or any other type of wheel that engages the endless track 300.

The support wheels $305_1$-$305_4$ are arranged in an in-line configuration extending along the longitudinal direction of the snow groomer 10 and roll on the bottom run 302 of the endless track 300 as the snow groomer 10 moves on the ground. The support wheels $305_1$-$305_4$ do not convert power derived from the power plant 14 to motive force for movement of the endless track 300, but rather support and distribute part of a weight of the snow groomer 10 onto the ground via the endless track 300. The support wheels $305_1$-$305_4$ may also maintain the shape and position of the endless track 300, as well as keep the track 300 generally aligned with the general direction of vehicular movement.

Each of the support wheels $305_1$-$305_4$ occupies most of the height $H_{ta}$ of the track assembly $16i$. That is, each of the support wheels 3051-3054 has a diameter Dsw corresponding to at least half, in some cases at least two-thirds, and in some cases at least three-quarters of the height $Ht_a$ of the track assembly $16i$. In this case, the diameter $D_{sw}$ of each of the support wheels $305_1$-$305_4$ corresponds to about 65% of the height $Ht_a$ of the track assembly $16i$. In some embodiments, the diameter $D_{sw}$ of each of the support wheels $305_1$-$305_4$ may be such that the top run 301 of the endless track 300 can contact the support wheels $305_1$-$305_4$ in use. In other embodiments, the support wheels $305_1$-$305_4$ may be made smaller such that there is no contact between the top run 301 of the endless track 300 and the support wheels $305_1$-$305_4$ in use.

The track assembly $16i$ may be configured in various other ways in other embodiments. For example, although the embodiments depicted in the FIG. 4 shows a track assembly $16i$ comprising four (4) support wheels $305_1$-3054, the track assembly $16i$ may comprise more (or fewer) than four support wheels (e.g., five (5) support wheels) in other embodiments. As another example, while in this embodiment the drive wheel 76 is located in a rear region of the chassis 12 and the idler wheel 304 is located in a front region of the chassis 12, this may be reversed in other embodiments such that the drive wheel 76 is located in a front region of the chassis 12 and the idler wheel 304 of the track assembly 16; is located in a rear region of the chassis 12. As yet another example, while in this embodiment the idler wheel 304 is not in a driven relationship with the power plant 14, in other embodiments, the idler wheel 304 may be replaced by another drive wheel that is in a driven relationship with the power plant 14. As yet another example, in some embodiments, the endless track 300 may comprise an elastomeric body and a plurality of cores (e.g., metallic cores) embedded in its elastomeric body, spaced apart along its longitudinal direction, and extending transversally to its longitudinal direction to impart transverse rigidity to the track 300 (e.g., a "metal-embedded rubber track" (MERT)).

d) Operator Cabin

Figure 9:
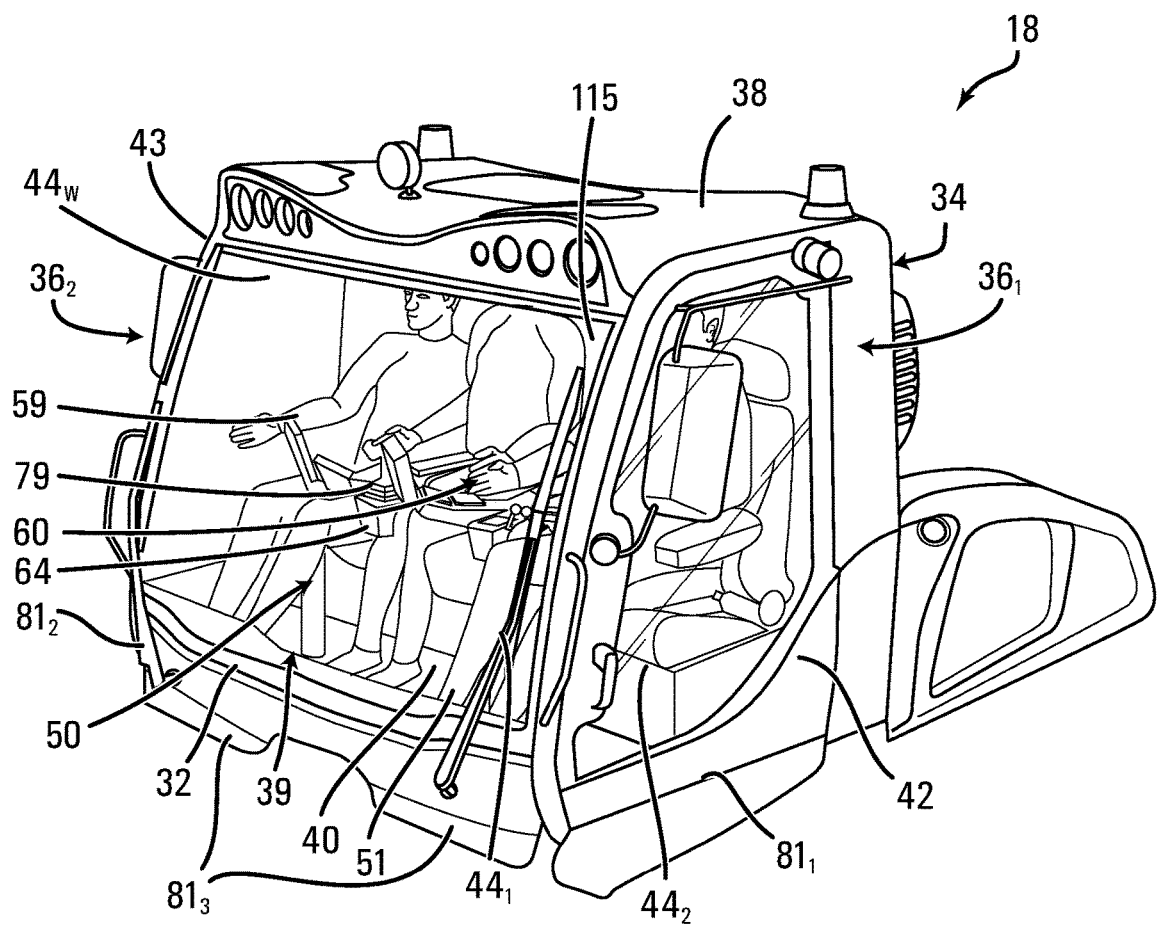
FIG. 9 illustrate a perspective view of an operator cabin of a snow groomer according to an embodiment of an aspect of the invention.

The operator cabin 18 is where the operator sits and controls the snow groomer 10. With reference to FIGS. 1, 2, and 9, some embodiments of the operator cabin 18 comprise a front side 32, a rear side 34, a pair of lateral sides $36_1$, $36_2$, a roof 38, and a floor 40. The lateral side $36_1$ of the operator cabin 18 defines an access opening that can be closed by a door 42 and that allows the operator to enter or exit the operator cabin 18. In a similar manner, the lateral side $36_2$ defines an access opening that can be closed by a door 43, though some embodiments of the snow groomer 10 may feature an operator cabin 18 with only one door, namely one of door 42 and door 43. The floor 40 may be generally flat; that is to say, the floor 40 defines a generally uniform plane which is coplanar with a second plane defined by the ground on which the snow groomer 10 is located. A plurality of windows $44_1$-$44w$ are provided to allow the operator to see outside of the snow groomer 10.

With further reference to FIG. 9, the operator cabin 18 comprises a seating area 50 and a user interface 60. As further discussed later on, in this embodiment, the seating area 50 and the user interface 60 allow the operator to sit in various positions, including different positions in the widthwise direction of the snow groomer 10, which may facilitate tasks performed by the operator with the snow groomer 10.

i. User Interface

The user interface 60 as shown in FIG. 9 enables the operator to interact with and control the snow groomer 10. For example, the user interface 60 comprises controls allowing the operator to move the snow groomer 10 on the ground. In some cases, the user interface 60 may also include controls for controlling the work equipment 41 carried by the snow groomer 10, or for controlling the environmental conditions within the operator cabin 18 (e.g., HVAC (heating, ventilation, air conditioning) system, radio/multimedia controls, etc.). The user interface 60 comprises an input portion to allow the operator to input commands for execution by the snow groomer 10 and an output portion to convey information to the operator.

Figure 10:
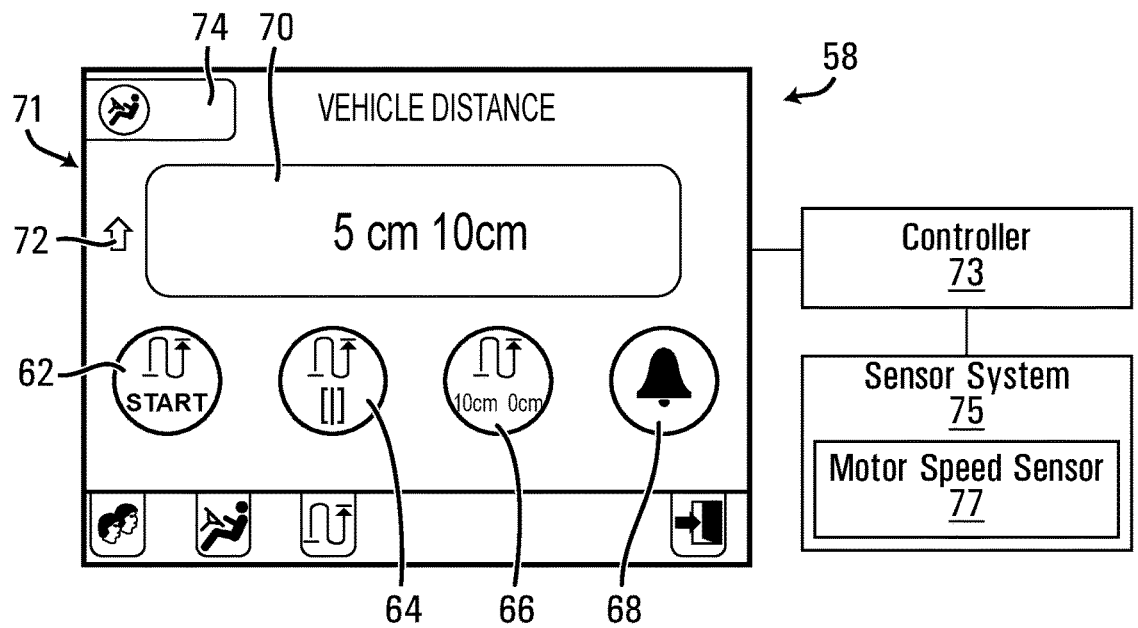
FIG. 10 illustrate an example GUI shown on a display according to an embodiment of an aspect of the invention.
Figure 11:
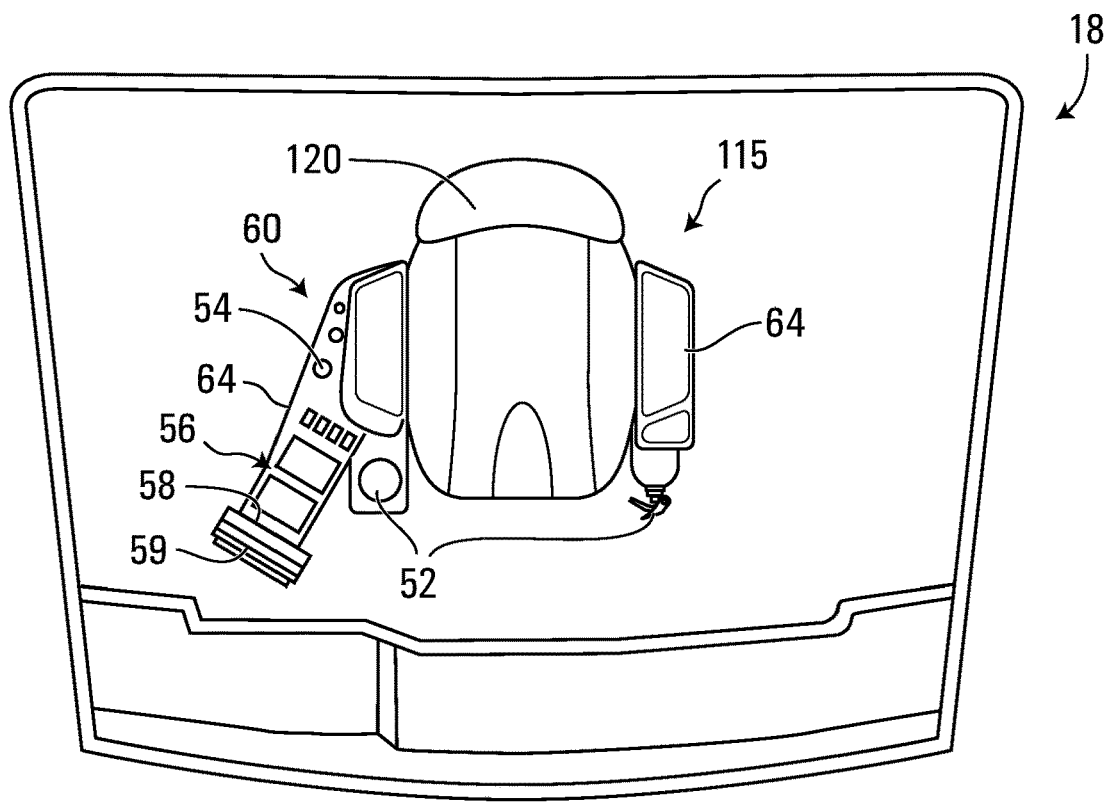
FIGS. 11 and 12 illustrate top-down views of an operator seat with a user interface according to an embodiment of an aspect of the invention.
Figure 12:
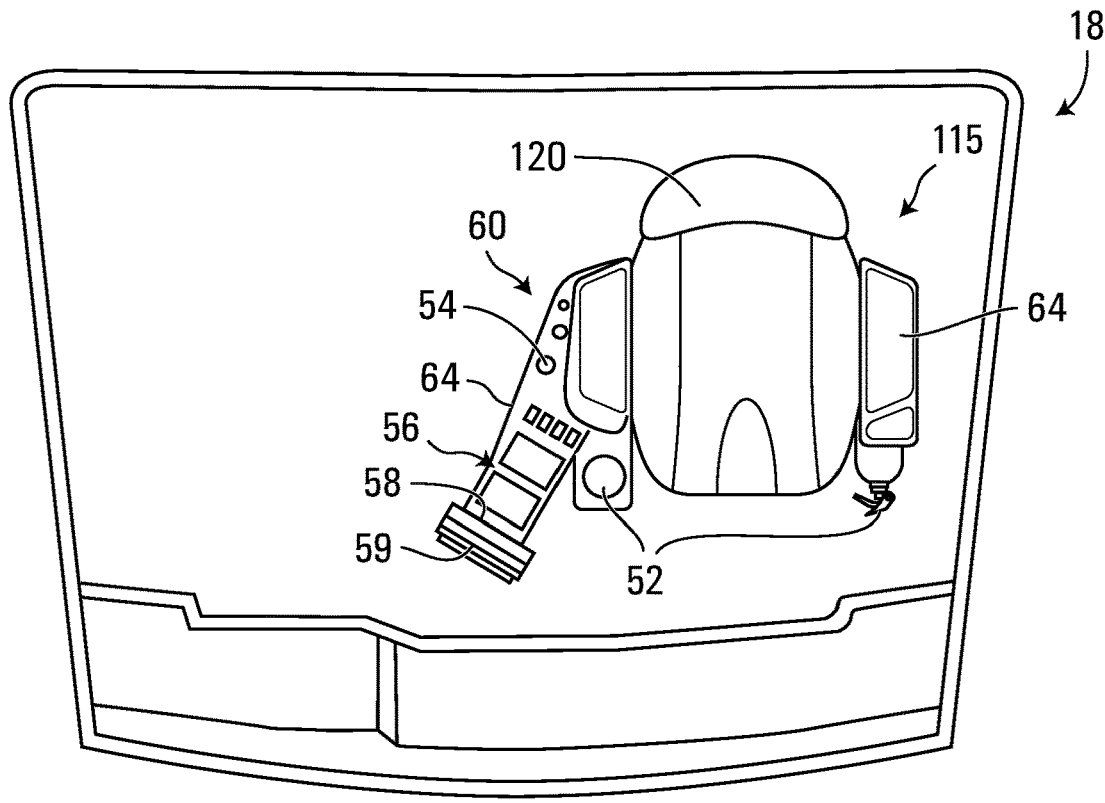

With continuing reference to FIG. 9 and with additional reference to FIGS. 10 through 12, in this embodiment, the input portion of the user interface 60 comprises an accelerator 51, a steering device 52, a transmission state selector 53, a starter switch 54, a control panel 56, and a graphical user interface (GUI) 58. More particularly:

The accelerator 51 allows the operator to control a speed of the snow groomer 10 on the ground. In this example, the accelerator 51 comprises a speed pedal operated by a foot of the operator. The accelerator 51 may be implemented in other ways in other examples (e.g., a hand-operated accelerator). In some embodiments, the accelerator 51 may control only forward motion of the snow groomer 10. It is also envisaged that in some embodiments, the accelerator 51 may also selectively control forward or reverse motion of the snow groomer 10. The input portion of the user interface 60 may also include a brake pedal (not pictured) which may restrict the forward or reverse motion of the snow groomer 10, or may selectively restrict either of the forward or reverse motion of the snow groomer 10.

The steering device 52 allows the operator to steer the snow groomer 10 on the ground. In this example, the steering device 52 comprises a joystick. The steering device 52 may be implemented in other ways in other embodiments (e.g., may comprise a steering wheel).

The transmission state selector 53 allows the operator to control a state of power transmission to the track assemblies $16_1$, $16_2$. For instance, in some embodiments, the transmission state selector 53 may comprise a proportional front-neutral-reverse selector to control whether power is transmitted to the track assemblies $16_1$, $16_2$ to move in a forward or reverse direction or not transmitted to the track assemblies $16_1$, $16_2$. The transmission state selector 53 may be implemented in other ways in other embodiments.

The starter switch 54 allows the operator to start the prime mover 21 of the snow groomer 10. For instance, in this example, the starter switch 54 may comprise a key-receiving unit to receive a key to start the prime mover 21 of the snow groomer 10. The starter switch 54 may be implemented in other ways in other embodiments (e.g., a start button, a code entry device, a biometric authentication device, etc.).

The control panel 56 allows the operator to control various devices of the snow groomer 10. For instance, in this example, the control panel 56 includes: equipment controls for operating the work equipment 41, including the blade assembly 19 and the tiller assembly 20; a wiper control which allows the operator to control a wiper system 39 (described later) of the front window $44_1$ of the operator cabin 18; a washer fluid control which allows the operator to control outflow of washer fluid from a washer fluid nozzle onto the front window $44_1$; and a turning indicator control which allows the operator to control a turning indicator of the snow groomer 10. The control panel 56 may include any other suitable control in other examples. In certain embodiments, these controls may be implemented by way of switches, levers, knobs, and the like.

The GUI 58 may include one or more graphical controls (e.g., buttons, slide bars, etc.) to input infottnation or commands into the snow groomer 10. To that end, in this embodiment, the GUI 58 is implemented on a display 59 which allows the operator to operate certain features of the snow groomer 10. Display 59 typically comprises a touchscreen for obtaining input from an operator of the snow groomer 10, though certain embodiments may provide a screen which is incapable of receiving touch-based input. In such embodiments, the GUI 58 may be operable to receive input via different means, such as a pointing device (mouse, joystick, trackball, etc.) or any other appropriate means. In certain embodiments, control of some of the functionality of the snow groomer 10 controlled by other elements of the user interface 60 (including the accelerator 51, the steering device 52, the transmission state selector 53, the starter switch 54, and the control panel 56) may instead or additionally be implemented in whole or in part through the GUI 58.

The input portion of the user interface 60 may comprise any other input device (e.g., a set of buttons, a trackball, a pointing device, a touchscreen, a voice command recognition module, etc.) in other embodiments.

In this embodiment, and as discussed previously, the output portion of the user interface 60 comprises the display 59, which visually conveys information to the operator and implements the GUI 58. The display 59 may be any suitable type of electronic display (e.g., a liquid-crystal display (LCD), etc.). Various information can be conveyed to the operator on the display 59. For example, in some embodiments, the display 59 may implement an instrument panel that provides: a speedometer indicator which conveys information indicative of the speed at which the snow groomer 10 is moving as measured by a speedometer of the snow groomer 10; a tachometer indicator which conveys information indicative of the speed at which the prime mover 21 is running as measured by a tachometer of the snow groomer 10; an odometer indicator which conveys information indicative of a distance traveled by the snow groomer 10 as measured by an odometer of the snow groomer 10; a fuel gauge indicator which conveys information indicative of a quantity of fuel remaining in the snow groomer 10; and/or any other indicator conveying information to the operator. The display 59 may also provide information about the environmental conditions inside or outside the snow groomer 10, such as temperature, humidity, wind direction and strength, etc., or other information, such as altitude. Each of the speedometer indicator, the tachometer indicator, the odometer indicator, and/or other indicators may comprise a digital numerical reading, a digital dial, a digital bar graph, a digital symbol, and/or any other element displayable on the display 59 to convey information to the operator.

The output portion of the user interface 60 may comprise any other output device (e.g., one or more mechanical dials (e.g., a speedometer dial, a fuel gauge dial, etc.) or other mechanical indicators (e.g., a mechanical odometer); one or more light indicators (e.g., low fuel light indicator, etc.); a speaker; etc.) in other embodiments.

In this embodiment, with additional reference to FIG. 10, the user interface 60 comprises a distance measurer 71 allowing the operator to measure a distance travelled by the snow groomer 10 between selected points (e.g., a particular distance along a ski slope or trail, a length of a jump in a snow park, etc.). For example, the operator of the snow groomer 10 wishing to travel a total of 500 meters may make use of the distance measurer 71 to accurately gauge when 500 meters have been travelled.

More particularly, in this embodiment, the distance measurer 71 is implemented by the GUI 58. To that end, in this embodiment, the GUI 58 comprises a start/stop button 62, a reset button 64, a distance set button 66, a buzzer button 68, a distance display 70, a movement indicator 72, and mode indicators 74. The distance set button 66 allows the operator to input a selected distance so as to initiate a countdown-type travel mode. The selected distance input by the operator is then displayed on the distance display 70. As the snow groomer 10 starts moving, the distance displayed on the distance display 70 begins decreasing accordingly to show how much distance is left to travel to attain the selected distance. The operator further has the option to use a buzzer to signal when the selected distance has been travelled, or when the remaining distance to be traveled by the snow groomer 10 is below a certain threshold; this option is toggled on or off via the buzzer button 68. In some embodiments, the GUI 58 may display a visual cue instead of, or in addition to, the aforementioned buzzer. The start/stop button 62 is used to pause and resume the distance measurer 71. This allows the operator to move the snow groomer 10 without affecting the distance recorded and indicated on the distance display 70. As such, the start/stop button 62 first displays "STOP" when the distance measurer 71 is activated. Once the start/stop button 62 has been activated to pause the distance measurer 71, the start/stop button 62 then displays "START" and may be selected to resume the operation of the distance measurer 71. In addition, the reset button 64 allows the operator to reset the distance measured after the activation of the distance measurer 71. Also, in this embodiment, the movement indicator 72 conveys to the operator if the snow groomer 10 is currently moving by, for example, turning green when moving and red when stopped. The mode indicators 74 at the top of the GUI 58 indicate which mode is currently in use.

The distance measurer 71 is operable via a controller 73 which receives input signals from the GUI 58 and a sensor system 75 allowing measurements of distances travelled by the snow groomer 10 to be made. In this embodiment, the sensor system 75 comprises a motor speed sensor 77. In this embodiment, the motor speed sensor 77 is operable to count a number of revolutions of the drive sprocket 76 of a given track assembly 16$i$ of the track assemblies 16$_1$, 162, though in other embodiments the sensor system 75 may measure the rotational movement of one or more motors of the snow groomer 10. This information is sent to the controller 73 which generates a distance value based on the number of revolutions made by the drive sprocket 76; in some embodiments, this information may be sent in a substantively continuous fashion. For example, this may be done by taking into account the diameter of the drive sprocket 76 and/or other parameters of the track assembly 16$i$, or any other suitable factor for determining the distance travelled. The controller 73 also provides an output signal to the GUI 58 to display infoimation to the operator of the snow groomer 10.

The distance measurer 71 may be operable in various other ways in other embodiments. For example, in other embodiments, the distance display 70 may not display the selected distance input by the operator initially but may rather start at zero and increase according to the distance travelled by the snow groomer 10. Thus, in that case, the distance display 70 would display the distance travelled by the snow groomer 10 since the activation of the distance measurer 71, i.e., a "progressive counter" approach (instead of a countdown-type approach). Some embodiments may display both the distance traveled and the remaining distance to be traveled separately.

The user interface 60 is connected to other components of the snow groomer 10 to cause execution of commands provided by the operator and to present information to the operator. More particularly, in this embodiment, there are a plurality of connections between the user interface 60 and other components of the snow groomer 10. These connections may comprise one or more mechanical links, wires, cables, wireless links, and/or other connecting elements depending on how the user interface 60 is connected to other components of the snow groomer 10 (e.g., via mechanical control systems and/or via electromechanical systems (e.g., "drive-by-wire" systems)). For instance, in this embodiment:

a connection between the speed pedal 51 and the prime mover 21 may comprise a wire connected to a pedal position sensor (e.g., comprising a potentiometer) for sensing a position of the speed pedal and transmitting a signal indicative of this position to a powertrain controller controlling the prime mover 21 (e.g., an engine control unit (ECU)). In other embodiments, this connection may comprise a mechanical link between the speed pedal and a throttle for the prime mover 21;

a connection between the steering device 52 and a steering system, which controls a steering direction of the snow groomer 10 by controlling the hydraulic motors of the hydraulic drive system 23 to cause the endless track 22 of one of the track assemblies $16_1$, $16_2$ to move faster than the endless track 22 of the other one of the track assemblies $16_1$, $16_2$ when the vehicle 10 turns, may comprise a wire connected to a steering device angle sensor for sensing an angle in which the steering device 52 is positioned and transmitting a signal indicative of this angle to a steering controller controlling the steering system;

connections between the control panel 56 and the GUI 58 on the display 59 and the work equipment 41, the wiper system 36, the washer fluid nozzle, the turning indicator and/or any other device of the snow groomer 10 which can be controlled via inputs the control panel 56 and/or the GUI 58 may comprise wires between the control panel 56 and the display 59 and one or more controllers of the snow groomer 10 which sends signals to these devices of the snow groomer 10 to control these devices. In other embodiments, the connections may comprise wires directly connected to these devices;

etc.

Controllers of the snow groomer 10, such as a powertrain controller (e.g., an engine control unit (ECU)), a steering controller, an outside functionality controller, the controller 73 for the distance measurer 71, and/or any other controller mentioned herein, with which the user interface 60 may interact may be implemented in various manners. A controller comprises suitable hardware and/or software (e.g., firmware) implementing: an interface for receiving and transmitting signals to other components of the snow groomer 10 to which it is connected; a processing portion comprising one or more processors for performing processing operations, where a processor may be a general-purpose processor or microprocessor executing program code stored in the controller or a specific-purpose processor comprising one or more preprogrammed hardware or firmware elements (e.g., application-specific integrated circuits (ASICs), electrically erasable programmable read-only memories (EEPROMs), etc.); and a memory portion comprising one or more memories for storing program code executed by the processing portion and/or data used during operation of the processing portion, where a memory may be a semiconductor memory (e.g., read-only memory (ROM) and/or random-access memory (RAM)), a magnetic storage medium, an optical storage medium, and/or any other suitable type of memory. In some embodiments, two (2) or more (e.g., all) controllers of the snow groomer 10 may be physically distinct from one another and may be connected to one another via a bus (e.g., a controller-area network (CAN) bus or other suitable bus). In other embodiments, two (2) or more (e.g., all) controllers of the snow groomer 10 may be functional entities of a single physical control unit (e.g., a vehicle controller).

ii. Seating Area

With continued reference to FIG. 9 and with additional reference to FIGS. 11 and 12, embodiments of the seating area 50 of the operator cabin 18 may comprise a first seat apparatus 115 comprising an operator seat 120 for the operator of the snow groomer 10 to sit on and a seat motion system 100 (not pictured) for moving the operator seat 120. The seat motion system 100 is described in greater detail below.

The seat apparatus 115 is positioned relative to the user interface 60 to allow the operator to easily interact with the user interface 60. In embodiments of the user interface 60 such as those depicted in FIGS. 9, 11, and 12, part of or the entire user interface 60 may be built-into or otherwise positioned on or in close proximity to armrests 64, which may be mechanically coupled or attached to the operator seat 120. Some embodiments of the seat apparatus 115 may also include armrest attachments which are attached to the armrests 64, and part of the user interface 60 may be built-into or otherwise positioned on or in close proximity to the armrest attachments. In other embodiments, the user interface may in part or in whole be positioned elsewhere throughout the operator cabin 18.

Certain embodiments of the seating area 50 may include additional seats in addition to seating apparatus 115. With reference to FIGS. 13A to 13C, a variety of configurations $50_1$-$50_3$ of the operator cabin 18 are realizable, and may include a variety of seats. Specifically, configuration $50_1$ (hereinafter sometimes referred to as the "flexible" configuration) may include the seat apparatus 115 which, in this embodiment, comprises the seat motion system 100, and may further include a so-called "buddy seat" (which may be referred to as the "emergency seat") 117. In this configuration, seat apparatus 115 may be place substantively in the centre of the operator cabin 18, and buddy seat 117 may be placed to the right of seat apparatus 115 (when viewed from inside the operator cabin 18 looking out window $44_r$). In contrast, configurations $50_2$ and $50_3$ include three seats: the seat apparatus 115, the buddy seat 117 and a passenger seat 119. In configuration $50_2$ (the centre configuration), the seat apparatus 115 is positioned substantively in the centre of the operator cabin 18, with the buddy seat 117 positioned to the right of the seat apparatus 115 and the passenger seat 119 positioned to the left of the seat apparatus 115 (when viewed from inside the cabin facing out window $44_w$); in configuration $50_3$ (the left configuration), the buddy seat 117 is positioned substantively in the centre of the operator cabin 18, with the passenger seat 119 positioned to the right of the buddy seat 117 and the seat apparatus 115 positioned to the left of the buddy seat 117 (when viewed from inside the cabin facing out window $44_w$). Other configurations of the operator cabin 18 may also be possible.

The operator seat 120, as discussed previously, may comprise armrests 64 on one or both sides of the operator seat 120. In embodiments where the operator seat comprises two armrests 64, part of or the entire user interface 60 may be built into only one of the armrests 64; alternatively, each one of the armrests 64 may include a portion of the user interface 60. The operator seat 120 may also include a headrest, a seatbelt, and various controls for operating the inclination and/or positioning of the seating apparatus 115 (discussed in further detail later).

The passenger seat 119 shown in embodiments $50_2$ and $50_3$ of the seating area 50 may be substantially the same size as operator seat 120, and may include substantively similar ergonomics as the operator seat 120, including a headrest, armrests (though typically foregoing much or all of the user interface 60), a seatbelt, and may allow for adjustment, providing controls for effecting said adjustment.

However, the buddy seat 117 shown in embodiments $50_1$-$50_3$ of the seating area 50 is a seat that is generally smaller than the operator seat 120 or the passenger seat 119, in that it has a smaller seating area. It may also be lower than the operator seat 120 or the passenger seat 119, might lack armrests, and might be not adjustable. In some embodiments, it also lacks a backrest, a headrest and/or a seatbelt, while in other embodiments such elements may be part of the buddy seat 117.

A process for customizing the operator cabin 18, and more specifically the seating area 50, may include a step of re-arranging or changing the position of the seats within the seating area 50 from a predetermined seat configuration. More specifically, certain embodiments of a process for customizing operator cabin 18 include a step of providing an operator cabin with a predetermined cabin seat configuration. This predetermined seat configuration may be configuration $50_1$, $50_2$ or $50_3$, or any other configuration of seating area 50.

It is noted that customizing the operator cabin may be the result of a request for a specific cabin configuration, such as may be received from a customer. Thus, the predetermined seat configuration may be different from a configuration requested by a customer. If the predetermined configuration is a configuration different from the configuration requested by a customer, the customization process may include a step where the position of the seats (originally in the predetermined configuration) is changed within the operator cabin 18 so as to define a new configuration, such as a configuration requested by a customer. In order to change the seat configuration from configuration a predetermined configuration to another configuration, such as a configuration requested by a customer, any number of the seats in the operator cabin 18 may first be detached or otherwise removed from the operator cabin 18. Then, any number of the removed seats may be fastened within the operator cabin 18 in positions so as to define a new configuration, such as a configuration requested by a customer. This may include, for example, removing the operator seat 120 from a central position in the operator cabin 18 and fastening the operator 120 to a lateral position in the operator cabin, or vice-versa. Similar steps may be taken for any other seats to be removed and fastened to the operator cabin 18.

iii. Seat Motion System

In some embodiments, and with further reference to FIGS. 14A, 14B, 15A, 15B, and 15C, using the seat motion system 100, the operator seat 120 may be moveable in the widthwise direction of the snow groomer 10 (i.e., a direction transverse to the direction of motion of the snow groomer 10) without any movement in the longitudinal direction of the snow groomer 10. In other embodiments, the operator seat 120 may be movable along a predetermined oblique path that has a component along the widthwise direction of the snow groomer 10 and a component along the longitudinal direction of the snow groomer 10. In yet other embodiments, the operator seat 120 is independently movable both in the widthwise direction of the snow groomer 10 and in the longitudinal direction of the snow groomer 10. This may provide the operator with an even greater range of movement which may be useful in maintaining ergonomic aspects.

The seat motion system 100 may be present in a variety of configurations of the operator cabin 18, including at least some of the configurations $50_1$-$50_3$. More specifically, embodiments of the operator cabin comprising two seats (including the aforementioned "flexible" configuration $50_1$) may also comprise the seat motion system 100 for allowing the operator seat 120 to be movable. Embodiments of the operator cabin comprising only one seat, namely seat apparatus 115, may also comprise the seat motion system 100. Other configurations of the operator cabin 18 comprising a plurality of seats and at least one seat motion system 100 are also envisaged.

Figure 15A:
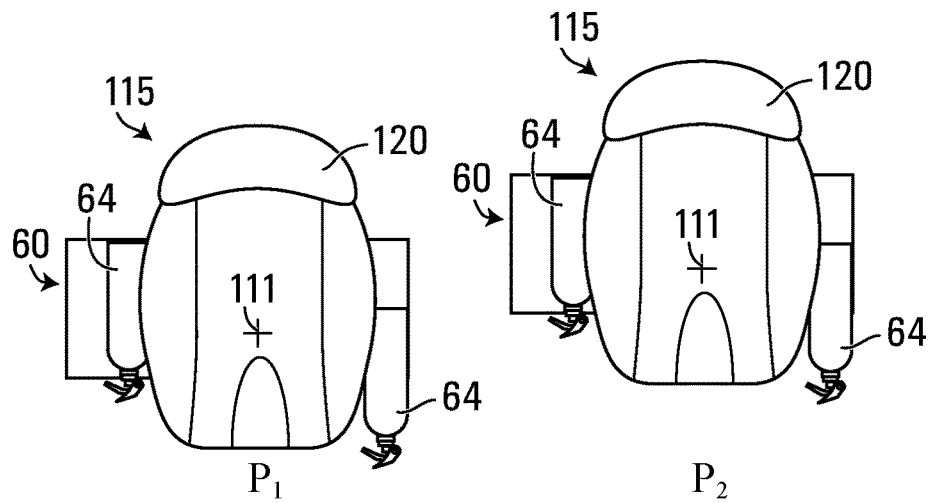
FIGS. 15A-C illustrate top-down views of a seating apparatus showing different possible positions according to an embodiment of an aspect of the invention.
Figure 15B:
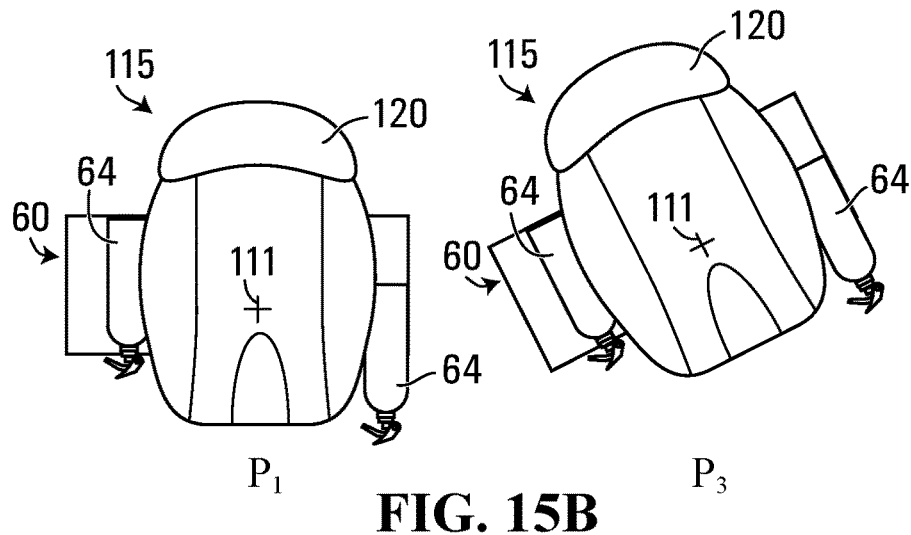
Figure 15C:
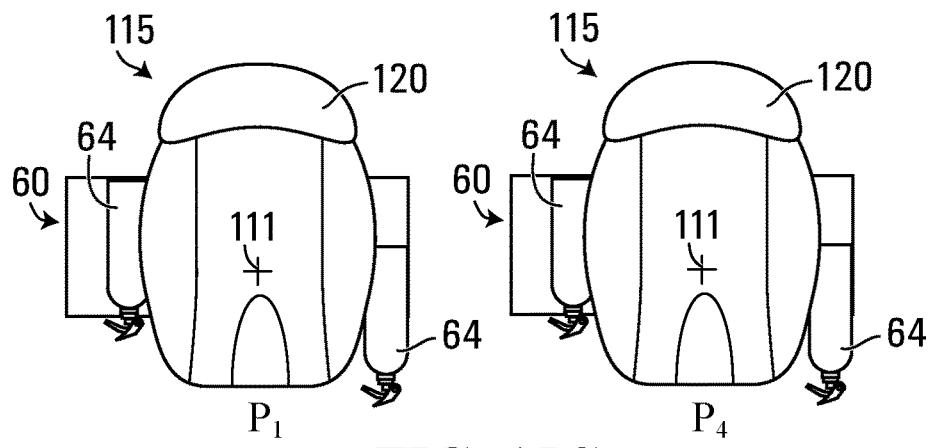

In addition, and with further reference to FIGS. 15A-C, in some embodiments, the operator seat 120 is pivotable about a pivot axis 111 extending through the operator seat 120, allowing the operator seat 120 to swivel. For example, as shown in FIG. 15A, the operator seat 120 may be in a first position Pi within the operator cabin 18 in the longitudinal direction and the widthwise direction of the snow groomer 10 in one instance and may be moved to a different position P2 within the operator cabin 18 in the longitudinal direction and the widthwise direction of the snow groomer 10 in another instance. Additionally, as shown in FIG. 15B, the operator seat 120 may also be pivoted about its pivot axis 111 to face a different direction within the operator cabin 18 as in position P3. The angular range of pivoting may be the same in positions $P_i$ and P2, or it may be more restricted in one position than in another. In some embodiments of the operator cabin, the operator seat 120 may be movable in only the widthwise direction, as shown in FIG. 15C, for example from a position $P_1$ to a position P4.

The transverse displacement of the operator seat 120 may allow the operator of the snow groomer 10 sitting on the operator seat 120 to have a better view (i.e., a better field of vision) of their surroundings to properly gauge the environment. For example, the seating apparatus 115 may allow the operator of the snow groomer 10 to displace the operator seat 120 closer to a lateral side of the operator cabin 18 to have a better view of a region next to that lateral side (e.g., the top of a half-pipe that the snow groomer 10 is grooming). Also, at the same time, the seating apparatus 115 allows pivoting of the operator seat 120 in order to orientate the operator's body towards the lateral side of the snow groomer 10 and/or towards the rear of the snow groomer 10. The functionality provided by the seating apparatus 115 may facilitate the operator's task and/or may prevent unnecessary strain for the operator in order to correctly position his/her body to get a desired or optimal view. Functionality might thus be improved as a result of the capability to both translate (along the widthwise direction of the snow groomer) the operator seat 120 to a desired transverse position and swivel the operator seat 120 in use.

In this non-limiting embodiment, the seat motion system 100 comprises a carriage 80 configured for receiving and carrying a base of the operator seat 120. The carriage 80 interfaces with a transversal motion system 110 in order to transversally move the operator seat 120. In addition to interfacing with the transversal motion system 110, the carriage 80 interfaces with a pivot system 112 in order to pivot the operator seat 120. As such, to allow both transversal and pivoting motion, the carriage 80 may comprise a top surface 82 for interfacing with the pivot system 112 and two side walls $84_1$, $84_2$ for interfacing with the transversal motion system 110.

In this example, the transversal motion system 110 comprises a base 90. The transversal motion system 110 allows the carriage 80 to move translationally relative to the base 90 including in a direction transverse to a direction of forward movement of the snow groomer. In some embodiments, it can be said that the carriage 80 can occupy a plurality (or range) of potential positions along a direction transverse to the direction of forward movement of the snow groomer. In particular, in this non-limiting embodiment, the transversal motion system 110 comprises a set of sliding guides $92_1$, $92_2$ mounted in both front and back regions of the base 90. The sliding guides $92_1$, $92_2$ include recesses 94 configured for interfacing with the side walls $84_1$, $84_2$ of the carriage 80 to guide the side walls $84_1$, $842$. The recesses 94 may have any suitable configuration (e.g., a dovetail configuration or any other configuration). In this embodiment, the sliding guides $92_1$, $922$ are made of metallic material (e.g., stainless steel).

The sliding guides $92_1$, $92_2$ may be made of polymeric materials or any other suitable material in other embodiments.

Figure 14A:
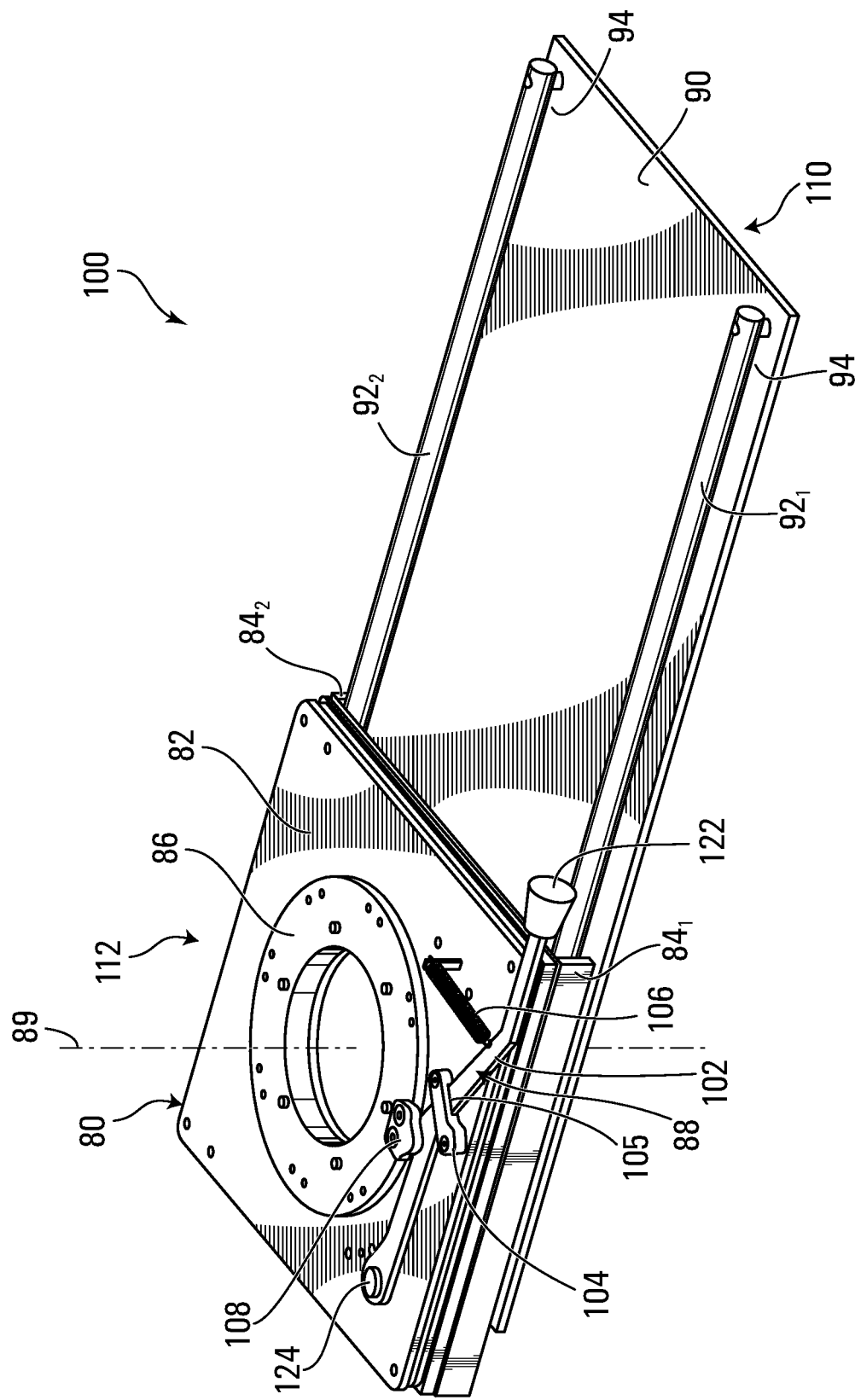
FIGS. 14A-B illustrate perspective views of a seat motion system according to an embodiment of an aspect of the invention.
Figure 14B:
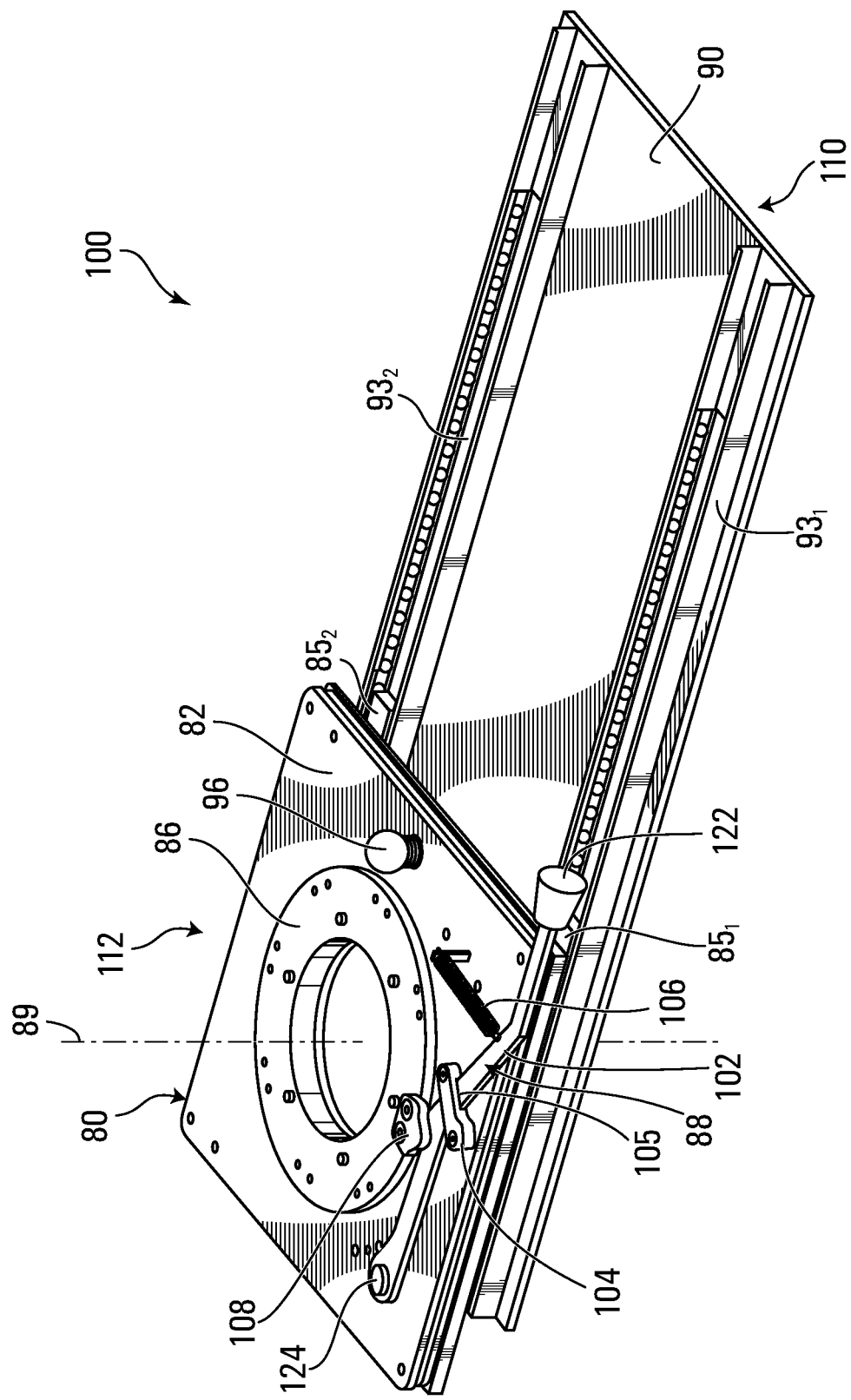

In another embodiment of the transversal motion system, the carriage 80 may eschew the two side walls $84_1$, 842 and instead further comprise guiding elements $85_1$, $85_2$, as pictured in FIG. 14B. Guiding elements $85_1$, $85_2$ are attached to a bottom surface of the carriage 80 and have a length roughly equal to that of a length of the carriage 80. In some embodiments, the length of the guiding elements $85_1$, 852 is somewhat less than the length of the carriage 80, whereas in others, it is significantly less. The guiding elements $85_1$, $85_2$ have a cross-section which may be generally rectangular, or it may be any other shape suitable to the proper operation of the carriage 80. The positioning of the guiding elements $85_1$, $85_2$ is such that the guiding elements $85_1$, $85_2$ are generally closer to edges of the carriage 80 than to a centre point of the carriage 80, and are aligned parallel to the direction of motion of the carriage 80.

In this second embodiment, the base 90 comprises a pair of tracks $93_1$, $93_2$ which are mounted substantively similar fashion as the sliding guides $92_1$, $92_2$. The tracks 931, 932 are designed for receiving the guiding elements $85_1$, $85_2$, and for directing the motion of the carriage 80. In some embodiments, the tracks $93_1$, $92_2$ may comprise a plurality of ball bearings to facilitate the motion of the carriage 80. In embodiments where the guiding elements $85_1$, $85_2$ are generally rectangular, the tracks $93_1$, $93_2$ may be generally U- or C-shaped, for receiving the guiding elements $85_1$, 852. Other configurations of the guiding elements $85_1$, $85_2$ and the tracks $93_1$, $93_2$ are also contemplated.

In either of the aforementioned embodiments of the carriage 80 and the base 90, the transversal motion system 110 may comprise a locking device 96 to selectively allow or preclude movement of the carriage 80 along the sliding guides $92_1$, $92_2$ or along the tracks $93_1$, 932. In some embodiments, the locking device 96 comprises a mechanical locking device (e.g., a set screw or pin adjustable by a handle). However, in other cases, the locking device 96 may comprise any other suitable locking device (e.g., an electromechanical locking device).

In this example, and with further reference to FIGS. 15A and 15B, the pivot system 112 allows the operator seat 120 to be pivoted about its pivot axis 111. For instance, in some cases, the pivot system 112 may allow the operator seat 120 to be pivoted up to 30°, 60°, 90°, 120°, 180° or any other suitable angle about the pivot axis 111 of the operator seat 120. The pivot system may alternatively provide one or a plurality of fixed angles at which the seat may be positioned, such as 0°, 5°, 10°, etc., in increments of 5°, or in increments of any suitable value.

More particularly, in this example, the pivot system 112 comprises a pivot ring 86 and a locking device 88. The pivot ring 86 is mounted in a centered position of the top surface 82 of the carriage 80 and defines a pivot axis 89 coinciding with the pivot axis 111 of the operator seat 120. The pivot ring 86 is pivotable about the pivot axis 89 via a bearing mounted on the carriage 80 and fastened to the base of the operator seat 120. The locking device 88 comprises an arm 102, a limiter 104, a spring 106, and a stopper 108. The arm 102 comprises a handle 122 configured for being held by the operator, a fixed point 124 fixed to the carriage 80 about which the aim 102 may rotate, a groove 126 for interfacing with the stopper 108, and a pin 128 configured for receiving an end of the spring 106. The spring 106 is connected at one end to the pin 128 of the arm 102 and at another end to another pin fixed at a given position of the carriage 80. The limiter 104 is secured to the carriage 80 and comprises a recess 105 through which the arm 102 is placed. Lastly, the stopper 108 is fixed to the pivot ring 86 and comprises a protrusion. While in this particular embodiment, the locking device 88 is described as a mechanical locking device; in other embodiments the locking device may comprise any other suitable locking device (e.g., an electromechanical locking device). In some embodiments, the locking device 96 and the locking device 88 may share some functionality, or may be implemented by a single locking device.

In this embodiment, the seat motion system 100 allows movement of the operator seat 120 when a condition is met. For example, the seat motion system 100 may allow movement of the operator seat 120 when brakes of the snow groomer 10 are applied, the door 42 is closed, the snow groomer 10 is travelling at no more than a given speed, and/or any other criteria is met. Conversely, the seat motion system 100 may prevent movement of the operator seat 120 when the condition is not met (e.g., the brakes are not applied, the door 42 is open, the snow groomer 10 is travelling faster than the given speed, etc.). Conditions under which the seat motion system 100 allows or prevents movement of the operator seat 120 may be defined using any suitable criteria.

Figure 16:
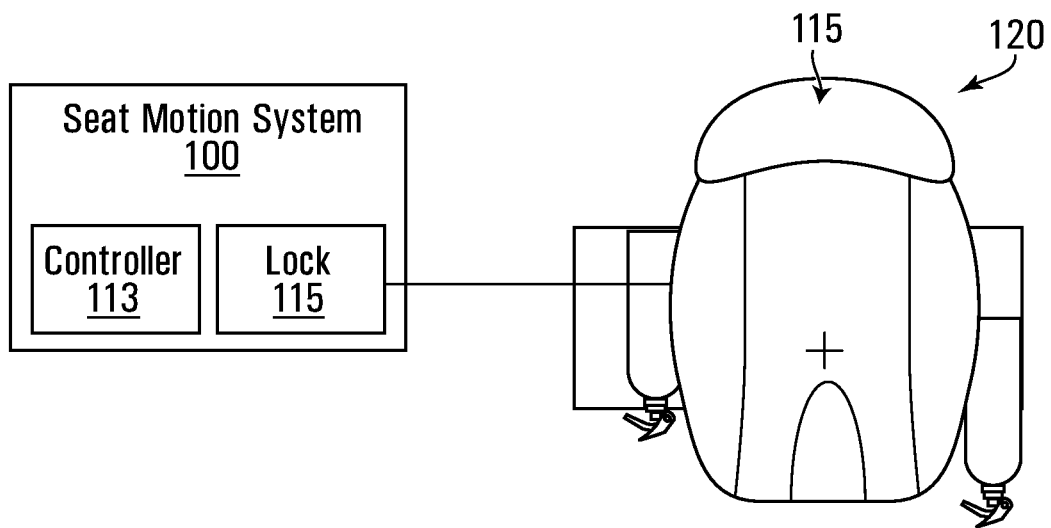
FIG. 16 illustrate a functional block diagram of a control system for a seat motion system according to an embodiment of an aspect of the invention.
Figure 17A:
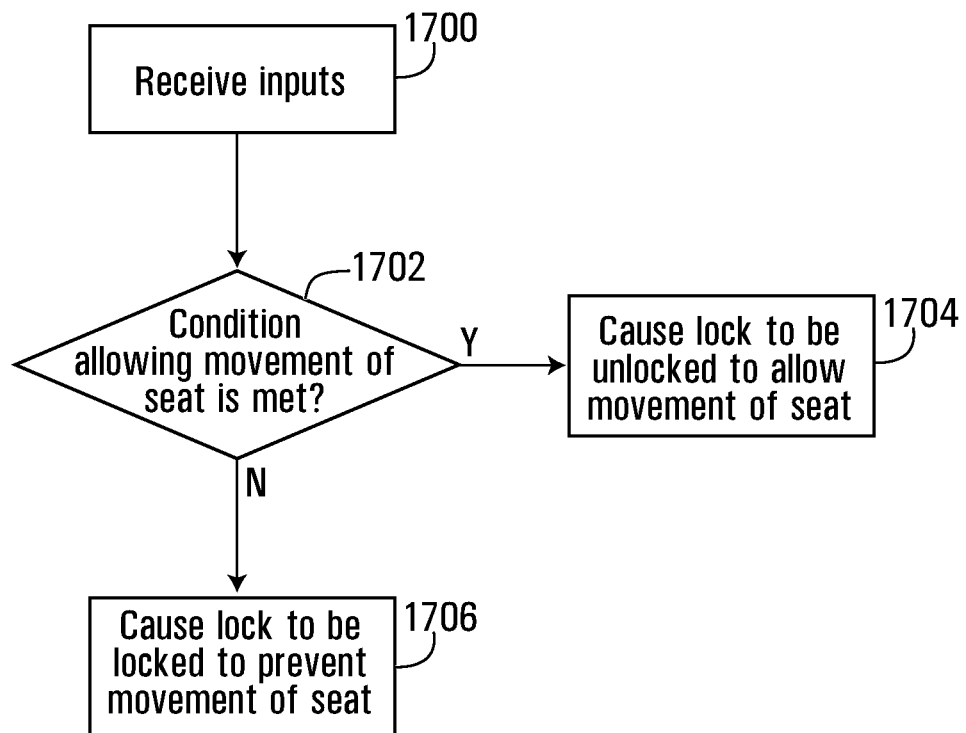
FIG. 17A-B illustrate a flowchart illustrating at least some of the operations performed by a control system for a seat motion system according to an embodiment of an aspect of the invention.
Figure 17B:
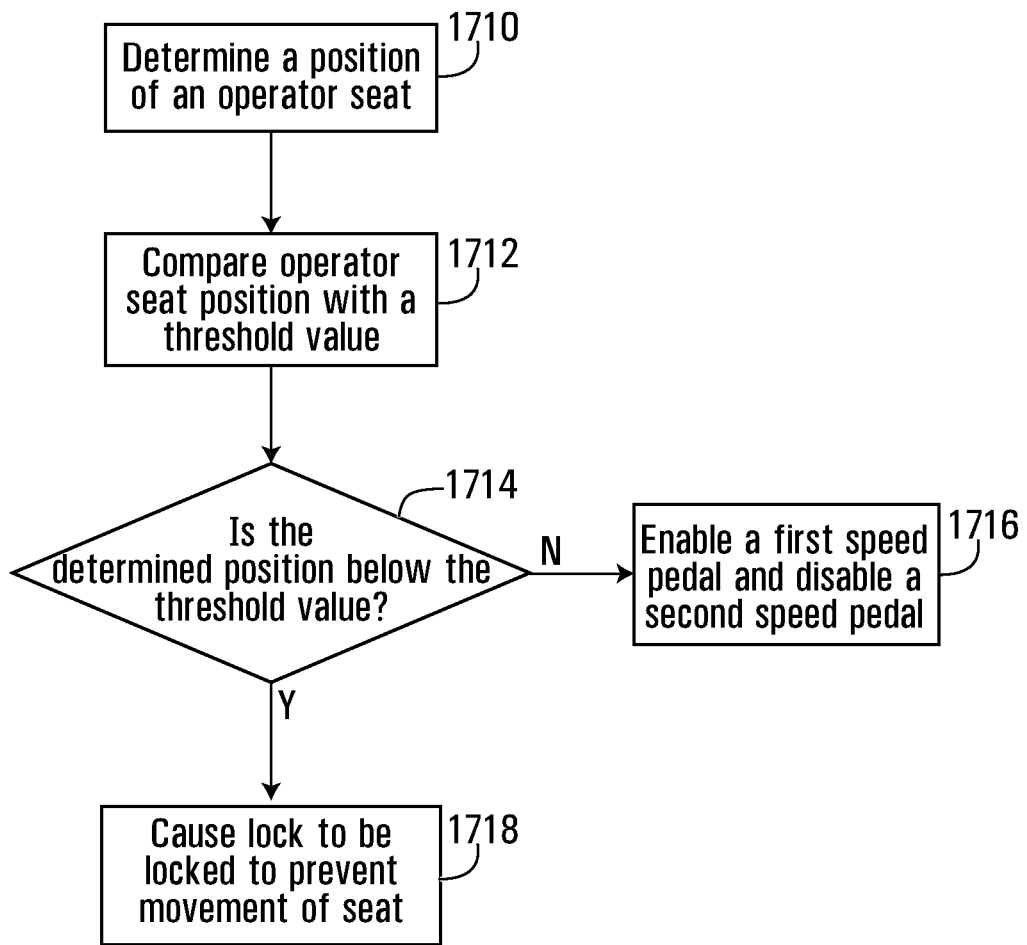

More particularly, in this embodiment, with additional reference to FIGS. 16 and 17A-B, the seat motion system 100 comprises a controller 113 and a lock 115 configured to selectively allow and prevent movement of the operator seat 120. As illustrated in FIG. 17A, the controller 113 may execute a process for controlling the lock. In step 1700, the controller 113 receives inputs from one or more sensors and/or other components (e.g., one or more other controllers) of the snow groomer 10. In step 1702, based on these inputs, the controller 113 determines whether the condition allowing movement of the operator seat 120 is met. If the condition is deemed to be met, the process moves to step 1704 and the controller 113 causes the lock 115 to be an unlocked state in which the lock 115 allows movement of the operator seat 120. If the condition is deemed to be not met, the process moves to step 1706 and the controller 113 causes the lock 115 to be in a locked state in which the lock 115 prevents movement of the operator seat 120. In some embodiments, the controller 113 may cause the lock 115 to be in the unlocked state if the snow groomer 10 is moving at a certain speed, for example at a speed below a threshold speed, or if a motor of the snow groomer has a certain speed of rotation, for example below a threshold speed of rotation. Conversely, the controller 113 may cause the lock 115 to be in the locked state if the snow groomer 10 is moving above a speed threshold, of if a motor of the snow groomer has a speed of rotation above a threshold speed of rotation. In some embodiments, the threshold speed and the threshold speed of rotation may be zero (i.e., no movement/rotation). In other embodiments, the controller 113 may cause the lock 115 to be in the unlocked state if brakes (not pictured) of the snow groomer 10 are applied, and conversely may cause the lock 115 to be in the locked state if the brakes are not applied. In other embodiments, the controller 113 may cause the lock 115 to be in the unlocked state if either (or both) of doors 42 and 43 of the snow groomer 10 are substantially closed, and conversely may cause the lock 115 to be in the locked state if either (or both) of doors 42 and 43 of the snow groomer 10 are not substantially closed.

For example, the lock 115 may comprise an electromechanical locking device (e.g., an electrically-controlled latch) controllable by the controller 113 to selectively engage or disengage the carriage 80 in order to allow or prevent motion of the carriage 80 along the sliding guides 92₁, 92₂. Also, the lock 115 may comprise an electromechanical locking device (e.g., an electrically-controlled latch) controllable by the controller 113 to selectively engage or disengage the pivot ring 86 in order to allow or prevent pivoting of the operator seat 120 about its pivot axis 111.

Although some embodiments of the transversal motion system 110 and the pivot system 112 may be operable by the user using mechanical controls, in other embodiments, one or both of the transversal motion system 110 and the pivot system 112 may comprise electromechanical components to be electronically operated through automatic controls acted upon by the operator (e.g., a switch, button or other control of the user interface 60, such as on the control panel 56 and/or the GUI 58). For instance, the seat motion system 100 may comprise one or more (electrically-controlled or electronically-controlled or otherwise controllable) actuators in order to provide automatic motion to the operator seat 120. The locking mechanism 96 may also be operated via the user interface 60, or automatically as a result of the operator operating either of the transversal motion system 110 or the pivot system 112.

At least part of the user interface 60 may be movable with the operator seat 120 when the operator seat 120 is moved by the seat motion system 100 in order to allow the operator to continue using the user interface 60.

In this embodiment, the steering device 52, the control panel 56, and the display 59 implementing the GUI 58 are movable with the operator seat 120 when the operator seat 120 is moved. More particularly, in this embodiment, the steering device 52, the control panel 56, and the display 59 are mounted to a support 79 that is mounted to the seat apparatus 115 such that the support 79 is movable with the operator seat 120. When the operator seat 120 is moved transversally along the sliding guides 92₁, 92₂ and/or pivoted about its pivot axis 111, the support 79 moves with the operator seat 120, thereby allowing the operator to continue using the user interface 60. The connections (e.g., wires, cables, etc.) between the steering device 52, the control panel 56, and the display 59 and other devices of the snow groomer 10 are configured (e.g., long enough and channeled accordingly) to permit movement of the support 79 with the operator seat 120.

Also in some embodiments, the accelerator 51 (which may also be a speed pedal) and the brake pedal may be designed so as to follow the displacement of the operator seat 120. This may be accomplished by attaching (or otherwise connecting) the accelerator 51 to the seat apparatus 115 or to the user interface 60. In other embodiments, instead of moving the accelerator 51 when the operator seat 120 is moved, the user interface 60 may comprise another accelerator 61 (and a second brake pedal (not pictured)) spaced apart from the accelerator 51 in the widthwise direction of the snow groomer 10. In this example, the accelerator 61 is another speed pedal such that the accelerators 51, 61 are two speed pedals positioned at two different places (e.g., one at a center of the width of the operator cabin 18 and one closer to the lateral side 36₁). The speed pedal 51 may be used when the operator seat 120 is in position Pi and the speed pedal 61 may be used when the operator seat 120 is in position P2. In this case, a sensor responsible for sensing a position of the operator seat 120 may provide a signal indicative of the position of the operator seat 120 to a controller (e.g., an ECU or other powertrain controller, or another controller) of the snow groomer 10 which may execute a process to determine which of the speed pedals 51, 61 is to be used and disable one of the speed pedals 51, 61 so that only a most appropriate one of the speed pedals 51, 61 is active (e.g., the speed pedal closest to the position of the operator seat 120), such as the process shown in FIG. 17B. With reference to FIG. 17B, in step 1710, the controller may be operative to determine the position of the operator seat 120. In step 1712, the controller may be operative to compare this position to a threshold value. If the seat position is below the threshold value, the controller may be operative to move to step 1718, disabling speed pedal 51 and enabling speed pedal 61. If the seat position is not below the threshold value, the controller is operative to move to step 1716, disabling speed pedal 61 and enabling speed pedal 51. Other control strategies are of course possible, which would have the effect of preventing a malfunction from arising if both speed pedals were to be depressed at the same time. In other cases, both of the speed pedals 51, 61 may remain active irrespective of the position of the operator seat 120. Put differently, the controller may be configured for enabling transmission of a signal from a pedal that is an active pedal and disabling transmission of a signal from each pedal that is not an active pedal. Some embodiments may implement the first and second brake pedals in analogous fashion.

In the aforementioned process for customizing the operator cabin 18, a given predetermined seat configuration may also comprise a predetermined speed pedal configuration, which may include either one or both of speed pedal 51 and 61. If the predetermined speed pedal configuration is a configuration different from the speed pedal configuration requested by a customer, the customization process may include a step where the position of the speed pedal (originally in the predetermined configuration) is changed within the operator cabin 18 so as to define a new configuration, such as a configuration requested by a customer. Alternatively, the customization process may include a step of disabling a speed pedal not present in a configuration requested by a customer, or a speed pedal not required to establish the requested speed pedal configuration. This disabling may be effected by the aforementioned controller; alternatively, this disabling may be effected by simply removing the unnecessary speed pedal, or by otherwise rendering the speed pedal incapable of controlling the speed of the snow groomer 10. In a further alternate embodiment, the customization process may include configuring the controller to be operable to detect the configuration of the operator cabin 18 and, based on the detected configuration, to enable one or both of speed pedal 51 and 61.

Furthermore, other elements of the operator cabin 18 may be configured to adjust their position in response to (or in concert with) the movement of the operator seat 120. For example, an embodiment of the operator cabin 18 may comprise one or more rear-view mirrors (not pictured), which may be located within the cabin or attached to the outside of the cabin, and may comprise one or more motors or actuators. The motors of the rear-view mirrors may be operative to change a position of their respective rear-view mirror when the operator seat 120 is displaced, either in response to said displacement or in concert with it. In these embodiments, the position of a mirror may be a vertical height, a position on a horizontal plane, an angle around an axis of rotation, or any combination of the above.

Similar systems may be implemented for other components of the operator cabin 18, including the accelerator 51, or any other elements of the user interface 60, more particularly those elements of the user interface 60 which are not built into or otherwise positioned on armrests 64. This may include controls for an HVAC system, for a radio or other multimedia system, and the like, or any other element of the user interface 60.

iv. Wiper System

Figure 18A:
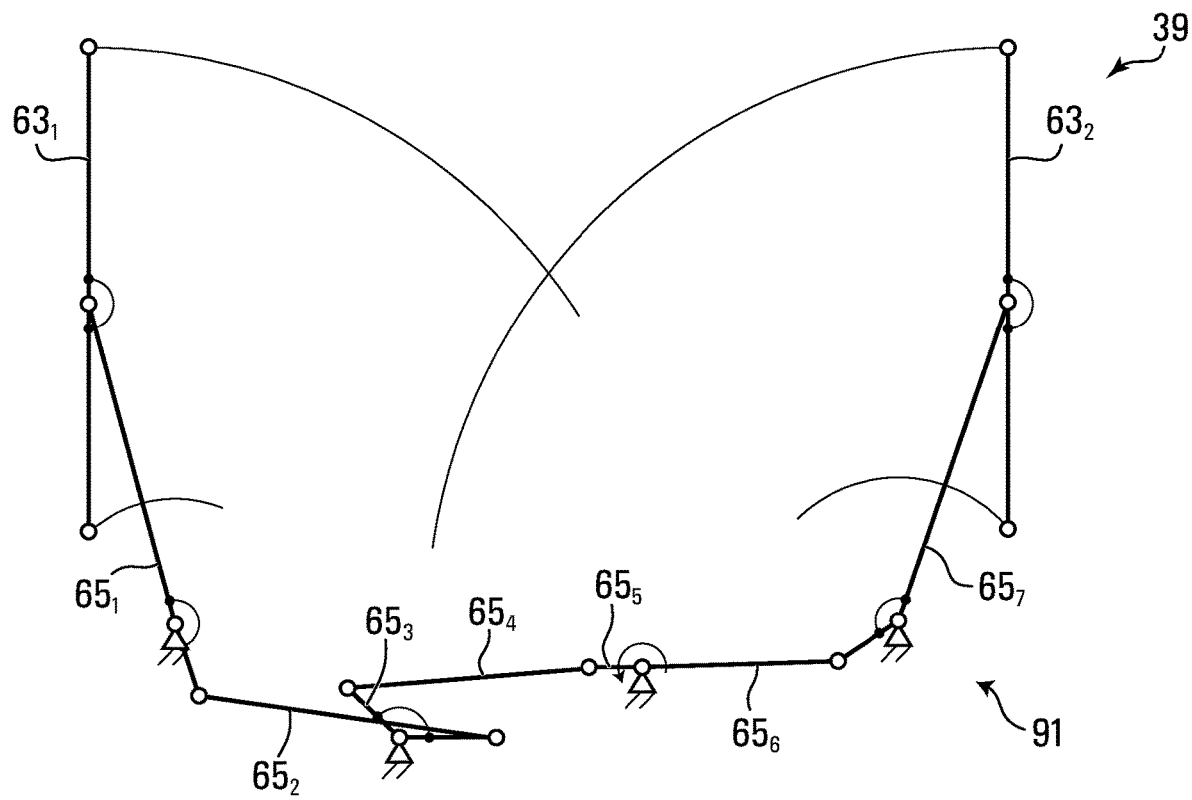
FIGS. 18A-B illustrate a wiper system of a snow groomer according to an embodiment of an aspect of the invention.
Figure 18B:
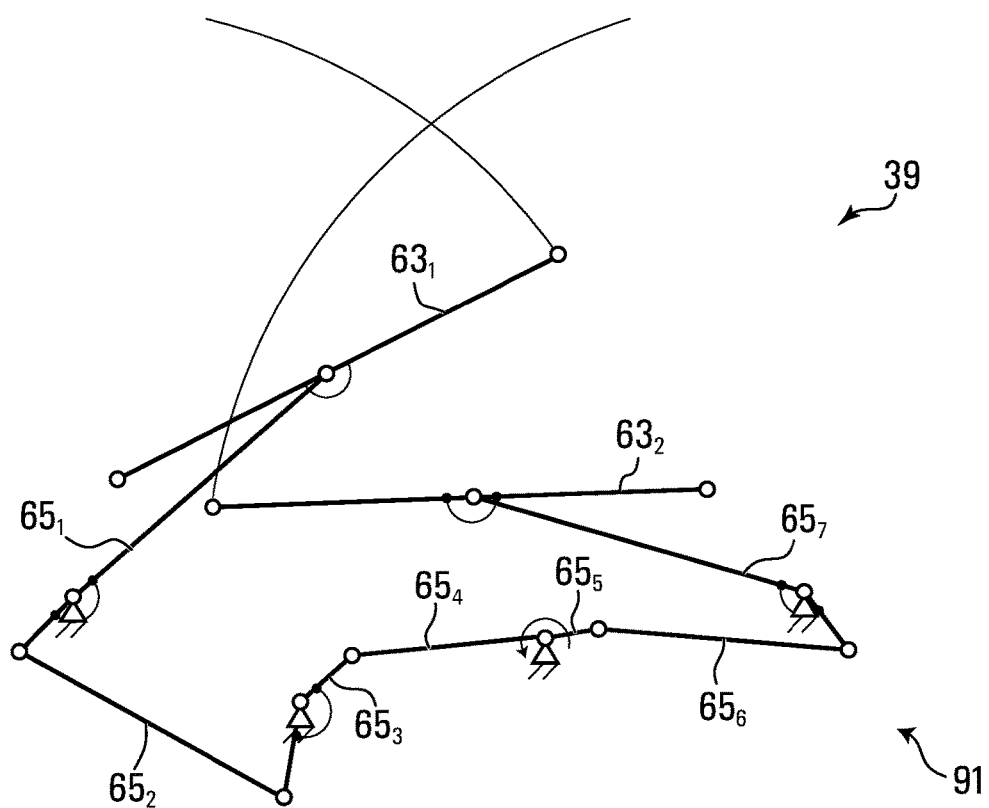

With reference to FIG. 9, the wiper system 39 mentioned previously is used for wiping the front window $44_w$ of the operator cabin 18, thus aiding the operator of the snow groomer 10 to see clearly through the front window $44_1$. With additional reference to FIGS. 18A and 18B, in this embodiment, the wiper system 39 comprises two wipers $63_1$, $63_2$ which are movable, and may also comprise at least one washer fluid nozzle (not pictured) for releasing washer fluid onto the window $44_w$. When the wiper system 39 is activated, the wiper $63_1$ completes a sequence of first wiping cycles, sliding across a surface of the window $44_w$ from a first parked position to a half-cycle position and back to the first parked position. Similarly, when the wiper system 39 is activated, the wiper $63_2$ completes a sequence of second wiping cycles, sliding across a surface of the window $44_w$ from a second parked position to a half-cycle position and back to the second parked position. The motion of the wipers $63_1$, $63_2$ removes or otherwise displaces snow or other precipitation that has accumulated on the front window $44_w$. The surface wiped by the first wiper $63_1$ during each of the first wiping cycles may intersect the surface wiped by the second wiper $63_2$ during each of the second wiping cycles. The wipers $63_1$, $63_2$ may undergo at least some rotation movement during their respective wiping cycles; in some embodiments, the wipers $63_1$, $63_2$ may cover at least 45 degrees of angular distance in their respective wiping cycles.

When the wiper system 39 is deactivated, the wipers $63_1$, $63_2$ stand (i.e., are "parked") in a generally vertical position at lateral extremities of the front window $44_w$, thus at least partially preventing accumulation of snow or other precipitation on the wipers 631, 632 while parked. This "parked" configuration may thus also provide a substantially free field of view to the operator of the snow groomer 10, irrespective of whether the operator is seated to the left of the cabin (e.g., configuration $50_3$ previously described) or in the centre of the cabin (e.g., configurations $50_1$ and $50_2$ previously described). In some embodiments, when in the parked position, the wipers $63_1$, 632 may be positioned within a certain margin of respective lateral edges of the window 44. Such a margin may in some embodiments be less than 12 inches (approximately 30 cm) while in others it may be less than 6 in (15.24 cm) and still less in other embodiments.

In one embodiment, the wipers $63_1$, $63_2$ may be driven by separate motors. In another embodiment, the wipers $63_1$, $63_2$ may be driven by a single common motor 67 via a linkage 91. For example, as shown in FIG. 9, the linkage 91 may comprise a plurality of links $65_1$-$65_7$ connecting the wipers $63_1$, $63_2$ to the common motor 67. The links $65_1$-$65_7$ are configured such that the motor 67 alone is sufficient to drive the motion of both of the wipers $63_1$, $63_2$. More particularly, in this embodiment: the link $65_1$ has a first point connected to the wiper $63_1$ and a second point connected to the link $65_2$ and is pivoted about a fixed pivot located between these first and second points; the link $65_3$ has a first point connected to the link $65_2$ and a second point connected to the link $65_4$ and is pivoted about a fixed pivot located between its first and second points; the link $65_5$ has a first point connected to the link $65_4$ and the link $65_6$ and a second point connected to the motor 67 such that it is a driving link that drives the links $65_4$, $65_6$; and the link $65_7$ has a first point connected to the link $65_6$ and a second point connected to the wiper $63_2$ and is pivoted about a fixed pivot located between its first and second points. The linkage 91 may be arranged in various other ways in other embodiments (i.e., the links $65_1$-$65_7$ may have various other shapes and/or position; similarly, the linkage 91 may comprise more or fewer links such as the links $65_1$-$65_7$).

Other embodiments of the snow groomer 10 may include a second wiper system (not pictured) used for wiping the rear window $44_3$ of the operator cabin 18, wherein this second wiper system may be substantively similar to the wiper system 39, although it need not be similarly implemented in all embodiments. A side window wiper system may also be provided in some embodiments.

v. Spoilers

In certain embodiments of the snow groomer 10, such as the one illustrated in FIG. 9, the operator cabin 18 comprises spoilers $81_1$-$81_3$ to prevent snow accumulation. More particularly, in this embodiment, the spoilers $81_1$, 812 are located below the doors 42, 43 on the lateral sides $36_1$, 362, of the operator cabin 18 and configured for preventing accumulation of snow beneath the doors 42, 43. As such, the spoilers $81_1$, 812 may be useful to provide easy access for the operator in and out of the snow groomer 10. In this example, each of the spoilers $81_1$, $81_2$ spans substantially a width of a respective one of the doors 42, 43 and defines a downwards slope in the widthwise direction of the snow groomer 10. Also, in this embodiment, the spoiler $81_3$ is located below the front window in the front side of the operator cabin 18.

The spoilers $81_1$-$81_3$ may be made of polymeric material, metallic material, or any other suitable material.

e) Tiller Assembly

With continued reference to FIG. 1, the tiller assembly 20 is located in a rear portion of the snow groomer 10 and, as depicted in FIG. 4, comprises a tiller 150 configured to work a surface portion of snow and a rear lift frame 160 configured to carry and control a positioning of the tiller 150.

i. Rear Lift Frame

With reference to FIGS. 19 through 22, certain embodiments of the rear lift frame 160 may comprise a rear member 161, a main bracket 162, two lateral brackets $163_1$, $163_2$, two side linkages $164_1$, $164_2$, and a set of actuators, namely a lateral actuator 166, a lift actuator 168, and a cutting depth actuator 170. The actuators 166, 168, 170 implement a connection between the tiller 150 and a remainder of the snow groomer 10 and interact with the tiller 150 in order to provide operational adjustments to the tiller 150 as well as to guide the tiller 150 with respect to the remainder of the snow groomer 10.

As further discussed below, in this embodiment, the rear lift frame 160 enables movements of the tiller 150 in different directions independently of one another other (e.g., a vertical (i.e., up/down) movement of the tiller independently from a transversal (i.e., left/right) movement of the tiller).

The main bracket 162 of the rear lift frame 160 is attached to the chassis 12 and includes a lift actuator mount for receiving a proximal end of the lift actuator 168. The lateral brackets $163_1$, $163_2$ are also attached to the chassis 12 and are equally distanced from the main bracket 162 in the widthwise direction of the snow groomer 10. The lateral brackets $163_1$, $163_2$ include linkage mounts for receiving the side linkages $164_1$, $164_2$. Moreover, in addition to a linkage mount, the lateral bracket $163_2$ also provides a lateral actuator mount for receiving a proximal end of the lateral actuator 166.

The rear member 161 of the rear lift frame 160 comprises a main brace 171; a hitch device 172 for attaching the tiller 150; two linkage mounts for receiving the side linkages 164$_1$, 164$_2$; a lift actuator mount for receiving a distal end of the lift actuator 168; a depth actuator mount for receiving a distal end of the depth actuator 170; and a lateral actuator mount for receiving a distal end of the lateral actuator 166.

The side linkages 164$_1$, 164$_2$ are mounted at their proximal ends to the linkage mounts of the lateral brackets 163$_1$, 163$_2$ and at their distal ends to the linkage mounts of the rear member 161 via pins. Moreover, the side linkages 164$_1$, 164$_2$ are mounted via a set of pins oriented generally vertically (i.e., generally parallel to the height direction of the snow groomer 10) such that the side linkages 164$_1$, 164$_2$ are pivotable about respective vertical axes of the pins.

Figure 21:
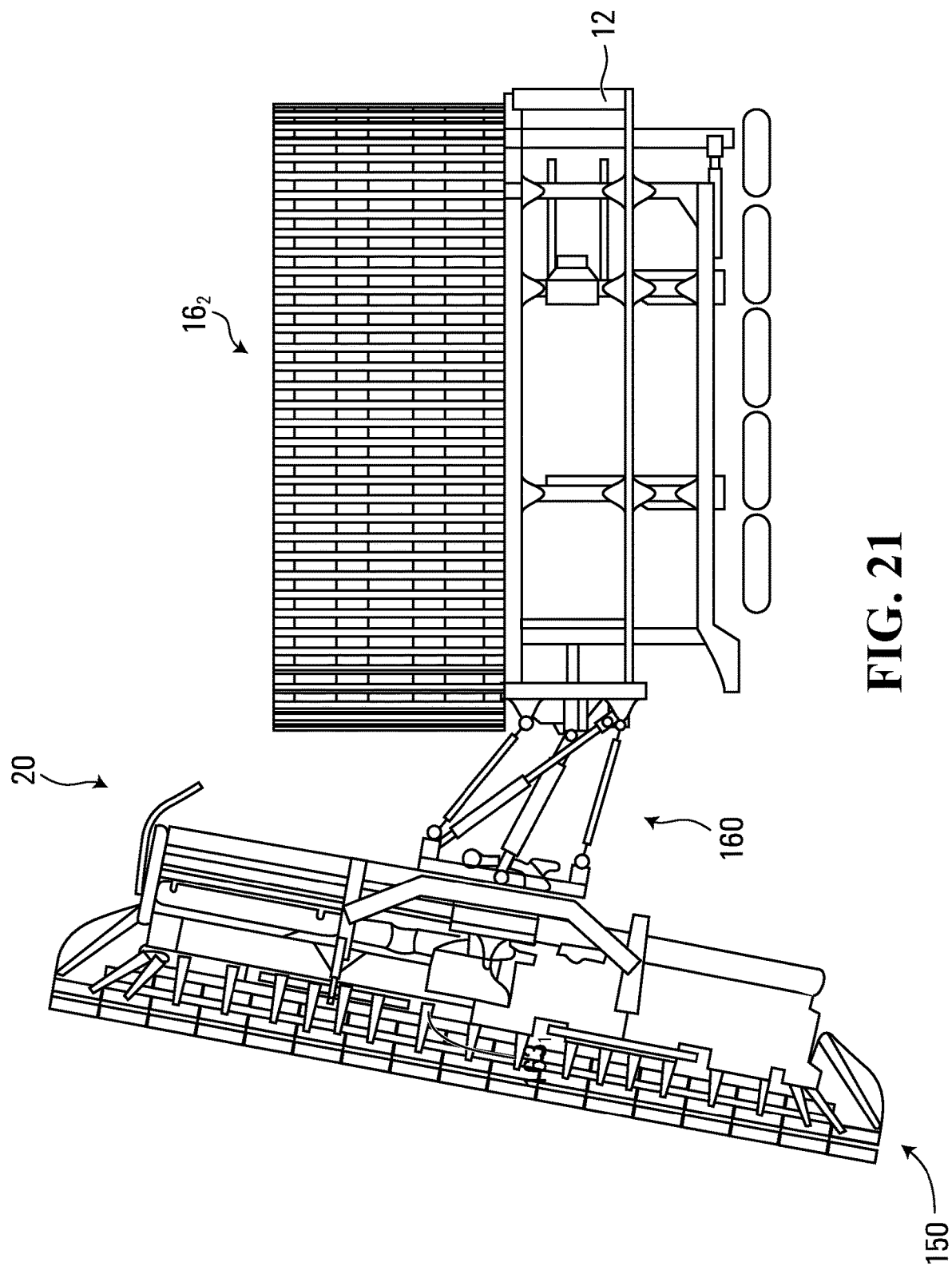
Figure 22:
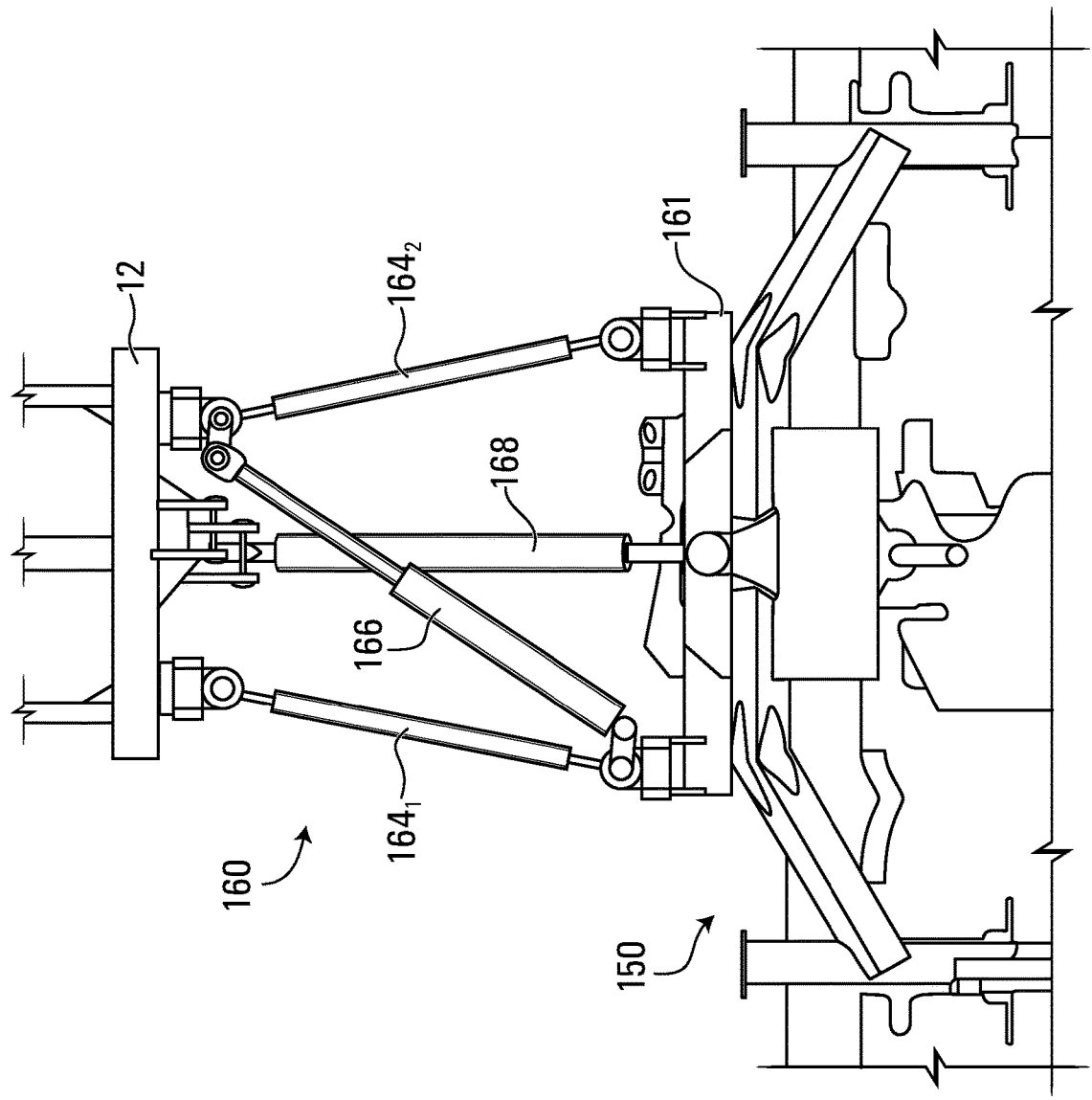

The lateral actuator 166 is mounted at its proximal end to the lateral bracket 163$_2$, and at its distal end to the lateral actuator mount of the rear member 161. As such, the lateral actuator 166 can control a lateral movement of the tiller 150. An expansion or retraction of the lateral actuator 166 can be used when the snow groomer 10 negotiates turns, and thus the lateral actuator 166 provides lateral movement to the tiller 150 as the side linkages 1641, 1642 pivot about each linkage mount, as shown in FIG. 21.

The lift actuator 168 is centered relative to a width of the rear lift frame 160 and is mounted at its proximal end to the main bracket 162 and at its distal end to the lift actuator mount of the rear member 161. Thus, the lift actuator 168 is able to provide a vertical (i.e., an up and down) movement to the tiller 150. An expansion of the lift actuator 168 lifts the tiller 150 and a retraction of the lift actuator 168 lowers the tiller 150.

The depth actuator 170 is mounted at its proximal end to a central bracket attached to the lift actuator 168 and at its distal end to the depth actuator mount of the rear member 161. In this manner, the depth actuator 170 is able to modify a cutting depth of the tiller 150. More specifically, an expansion of the depth actuator 170 increases the cutting depth of the tiller 150 and a retraction of depth actuator 170 decreases the cutting depth of the tiller 150. By having the depth actuator 170 mounted to the lift actuator 168, fluctuation of the cutting depth of tiller 150 may be substantially reduced or eliminated.

In this example of implementation, each of the actuators 166, 168, 170 comprises a hydraulic cylinder in hydraulic communication with a hydraulic system of the power plant 14 of the snow groomer 10. The actuators 166, 168, 170 can operate in a plurality of modes, including a float mode and a non-float mode. When operating in a float mode, each of the cylinders of actuators 166 and 168 adjust themselves automatically by way of hydraulic pressure release systems; the depth actuator 170 still operates independently.

However, in a non-float mode, each of the cylinders of actuators 166, 168, 170 may be operated separately and individually by the operator of the snow groomer 10. The actuators 166, 168, 170 may be implemented in various other ways in other examples of implementation (e.g., electromechanical actuators).

The rear lift frame 160 therefore allows movements of the tiller 150 in different directions independently of one another. For instance, a lateral movement of the tiller 150 is independent of a vertical movement of tiller 150. Likewise, a modification of the cutting depth of the tiller 150 is made independently of the vertical positioning of the tiller 150. Moreover, this configuration of the rear lift frame 160 minimizes a turning radius of the tiller 150 as shown in FIG. 21. This allows curves to be more easily negotiated by the tiller 150.

The rear lift frame 160 may be implemented in various other ways in other embodiments. For example, in other embodiments, any component of the rear lift frame 160 may have any other suitable shape or configuration and/or the rear lift frame 160 may comprise various other components.

ii. Tiller

With additional reference to FIGS. 19 and 23 through 25, embodiments of the tiller 150 comprise a frame 151, an actuator 152 mounted to the frame 151 in a center of the frame 151, a rotor 153 mounted to rotate with respect to the frame 151 about a generally horizontal axis; a protective casing 155 covering the rotor 153; a mat assembly 156 connected to the protective casing 155 and configured to be towed over the surface of the snow; and snow guards 158$_1$, 158$_2$ fitted on the frame 151.

As further discussed below, in this embodiment, the tiller 150 is configured to apply a substantially uniform pressure over its width (e.g., even where the terrain is uneven). Also, in this embodiment, the tiller 150 is maintainable (e.g., lockable) in a substantially flat configuration by the operator via the user interface 60 of the operator cabin 18 (e.g., when the snow groomer 10 is in a jump).

In this embodiment, the tiller 150 comprises a pair of wings 148$_1$, 148$_2$ elongated in the widthwise direction of the snow groomer 10 and interconnected in a central part 149 of the tiller 150. Each of wings 148$_1$ and 148$_2$ comprises a linkage 157 which applies part of the mat assembly 156 onto the snow over which the snow groomer 10 travels. The linkage 157 comprises a support arm 141 connected via an actuator 173 to bars 159$_1$, 159$_2$ which are elongated in the widthwise direction of the snow groomer 10 apply the mat assembly 156 onto the snow.

The actuator 152 is controllable to vary (i.e., increase or decrease) pressure applied by the tiller 150 onto the ground. More particularly, in this embodiment, the actuator 152 is a hydraulic actuator in hydraulic communication with a hydraulic system of the power plant 14 of the snow groomer 10. The hydraulic actuator 152 has a variable hydraulic pressure which is controllable to increase or decrease the pressure applied by the tiller 150 on the ground. This is accomplished by way of a flexible joint in the middle of the tiller 150 which transfers the force generated by the hydraulic actuator 152 toward each of the wings 148$_1$ and 148$_2$. In some embodiments, the tiller 150 may operate in one of a plurality of modes, including a fixed pressure mode and a variable pressure mode, wherein the hydraulic pressure applied by the actuator 152 is varied in relation with the pressure applied by the rear lift frame 160—this may help to provide a more optimal snow finish.

More specifically, when pressure is increased in the actuator 152, pressure applied on the ground on the right and left wings 148$_1$, 148$_2$ of the tiller 150 is also increased. Conversely, when pressure is decreased in the actuator 152, pressure applied on the ground on the right and left wings 148$_1$, 148$_2$ of the tiller 150 is also decreased. For instance, the actuator 152 may be controlled by the operator via the user interface 60 of the operator cabin 18. In other embodiments, a sensor 182 built into actuator 152 may be operable to cause the actuator 152 to assume a certain position based on operator input or based on other conditions. In such embodiments, the sensor 182 may allow for a "flat locking" function to be effected with the actuator 152.

In addition, in this embodiment, a controller of the snow groomer 10 may make a correlation between the pressure in the actuator 152 of the tiller 150 and the lift actuator 168 of the rear lift frame 160 and adjust the pressure in the actuator 152 of the tiller 150 accordingly. For instance, the controller may increase or decrease the pressure in the actuator 152 of the tiller 150 depending on the pressure applied by the lift actuator 168 of the rear lift frame 160 (e.g., an increase in pressure in the lift actuator 168 may result in an increase or decrease in pressure in the actuator 152 of the tiller 150, depending on circumstances).

Figure 23:
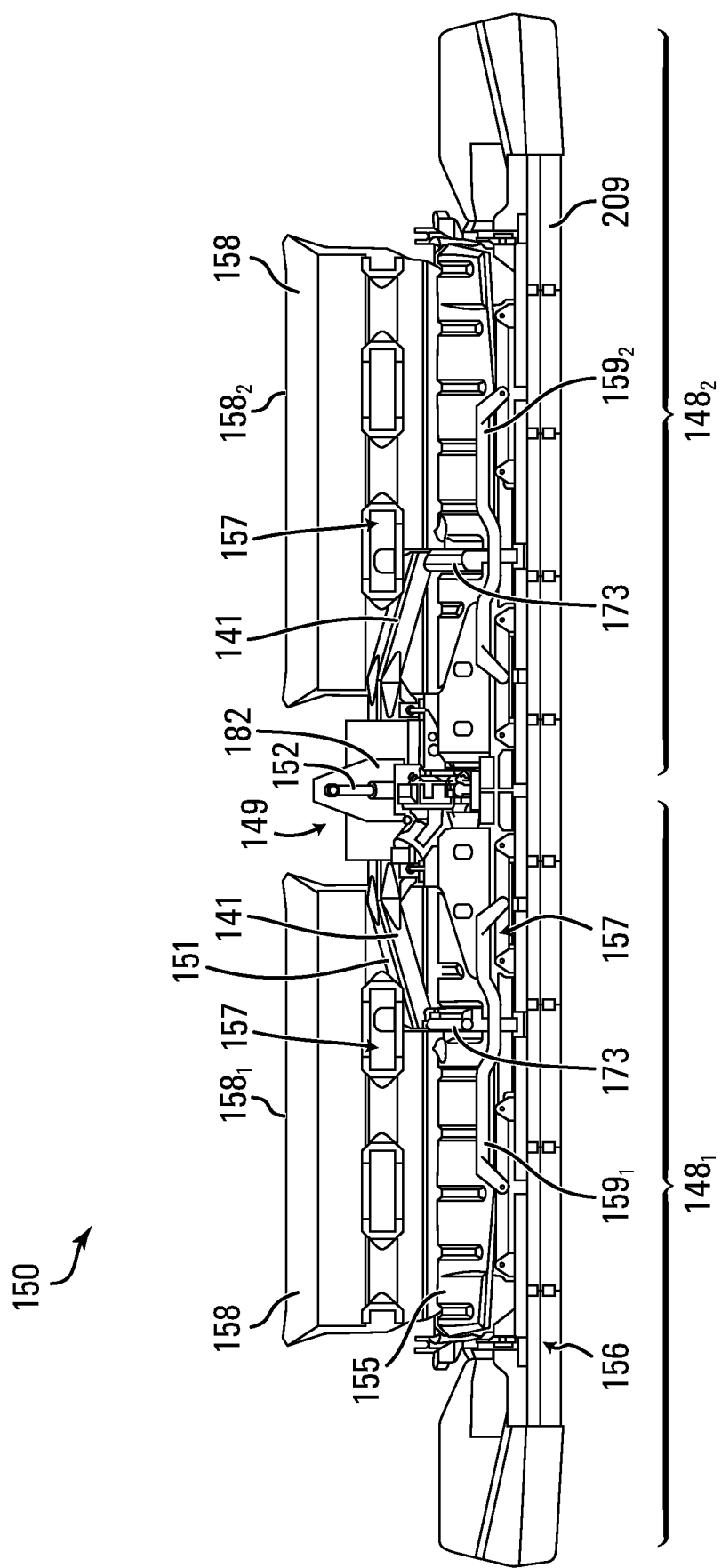
Figure 24:
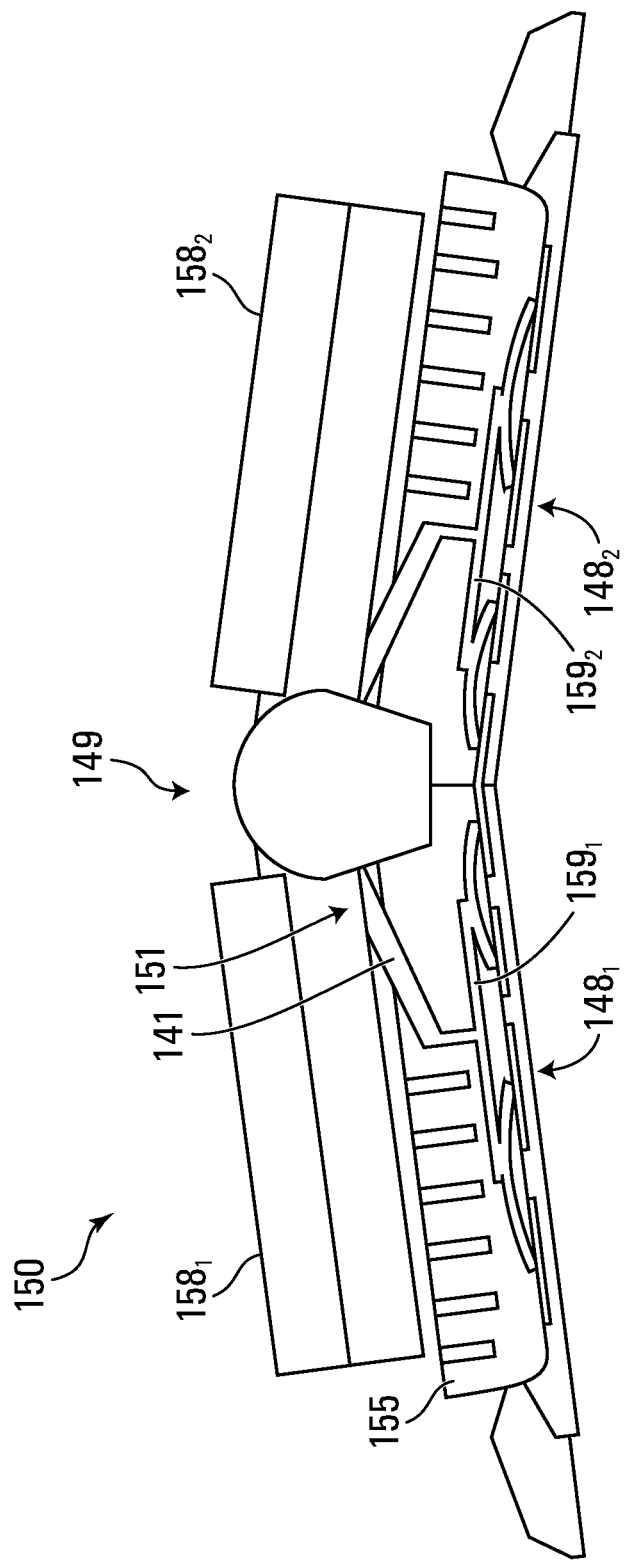

In some embodiments, with further reference to FIGS. 23 and 24, the tiller 150 can be maintained (e.g., locked) in a substantially flat configuration by the operator via the user interface 60 of the operator cabin 18 (e.g., using a button, switch or other control of the control panel 56 or the GUI 58). This feature may be activated to ensure that the tiller 150 is positioned substantially flat (i.e., defining a horizontal plane across its longitudinal ends) in certain circumstances. Additionally, this locking feature may be controllable by an operator of the snow groomer 10. When deactivated, the tiller 150 may instead generally follow a topography of the snow surface currently being groomed, rather than maintaining a substantially flat position.

More particularly, in this embodiment, sensor 182, which as discussed previously is associated with the actuator 152, additionally monitors a positioning of the actuator 152. In this example, the sensor 182 may also act as a linear sensor. When the actuator 152 is activated by the operator, the actuator 152 is actuated in a direction suitable to reach a middle value of the linear sensor 152 which corresponds to a middle position of a full stroke of the actuator 152. In this state, the tiller 150 is maintained in a substantially flat configuration.

Figure 19:
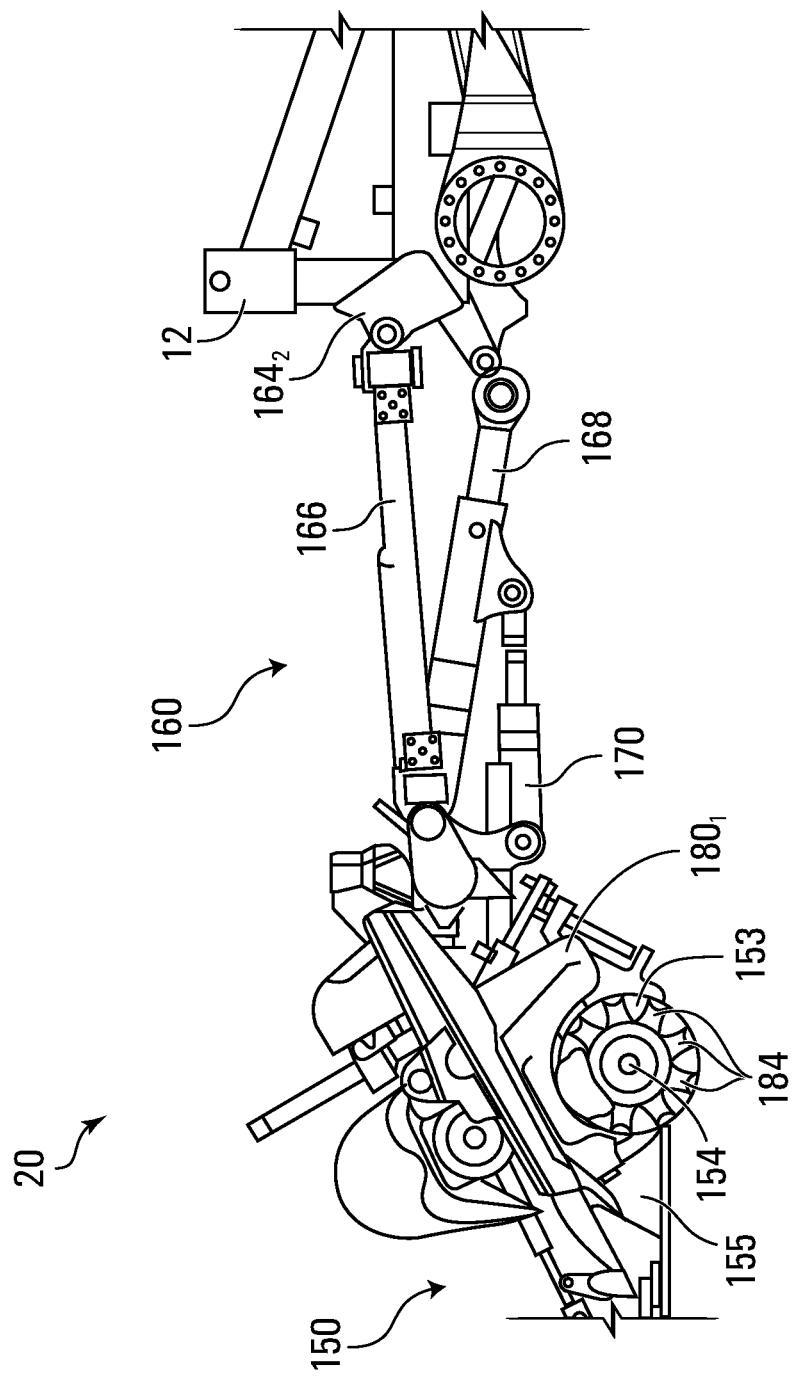
FIGS. 19 through 25 illustrate various views of a tiller system and rear lift frame of a snow groomer according to an embodiment of an aspect of the invention.

With further reference to FIG. 19, the rotor 153 comprises a shaft 154 and a number of tools 184 distributed along a longitudinal axis of the shaft 154 and projecting radially from the shaft 154 to penetrate the snow. The rotor 153 is rotated by a motor. More particularly, in this embodiment, the rotor 153 is rotated by a hydraulic motor supplied with pressurized oil by the snow groomer 10. In some embodiments, the rotor 153 may actually comprise a plurality of sub-rotors (not pictured) mechanically coupled to one another and driven by the hydraulic motor. Alternatively, the 153 may comprise a plurality of sub-rotors which are driven by separate hydraulic motors, in a one-to-one configuration, in a one-to-many configuration, or in any other suitable configuration. The motor rotating the rotor 153 may be any other suitable motor in other embodiments (e.g., an electric motor), and may be a direct drive motor, or may drive a gearbox (not pictured) which itself drives the rotor 153.

In some embodiments, the rotor 153 is equipped with a sensor (not pictured) which monitors a rotation speed of the rotor 153 and provides this information to the operator of the snow groomer 10, for example via the user interface 60. This may allow the operator to adjust aspects of the snow groomer such as speed and pressure applied by the tiller, based on the rotation speed of the rotor 153 in order to provide the groomed snow with a desired texture or consistency.

In this embodiment, and with further reference to FIGS. 26 to 28, the tools 184 of the rotor 153 comprise a plurality of teeth 185. The teeth 185 comprise a base portion 186 attachable to the shaft 154 and thus having a shape (e.g., a radius or curvature) complementary to the shaft 154, and a cutting portion 187 for cutting into the snow. In this example, as shown in FIG. 27, the geometry of the cutting portion 187 comprises two curved sidewalls $188_1$, $188_2$, two peaks $190_1$, $190_2$ and a recess 192. This may enable an optimized cutting action of the snow. In other embodiments, the cutting portion 187 may have any other suitable geometry. The teeth 185 have a thickness T which may have any suitable value. For example, in this embodiment, the thickness T of the teeth may be 10.5 mm or approximately 0.40 inches. In other embodiments, the thickness T of the teeth 185 may be up to 0.50 inches or even 0.60 inches.

Moreover, in this embodiment, as shown in FIG. 28, the teeth 185 comprise a core 195 and may additionally comprise a reinforcing layer 196. The application of the reinforcing layer 196 may minimize wear and improve performance of the teeth 185. In the embodiment depicted in FIGS. 27 and 28, the reinforcing layer 196 covers one side of the teeth 196, such that the side which engages the snow in a forward rotation of the rotor 153 is covered. In other embodiments, both sides of the teeth 185 may be covered by the reinforcing layer 196. In further alternative embodiments, only a top portion or "tip" of each of the teeth 185 may be coated the reinforcing layer 196, either on one side or on both. In addition, the thickness of the reinforcing layer 196 may have any suitable value. For example, in some embodiments, the thickness of the reinforcing layer 196 may be at least 0.010 inches, in some cases at least 0.020 inches, in some cases at least 0.030 inches, in some cases at least 0.040 inches, in some cases at least 0.050 inches, and in some cases even more. The reinforcing layer 196 may be applied onto the core 195 of the teeth 185 via a plasma spraying method, a coating technique, or using any other suitable process.

In this embodiment, the core 195 is made of medium carbon steel (e.g., 1045 carbon steel) but may be made of any other suitable material in other embodiments. In a similar manner, in this example of implementation, the reinforcing layer 196 is made of cobalt, but may be made of carbide or any other suitable material in other embodiments.

Figure 25:
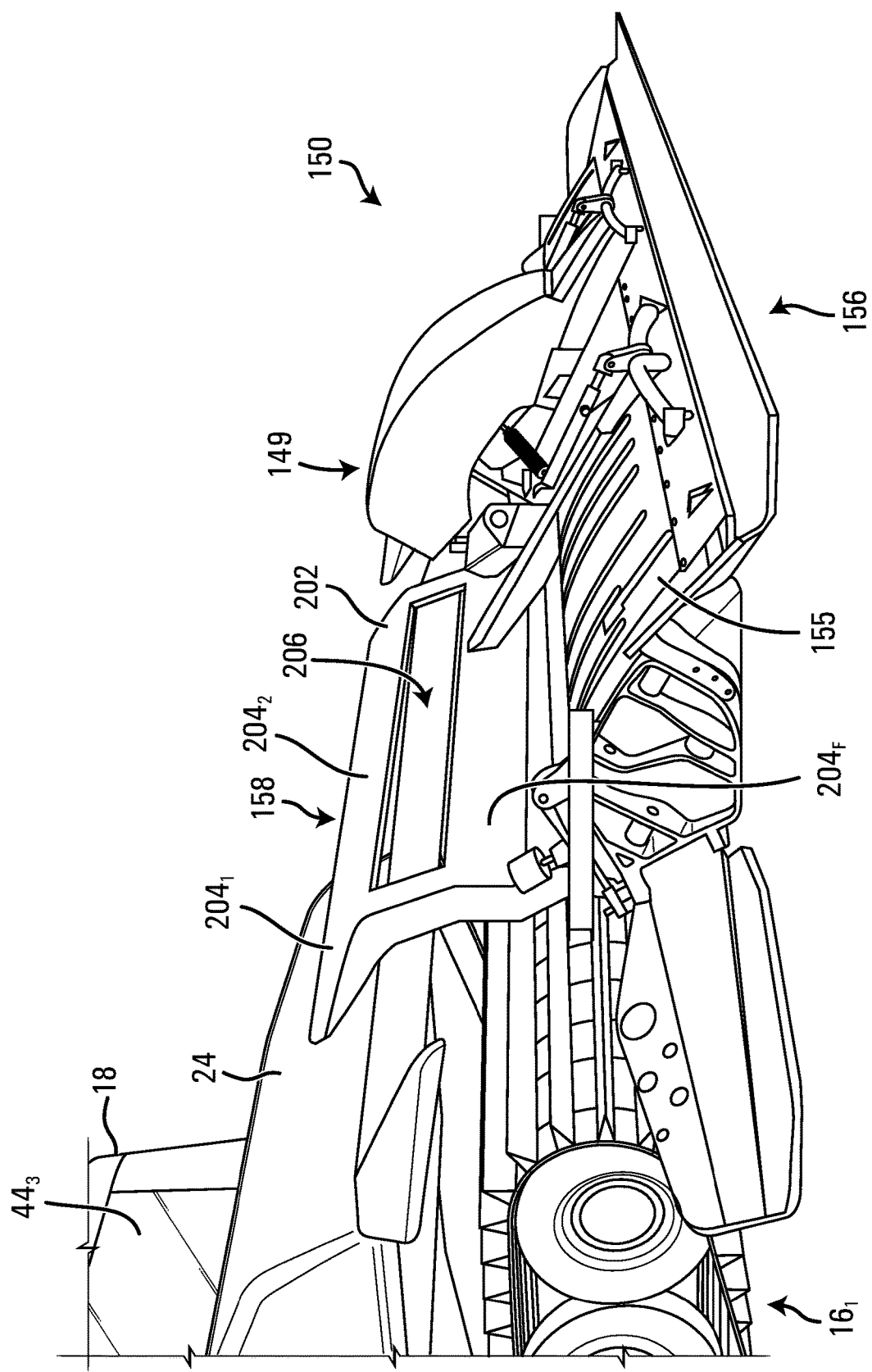
Figure 29:
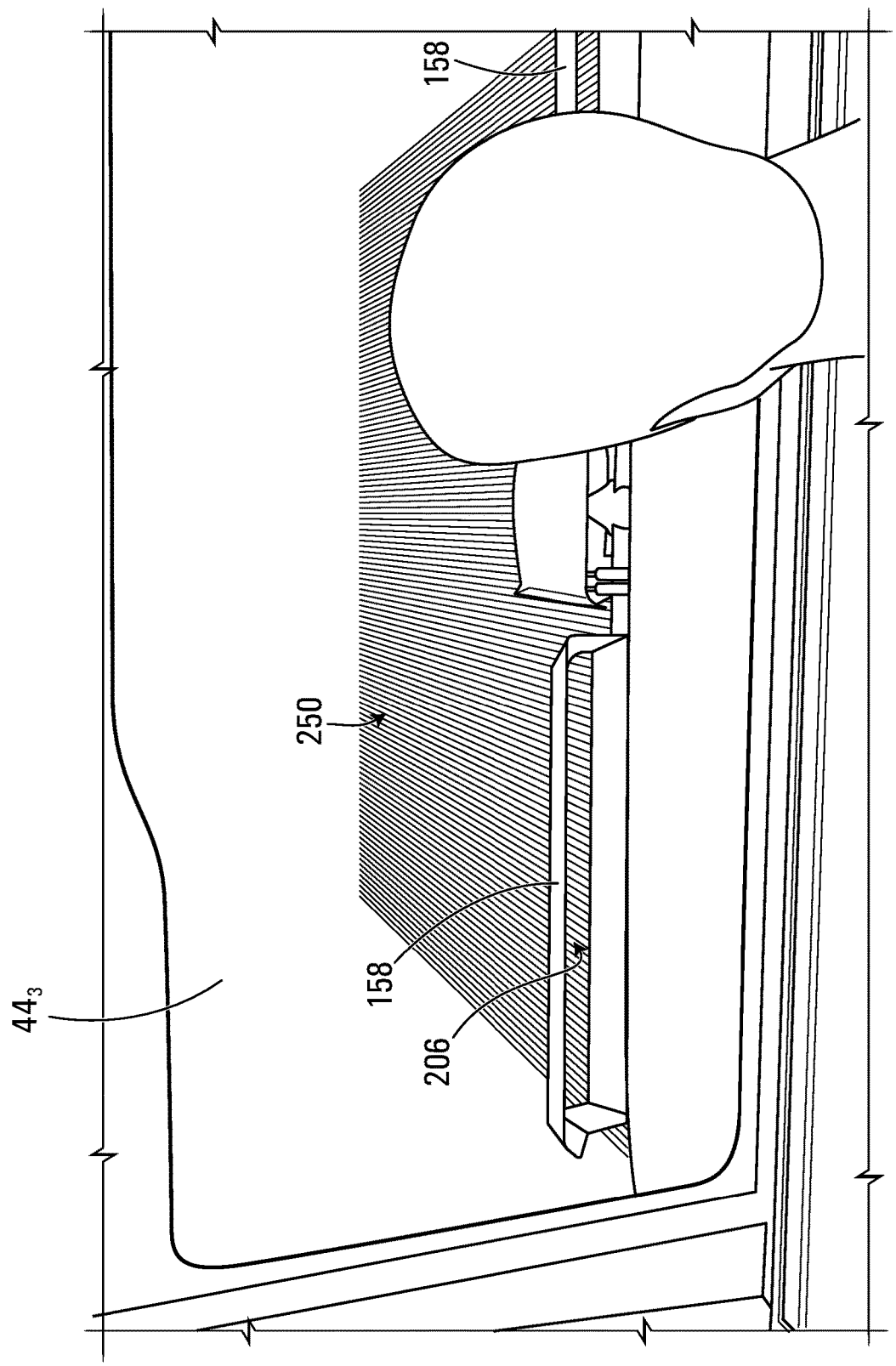
FIG. 29 illustrates a view from inside an operator cabin of a snow groomer according to an embodiment of an aspect of the invention.
Figure 30:
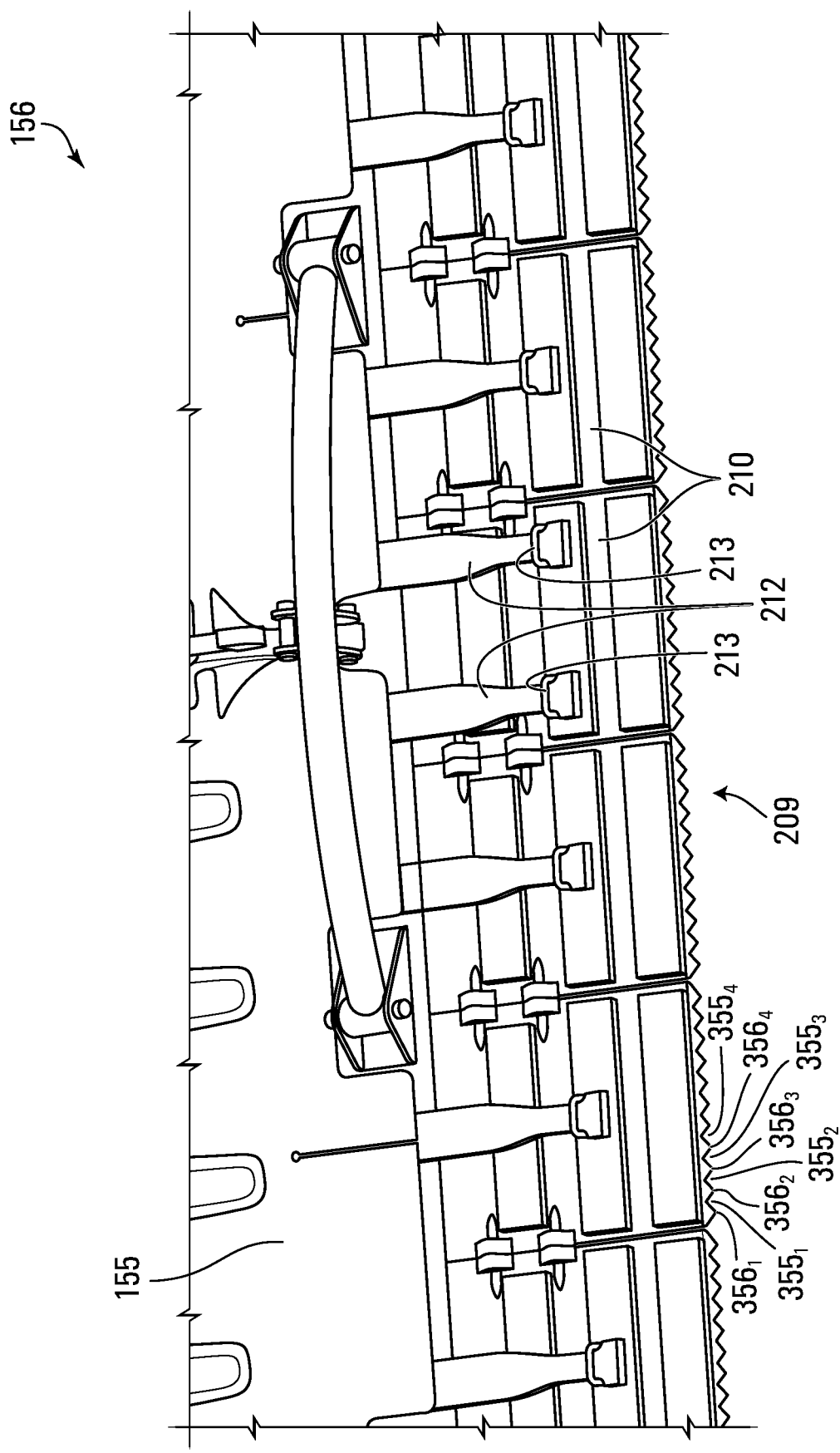
FIG. 30 illustrates a perspective view of a mat assembly according to an embodiment of an aspect of the invention.

With reference to FIGS. 25 and 29, in some embodiments of the snow groomer 10, the snow guards 158 are designed for shielding the tiller 150 to a certain extent from snow, such as snow thrown up by the snow groomer 10 (e.g., snow thrown up by the track assemblies 161, 162). The snow guards 158 comprise two side walls 202 and a plurality of flat surfaces $204_1$-$204_F$. Moreover, as shown in FIG. 29, the flat surface $204_1$ projects rearwards defining a downwards slope; the flat surface $204_2$ comprises an opening 206 through which the operator may see. This may help the operator to better gauge the quality of the work the tiller 150 is performing and adjust any operational parameters accordingly, or otherwise provide the operator with a line of sight unavailable without the opening 206 when the operator looks rearwards from the operator cabin 18 through back window $44_3$.

iii. Mat Assembly

With reference to FIGS. 25, and 30 to 32, the mat assembly 156 of the tiller 150 is typically configured to be towed over snow, such as the snow on a skill hill trail or at a snowpark. The mat assembly 156 comprises a plurality of mat sections 210 together forming a mat 209, a plurality of stiffener devices 212, and a plurality of securing elements 213. The mat 209 has a front end which attaches to the tiller 150, a rear end opposite to the front end, and two lateral sides situated between the front end and the back end. The mat 209 defines a length between the front end and the rear end, and a width between the two lateral sides.

Figure 31A:
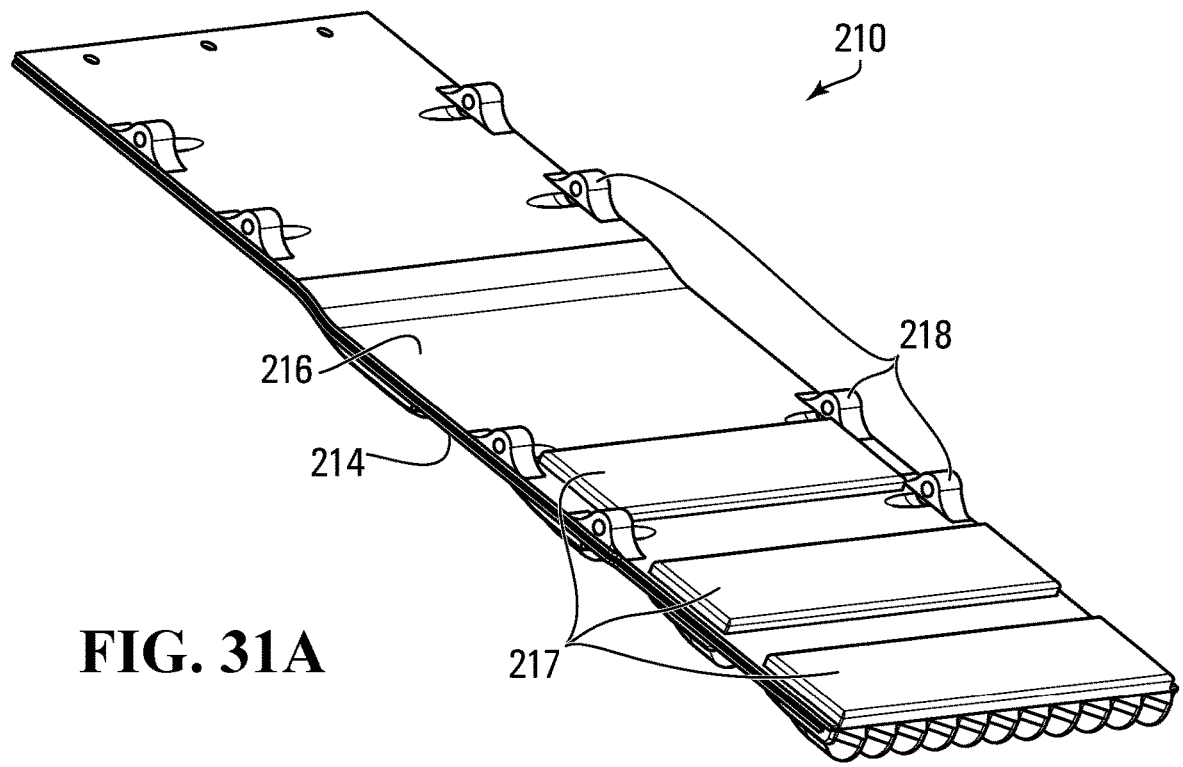
FIGS. 31A-B through 33 illustrate various views of a mat section of a mat assembly according to an embodiment of an aspect of the invention.
Figure 31B:
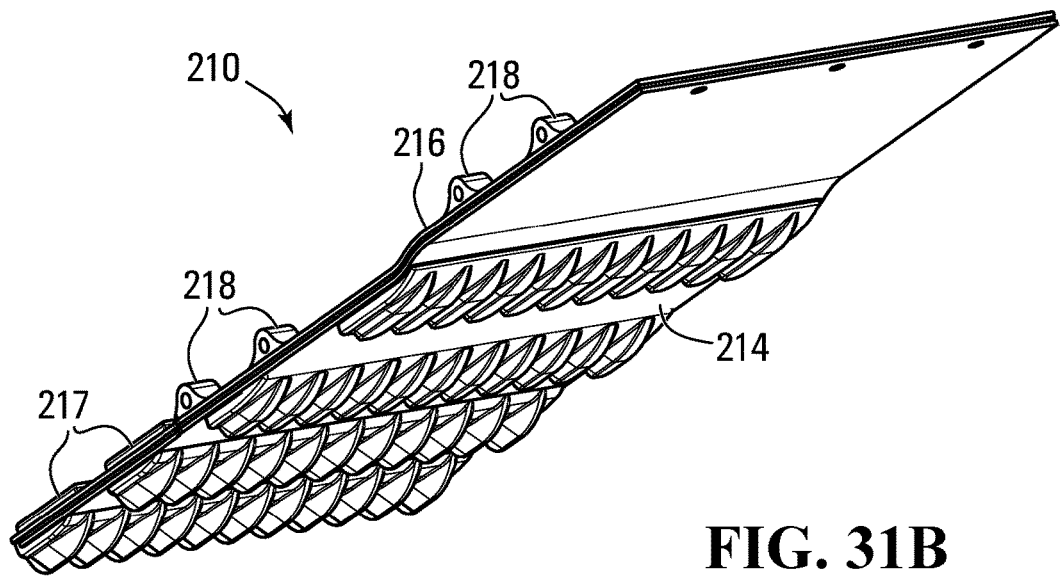

With reference to FIGS. 31A and 31B, each of the plurality of the mat sections 210 is configured for being fastened to the protective casing 155 by way of one or more of the stiffener devices 212 and has an underside 214, a topside 216, a plurality of weight blocks 217 and a plurality of protrusions 218. In one embodiment, the mat sections 210 may be made of rubber. In another embodiment, the mat sections 210 may be made of urethane. In still other embodiments, the use of other materials for the mat sections 210 is possible. The weight blocks 217 and the protrusions 218 may be wholly formed with the mat sections 210, or may be affixed to the mat sections 210 after manufacturing of the mat sections 210. Each of the weight blocks 217 extends substantively from one end of the mat section 210 to the other end along the width of the mat section 210, and are typically positioned at an end of the mat section 210 which is farther away from the tiller 150. The weight blocks 217 generally comprise a rectangular-shaped block of metal (or other heavy substance) which adds weight to the mat section. The weight blocks 217 may be attached to the mat section 210, typically by way of overmolding, though other methods for securing the weight blocks 217 may also be envisaged. Each of the protrusions 218 extends upward from topside 216 of the mat sections 210 and defines a bell-curve-like structure of narrow width and featuring a hole substantively in the middle of the structure, the hole positioned such that when two of the mat sections 210 are placed lengthwise side-by-side, the holes of each of the protrusions 218 are aligned.

Figure 32:
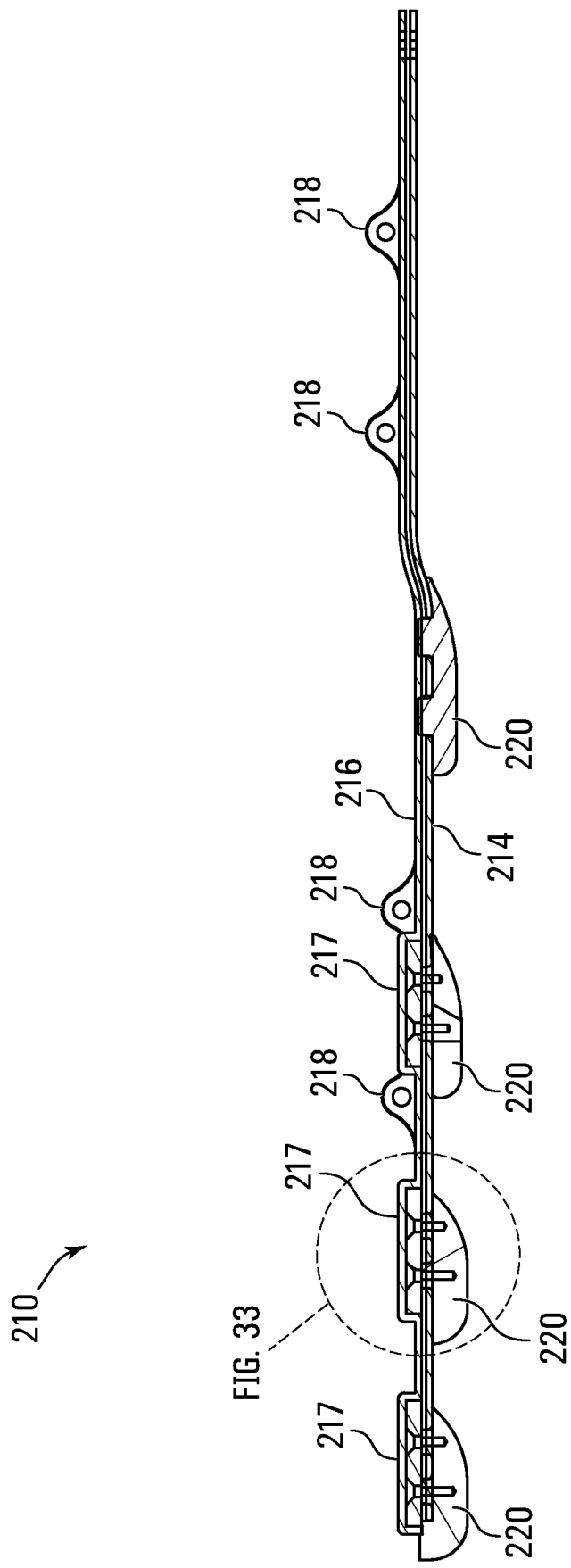

With reference to FIG. 32, a plurality of grooming elements 220 (which may be referred to as the "combs" or "grooming elements") are affixed to the underside 214 of the mat section 210. The combs 220 may come in a variety of shapes and sizes, though in general they present a wide base attached to the underside 214 which may be rectangular-or diamond-shaped, narrowing to a plateau or ridge furthest away from the underside 214 of the mat section 210. Each mat section 210 comprises several rows of combs, with each row featuring a plurality of combs positioned lengthwise side-by-side to one another. The positioning of the combs is generally aligned with that of the weight blocks 217; that is to say, the area on the topside 216 occupied by the weight blocks 217 generally corresponds to the same area on the underside 214 occupied by the combs 220.

Figure 33:
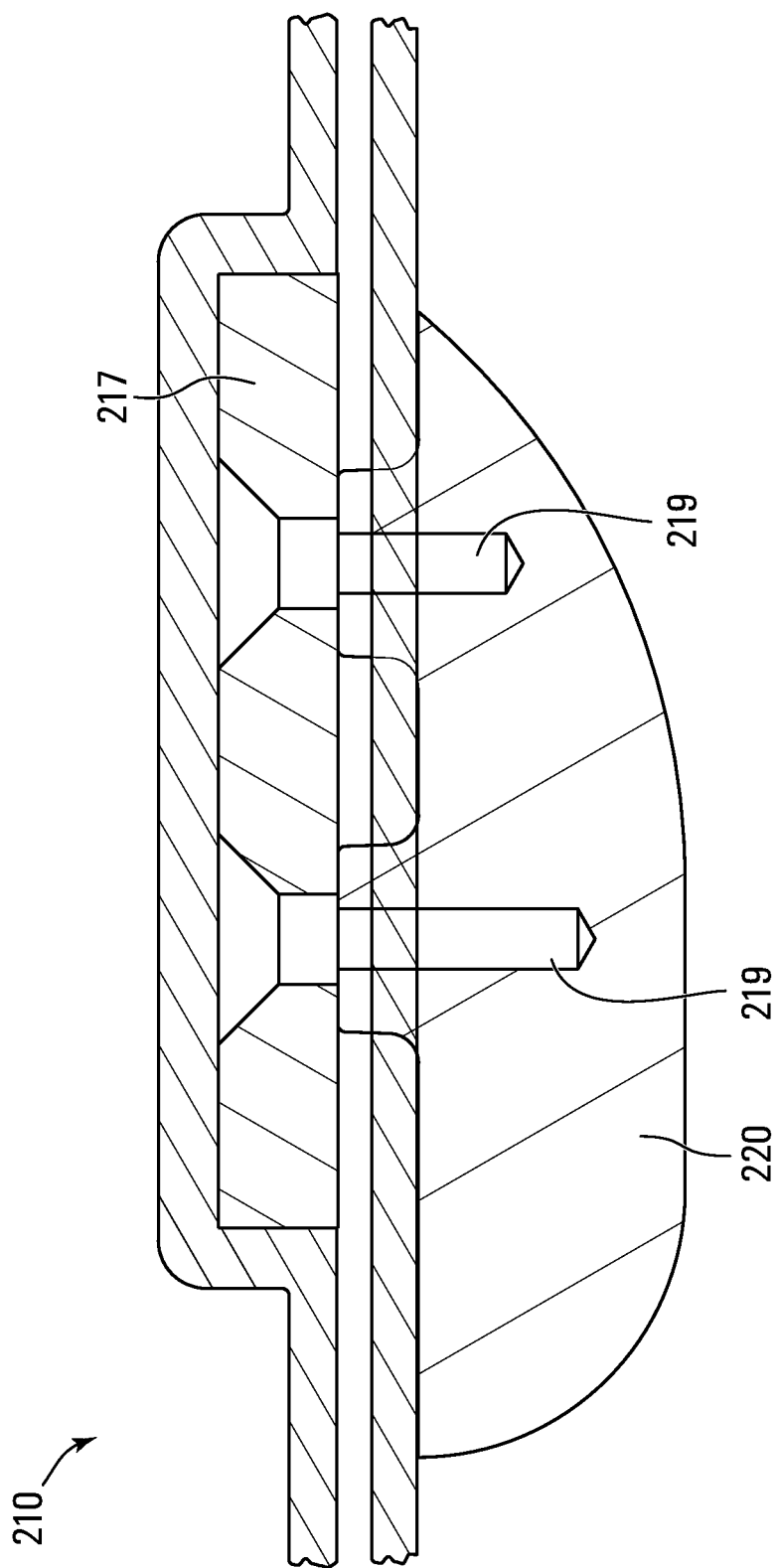

The combs 220 may be affixed in a variety of ways including bonding, screws or other fasteners, or in any other suitable way. In one non-limiting example, bonding may refer to adhesive bonding. With further reference to FIG. 33, a portion of the mat section 210 is shown with a particular focus on the comb 220 and the weight block 217. In order to ensure a proper alignment and position of the comb 220, the weight block 217 may comprise a plurality of pins 219 which are configured to be inserted into a matching number of holes present in the comb 220. In some embodiments, the pins 219 may merely serve to align and position the comb 220, while in others, the pins 219 may serve as a securing mechanism.

Figure 34:
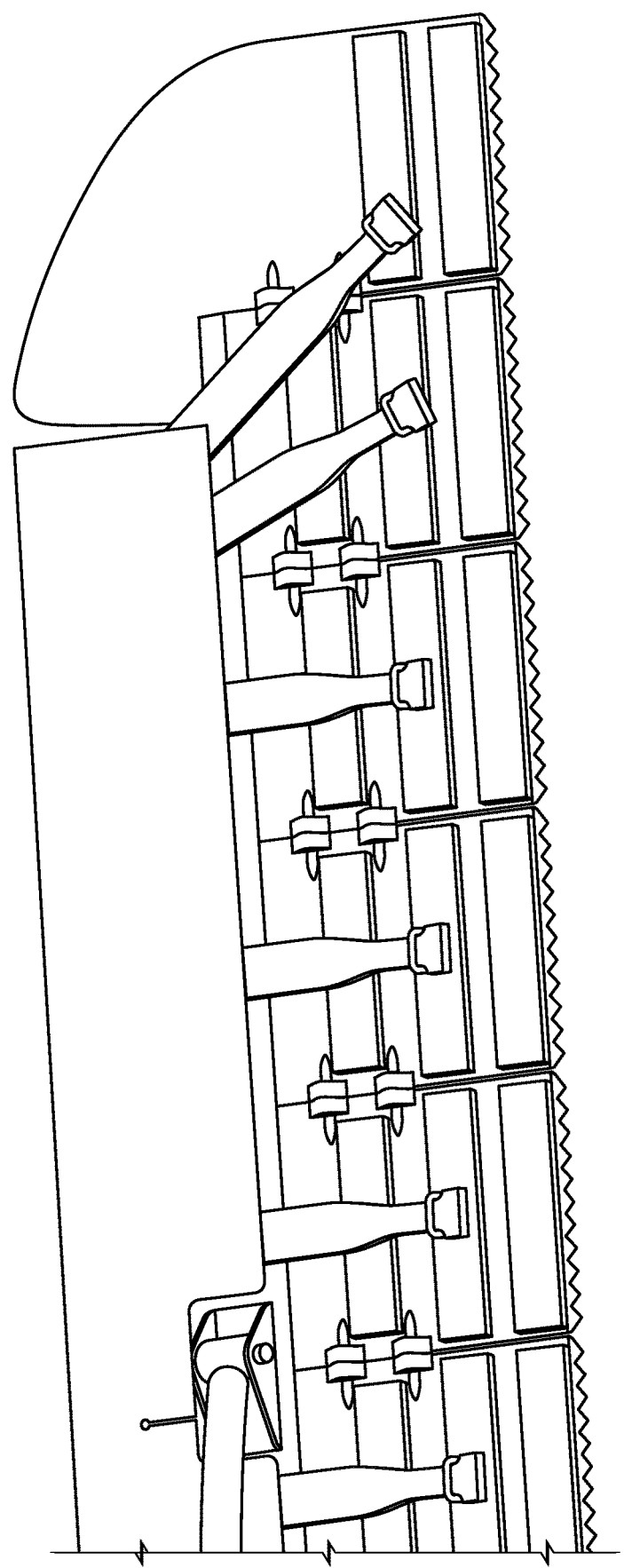
FIG. 34 illustrates a perspective view of an end section of a mat assembly according to an embodiment of an aspect of the invention.

The mat section 210 may be wholly formed, i.e., formed as a single element, in some embodiments including protrusions 218 (as discussed previously), or may itself be composed of further subsections joined together as is known in the art. The mat 209 may comprise a plurality of identical mat sections 210; alternatively, and with reference to FIG. 34, the mat 209 may comprise several types of mat sections 210, such as a left-edge piece, a right-edge piece, and a plurality of centre-pieces, to name one non-limiting example. The mat sections 210 which compose the mat 209 may be secured together via the aligned protrusions 218 by way of a connector (not pictured). Other methods of securing adjacent mat sections together may also be employed.

Figure 20:
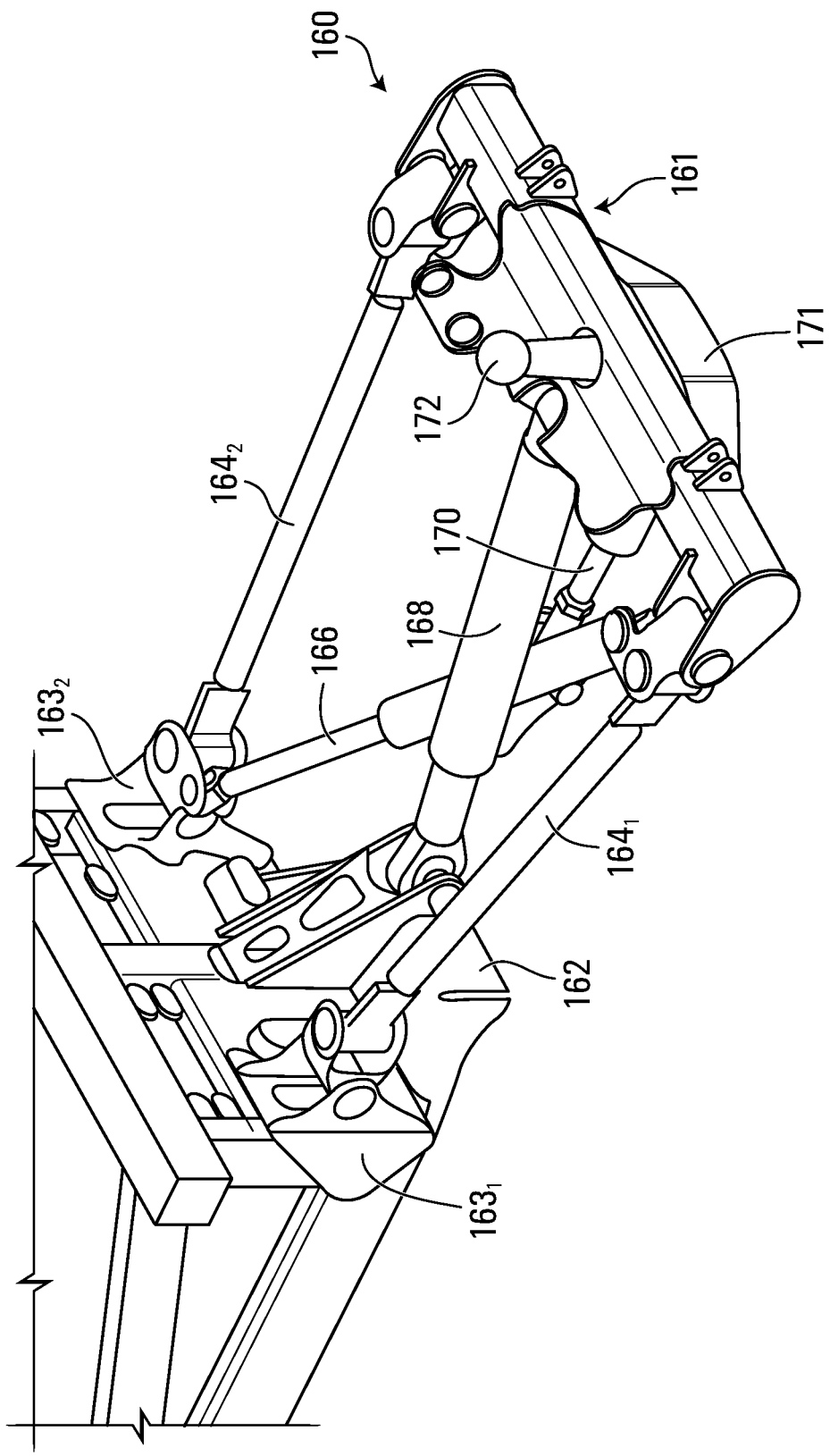

With continued reference to FIG. 20, the stiffener devices 212 are typically elongated members made of metal which attach at a first end to the protective casing 155 and to one of the mat sections 210 at a second end. In an example embodiment, the attachment between one of the stiffener devices 212 and the protective casing 155 may be effected by way of screws, bolts, or any other suitable attaching means as is known in the art. In this same example, the attachment between the stiffener device 212 and the mat section 210 may be effected by way of one of the securing elements 213. In some embodiments of the mat 209, each of the stiffener devices 212 restricts at least in part sideways motion of those of the mat sections 210 to which they are attached.

The securing elements 213 may be implemented as generally C-shaped clips which are positioned such that the stiffener device 212 is trapped between the securing element 213 and the mat section 210. The two ends of the securing element 213 are then attached to the mat section 210 by way of screws, bolts, or any other suitable attaching means as is known in the art. In preferred embodiments of the mat assembly 156, the attachment between the securing element 213 and the mat section 210 may be undone, thereby releasing the mat section 210 from the rest of the mat 209 and allowing the mat section 210 to be replaced in the event that is has become worn or has broken.

iv. Snow Signature

Figure 35A:
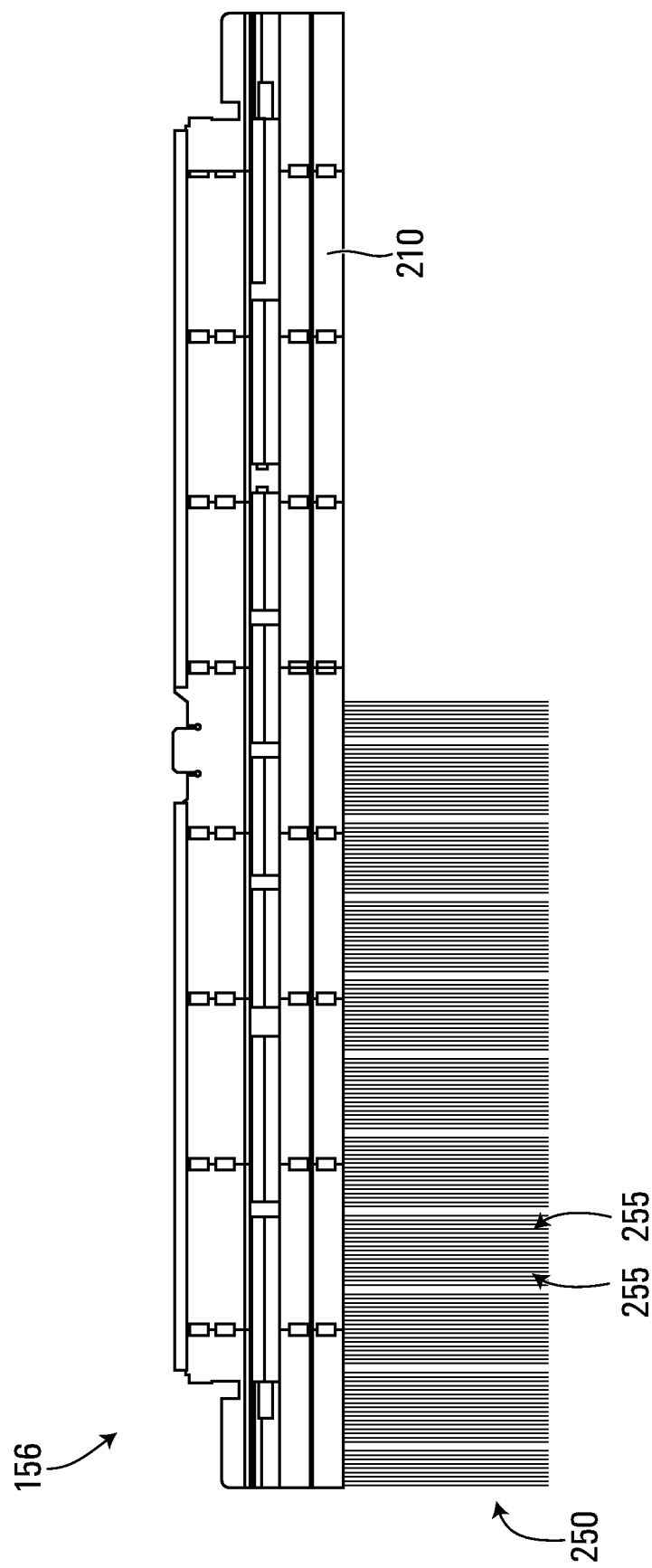
FIGS. 35A-C illustrate a mat assembly and associated snow signature according to an embodiment of an aspect of the invention.
Figure 35B:
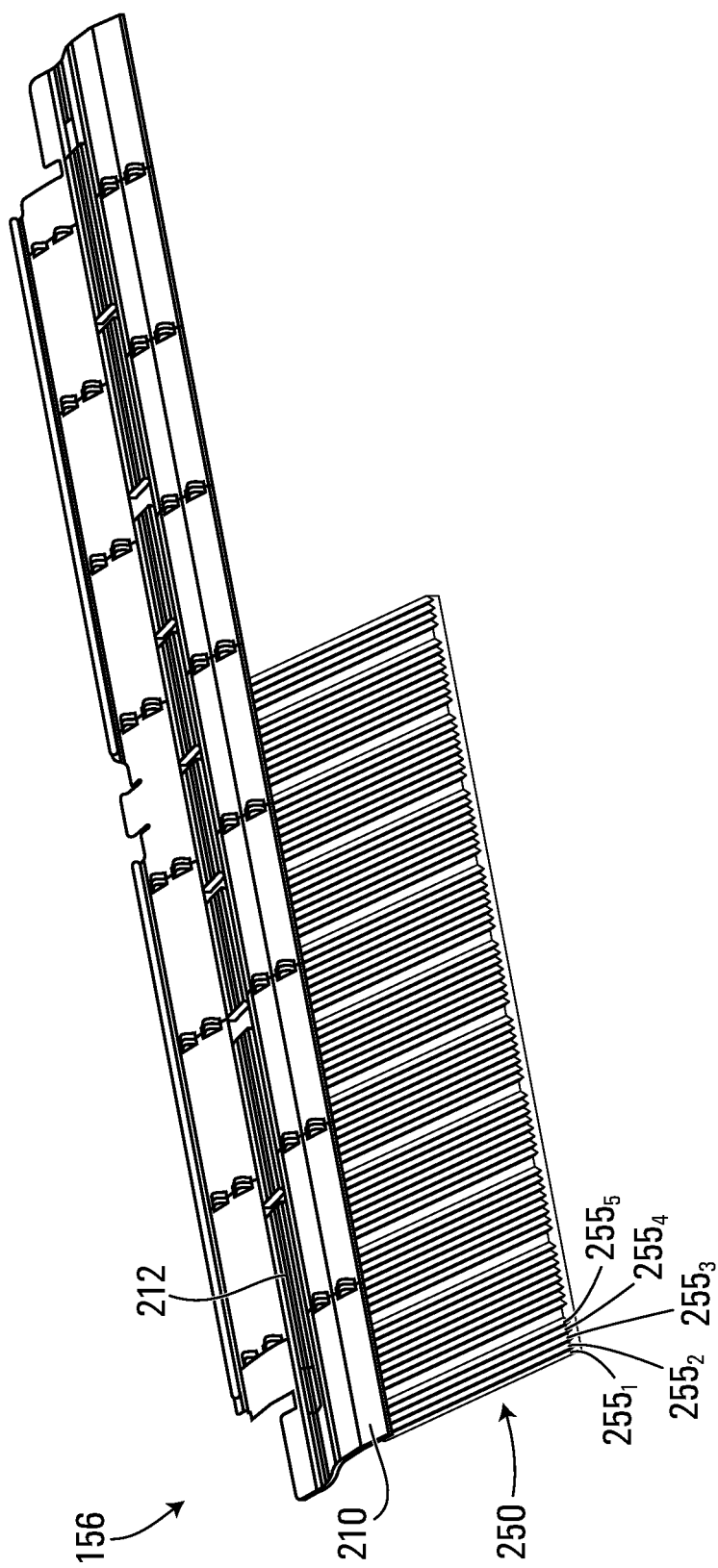
Figure 35C:
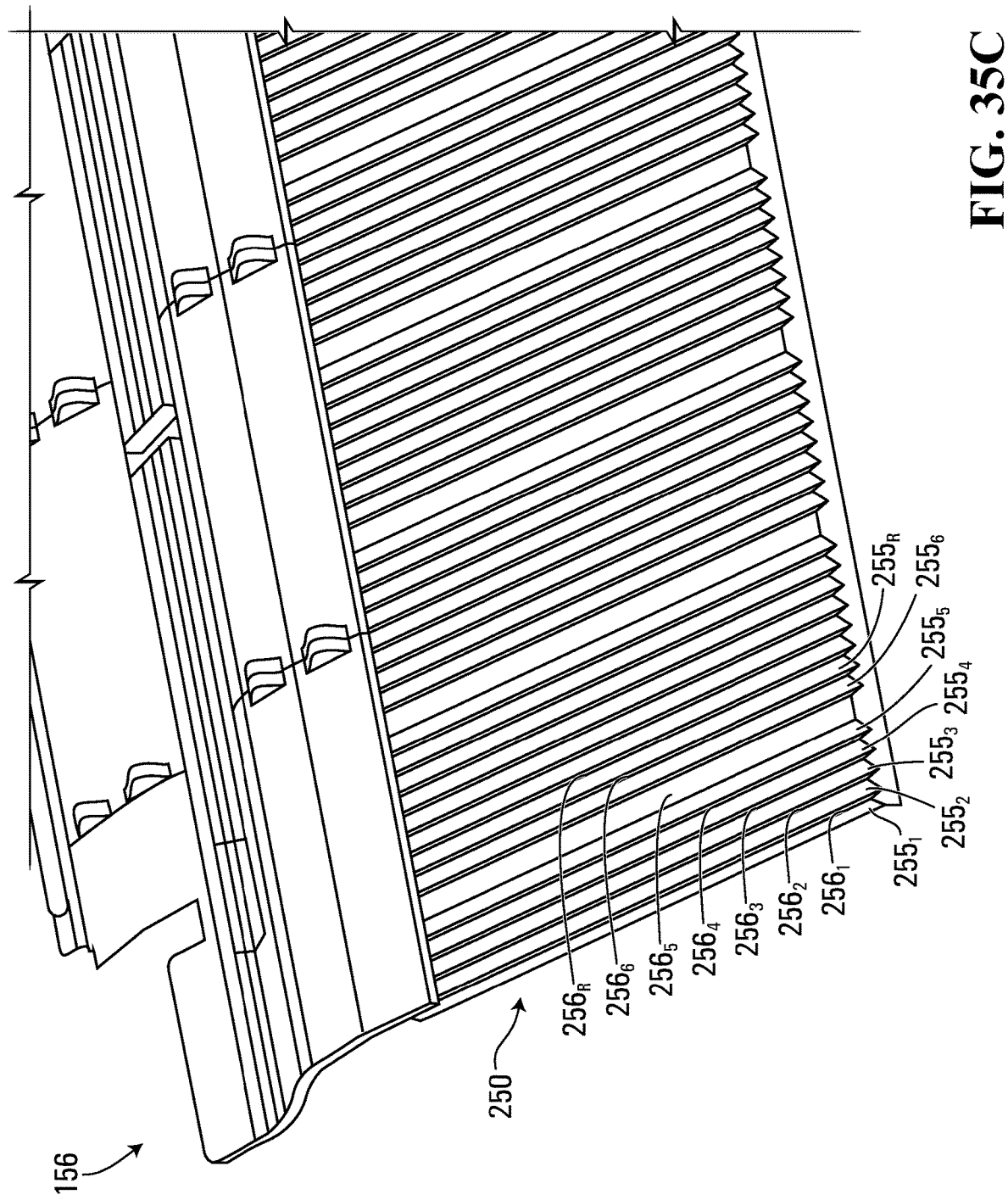

As the mat assembly 156 is towed over the snow, with additional reference to FIGS. 29, and 35A through 35C, the mat assembly 156 is configured for leaving a pattern 250 (which may be referred to as the "signature") on the snow comprising a plurality of ridges $255_1$-$255_R$ and a plurality of grooves $256_1$-$256_G$ between the ridges $255_1$-$255_R$. In this example of implementation, certain ones of the ridges $255_1$-$255_R$ are wider than and as high as other ones of the ridges $255_1$-$255_R$, and/or certain ones of the grooves $256_1$-256G are wider than and as deep as other ones of the grooves $256_1$-$256_6$. For example, as shown in FIG. 35B, the ridge $255_5$ is wider than and as high as the ridges 2551-2554, $255_6$-2559, and this is repeated along the snow. This creates a distinctive and pleasing appearance to the snow being groomed.

To that end, in some embodiments (and with reference to FIG. 30), the configuration of the combs 220 on the underside of the mat 210 forms a plurality of recesses $355_1$-$355_R$ and a plurality of projections $356_1$-$356_G$ between the recesses $355_1$-$355_8$ to form respective ones of the ridges $255_1$-$255_R$ and the grooves $256_1$-$256_G$ of the signature 250 on the snow.

In embodiments of the snow groomer 10 where the mat 209 of the mat assembly 156 is composed of a plurality of mat sections 210, the wider ridges and grooves may be the result of a recess which exists at the joining line between two adjacent mat sections 210. More specifically, each mat section 210 may itself generate a portion of the ridges $255_1$-$255_R$ and grooves $256_1$-$256_G$, whereas some other portions of the ridges $255_1$-$255_R$ and grooves $256_1$-$256_G$ may instead be generated by the interconnections between each of the mat sections 210. With specific reference to FIG. 35B, in an example embodiment of such a mat 209, the wider ridge $255_5$ may be generated by the connection between a first mat section $210_1$ and a second mat section $210_2$, whereas ridges $255_1$-$255_4$ are generated by the first mat section $210_1$ and ridges $255_6$-$255_9$ are generated by the second mat section $210_2$. In such an embodiment, each of the recesses $355_1$-$355_{12}$ and projections $356_1$-$356_G$ may be equally wide and distributed among the plurality of mat sections 210.

In embodiments of the snow groomer 10 where the mat assembly comprises a wholly-formed mat 209, certain ones of the recesses $355_1$-$355_{12}$ of the underside of the mat assembly 156 may be wider than and as deep as other ones of the recesses $355_1$-$355_R$, and/or certain ones of the projections 356₁-356_G_ of the underside of the mat assembly 156 may be wider than and as high as other ones of the projections 356₁-356_G_.

f) Additional Considerations

While in embodiments considered above the tracked vehicle 10 is a snow groomer, in other embodiments, certain features of the tracked vehicle 10 that are described herein may be implemented in other types of industrial tracked vehicles, such as a tracked carrier vehicle for example.

Any feature of any embodiment discussed herein may be combined with any feature of any other embodiment discussed herein in some examples of implementation.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

What is claimed is:

1. A user interface for a snow groomer, comprising:
   an input device;
   an output device; and
   an electronic controller;
   the controller configured to receive from the input device an indication of a desired snow grooming distance;
   the controller further configured to measure a distance traveled by the snow groomer, and to cause the output device to convey a remaining distance to be traveled by the snow groomer, the remaining distance being the difference between the desired snow grooming distance and the distance traveled by the snow groomer.

2. A user interface for a snow groomer as defined in claim 1, wherein the controller is further configured to controllably start and stop measuring the distance traveled by the snow groomer, based on user input received via the input device.

3. A user interface for a snow groomer as defined in claim 1, wherein the controller is further configured to controllably pause and resume measuring the distance traveled by the snow groomer, based on user input received via the input device.

4. A user interface for a snow groomer as defined in claim 1, wherein when the remaining distance to be traveled by the snow groomer is below a threshold, the controller is configured to issue an advisory output signal.

5. A user interface for a snow groomer as defined in claim 4, wherein the advisory output signal is audible.

6. A user interface for a snow groomer as defined in claim 4, wherein the advisory output signal is visual.

7. A user interface for a snow groomer as defined in claim 1, wherein when the remaining distance to be traveled by the snow groomer reaches zero, the controller is configured to issue an advisory output signal.

8. A user interface for a snow groomer as defined in claim 7, wherein the controller is further configured to controllably activate and deactivate issuance of the advisory output signal, based on user input received via the input device.

9. A user interface for a snow groomer as defined in claim 1, wherein the controller is configured to reset the distance traveled by the snow groomer, based on user input received via the input device.

10. A user interface for a snow groomer as defined in claim 1, wherein the output device includes an indicator of whether the snow groomer is in motion.

11. A user interface for a snow groomer as defined in claim 1, the controller further configured to receive measurements from a sensor and to convert the measurements into the distance traveled by the snow groomer.

12. A user interface for a snow groomer as defined in claim 11, wherein the sensor is a motor speed sensor.

13. A user interface for a snow groomer as defined in claim 11, wherein the sensor measures rotational movement of a component of the snow groomer that rotates when the snow groomer is advancing.

14. A user interface for a snow groomer as defined in claim 13, wherein the component is a motor.

15. A user interface for a snow groomer as defined in claim 1, wherein to convey the remaining distance to be traveled, the controller causes the remaining distance to be traveled to be displayed to a user of the user interface.

16. A user interface for a snow groomer as defined in claim 11, wherein the controller is configured to continually receive the measurements from the sensor and to continually update the remaining distance to be traveled by the snow groomer.

17. A user interface for a snow groomer as defined in claim 1, wherein to convert the measurements into the distance traveled, the controller multiplies the measurements by a factor stored in memory.

18. A user interface for a snow groomer as defined in claim 1, wherein the desired snow grooming distance is entered by a user of the user interface via the input device.

19. A user interface for a snow groomer as defined in claim 1, wherein the input device comprises at least one of a lever, a knob and a button.

20. A user interface for a snow groomer as defined in claim 1, wherein the input device and the output device are a same touch screen.

21. A user interface for a snow groomer as defined in claim 1, further including an odometer for displaying the distance traveled by the snow groomer.

* * * * *